United States Patent [19]

Johnson

[11] 4,042,813
[45] Aug. 16, 1977

[54] SECONDARY SYSTEM MODELING AND METHOD FOR A NUCLEAR POWER PLANT TRAINING SIMULATOR

[75] Inventor: Steven J. Johnson, Pittsburgh, Pa.

[73] Assignee: Westinghouse Electric Corporation, Pittsburgh, Pa.

[21] Appl. No.: 519,722

[22] Filed: Oct. 31, 1974

Related U.S. Application Data

[63] Continuation of Ser. No. 335,293, Feb. 23, 1973, abandoned.

[51] Int. Cl.$^2$ .................... G09B 9/00; G06F 15/06
[52] U.S. Cl. ............................ 235/151.21; 176/19 R; 35/13; 364/300
[58] Field of Search ............... 444/1; 235/184, 151.21, 235/151.3, 151; 176/19, 24; 35/10, 13, 10.2; 340/172.5

[56] References Cited

U.S. PATENT DOCUMENTS

| | | | |
|---|---|---|---|
| 3,061,945 | 11/1962 | Hawkins | 35/10 |
| 3,237,318 | 3/1966 | Schager | 35/10 |

OTHER PUBLICATIONS

Reactor Simulator Utilizing a Vacuum System, Harry Reese, Jr., RCA Technical Notes, RCA TN No.: 493, Sept. 1961.
Dynamic Simulation of a Fast Reactor, R. G. Olson, Nucleonics, May, 1957, pp. 76–79.
An Electronic Reactor Simulator, Ross Cameron & D. A. Austin, Nuclear Power, April, 1957, pp. 146–151.
PWR Training Simulator, J. P. Franz & W. H. Alliston, Nucleonics, May, 1957, pp. 80–83.

*Primary Examiner*—Edward J. Wise
*Attorney, Agent, or Firm*—H. W. Patterson

[57] ABSTRACT

A method and system for the real-time simulation of the dynamic operation of a nuclear power plant in which a secondary system for operating the steam turbine includes reheaters for increasing the steam temperature and pressure between the low and high pressure turbine stages, an electrohydraulic controller for operating the turbine at required speed, a condenser for condensing turbine exhaust steam, a condensate and feedwater system for pumping condensed steam back to the secondary side of a steam generator, a gland steam system for preventing leakage from and to the atmosphere, and a cooling system for the main generator, utilizes apparatus that includes a digital computer for calculating output data corresponding to physical values for the operation of the plant in accordance with input data. A control console includes automatic and manually operable devices corresponding to plant control devices for varying the input data, and indicating devices responsive to the output data for monitoring the operation of the plant.

40 Claims, 45 Drawing Figures

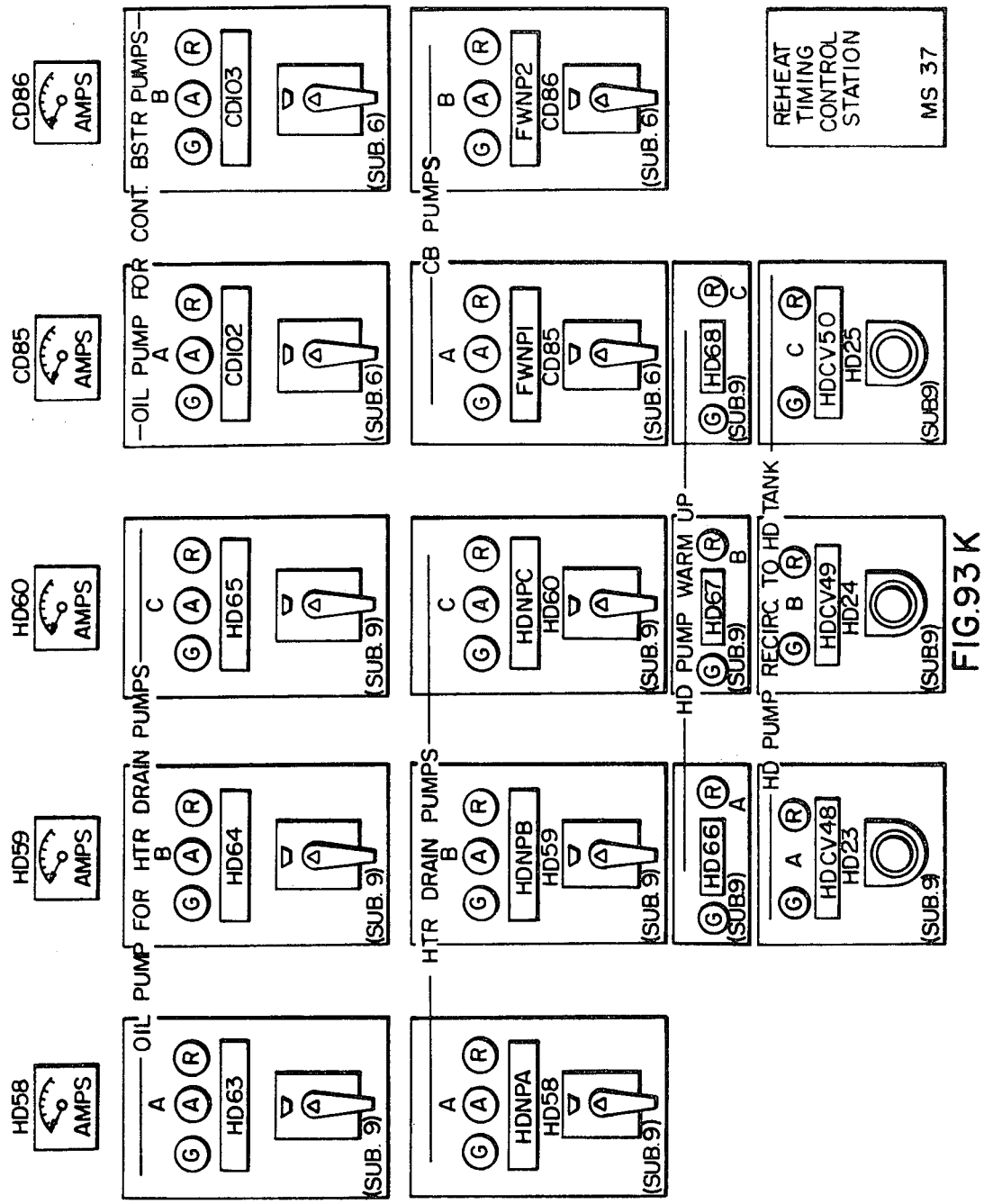

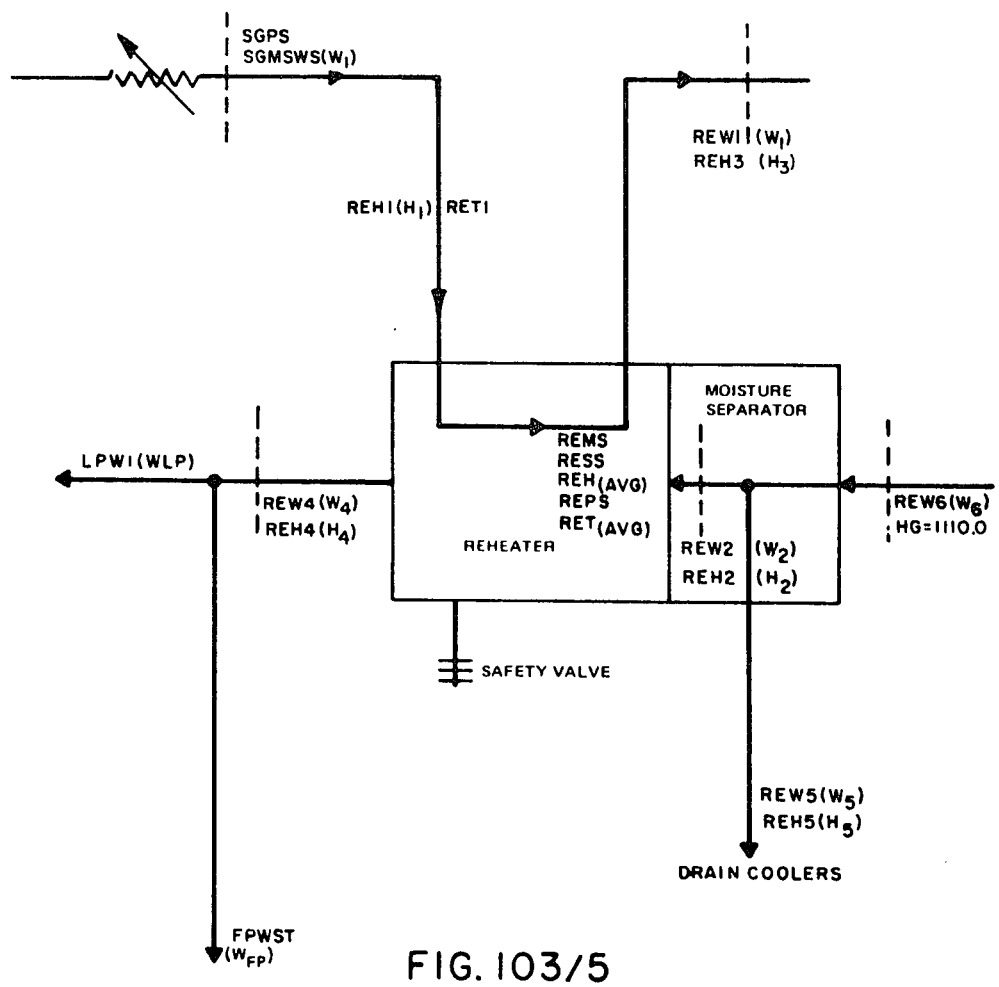
FIG. 103/5
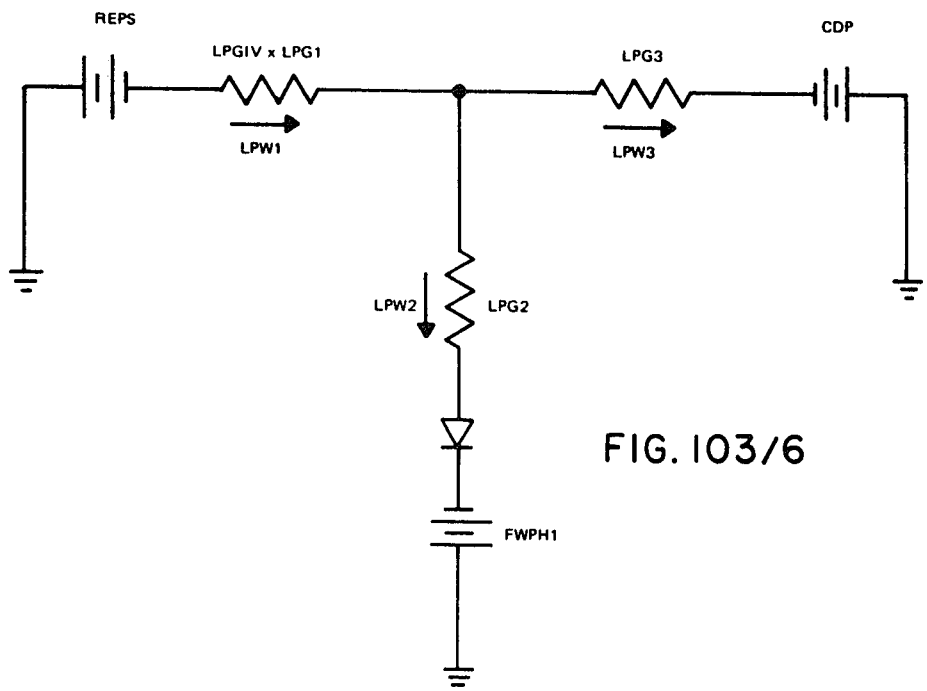
FIG. 103/6

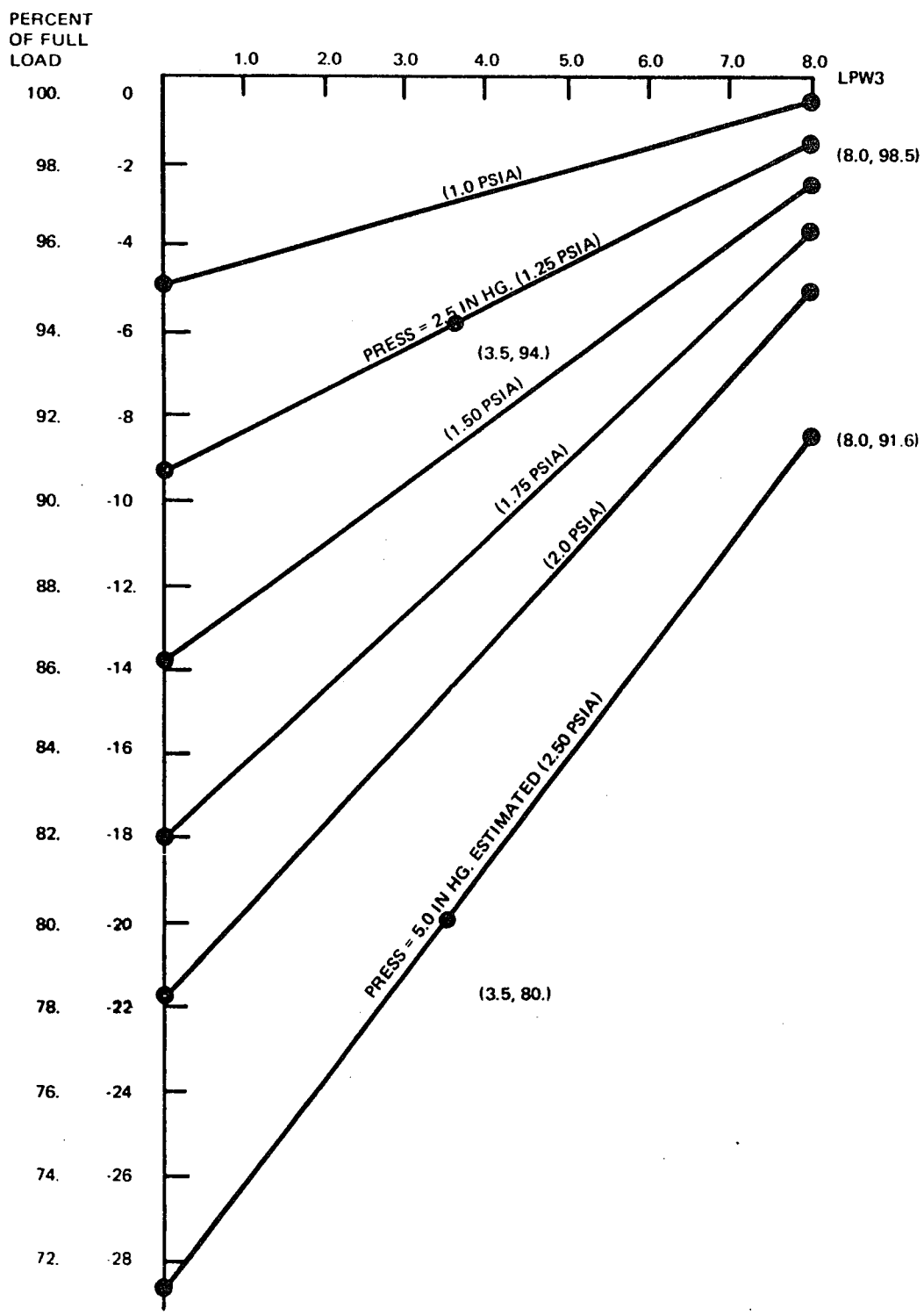
FIG. 103/7

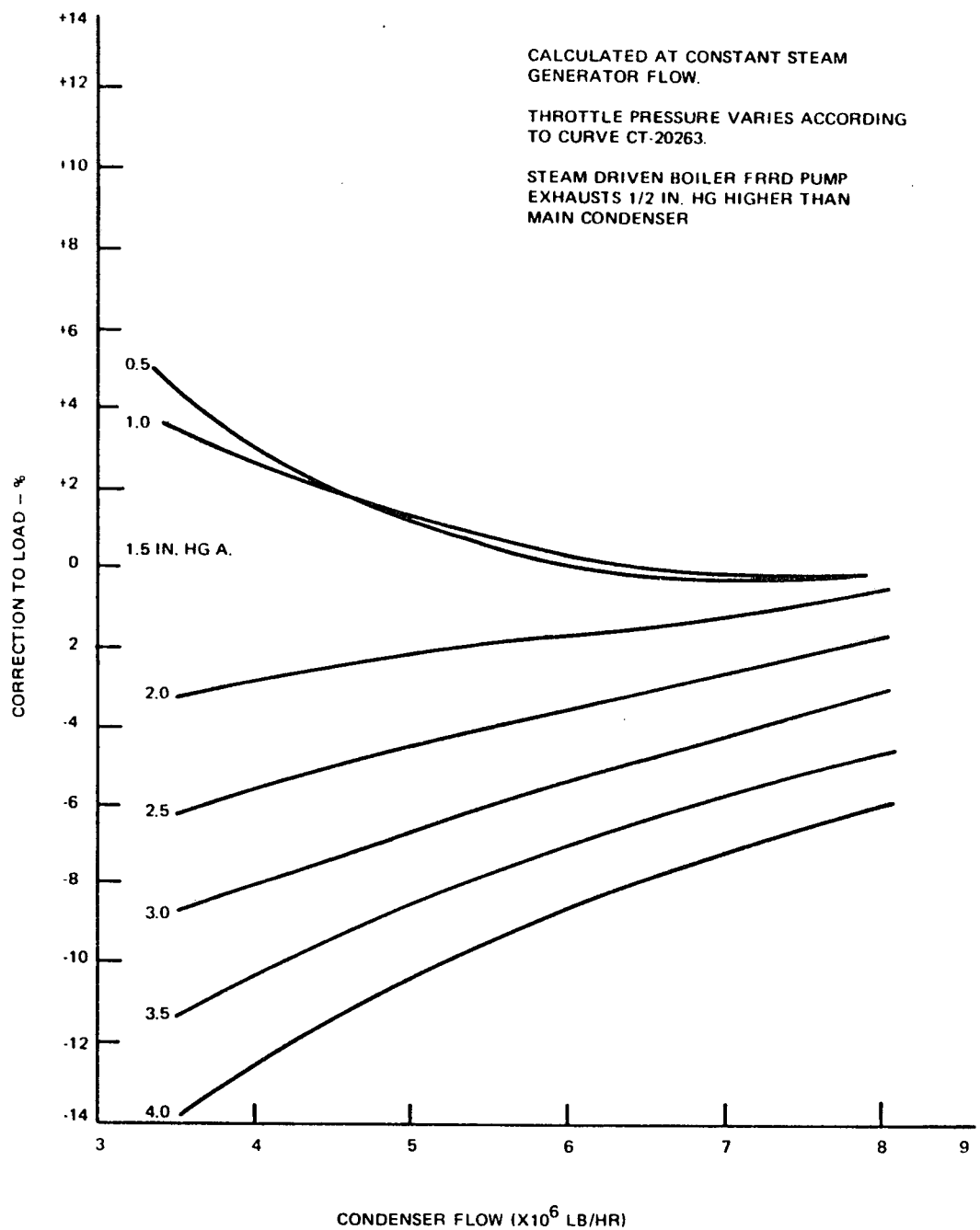
FIG. 103/8

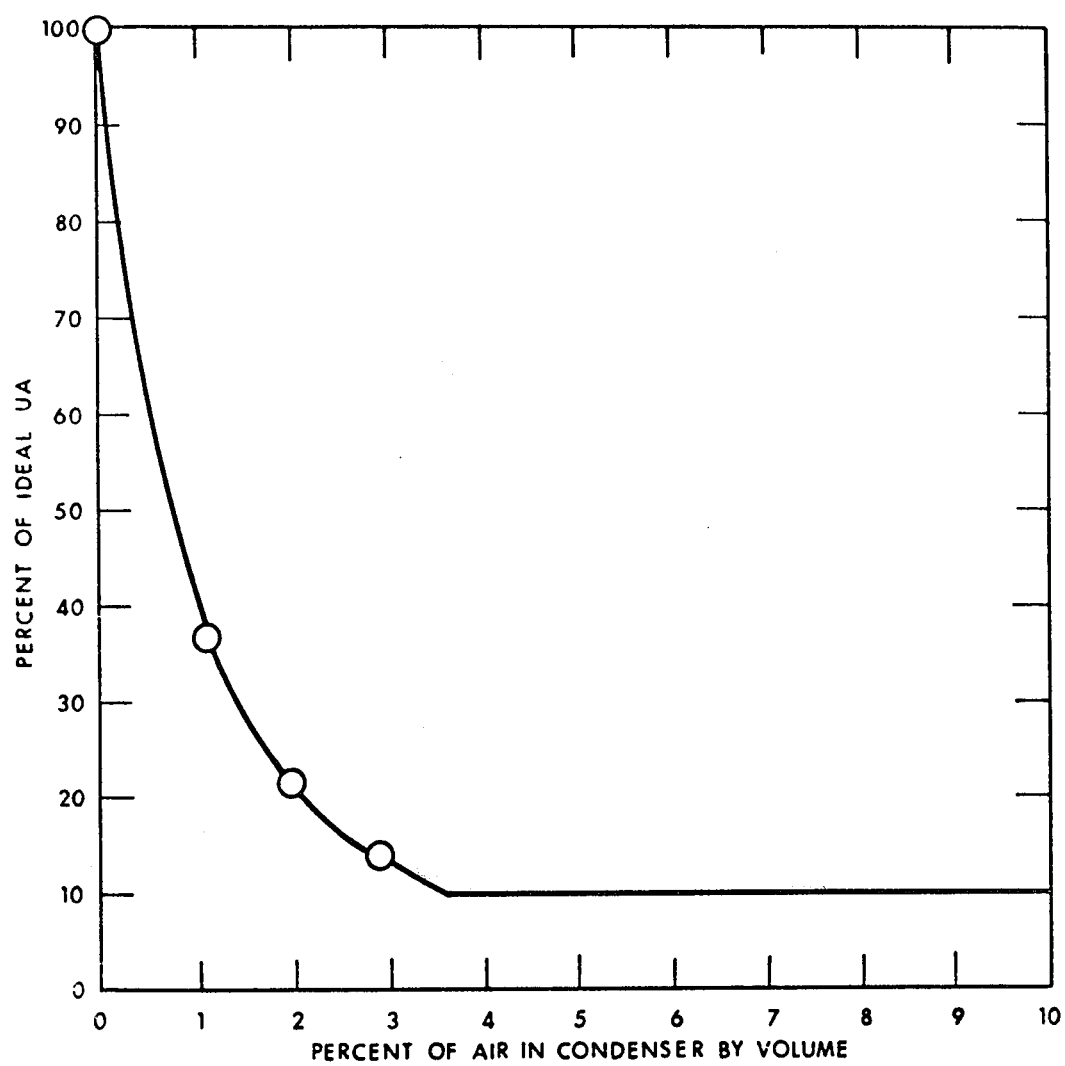
FIG. 104/1

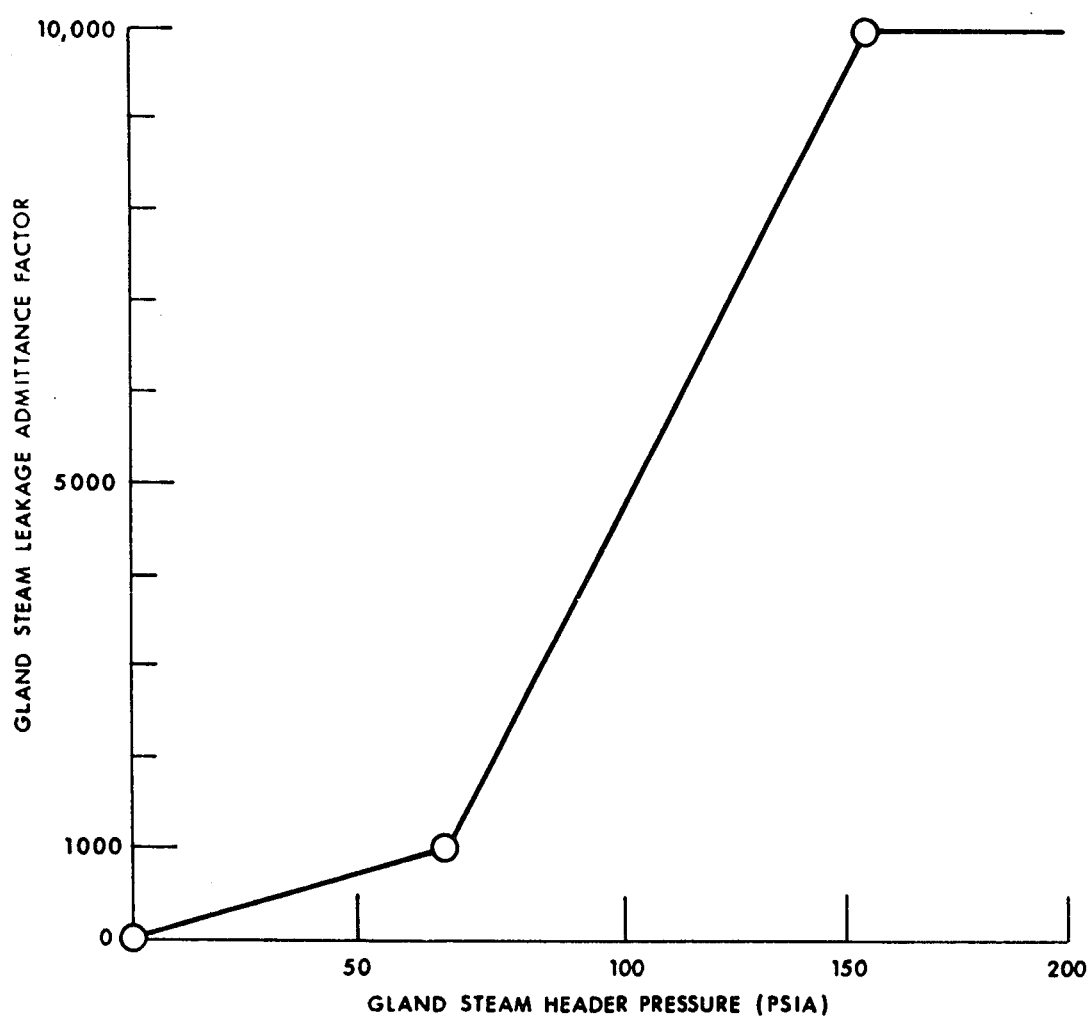
FIG. 104/2

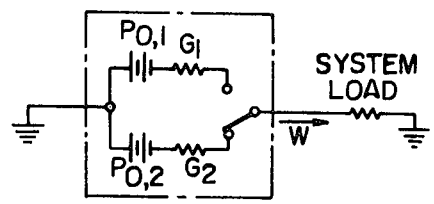
FIG. 105/3
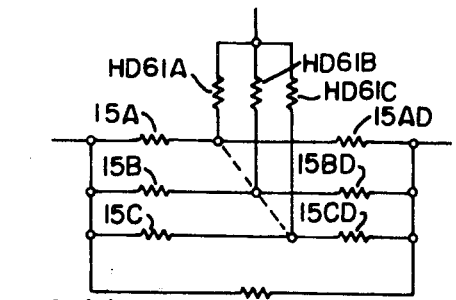
FIG. 105/6
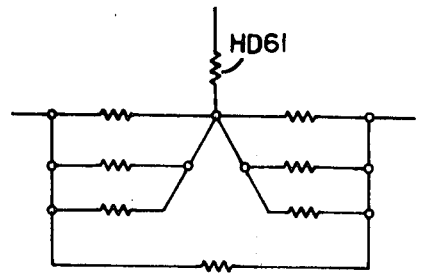
FIG. 105/7
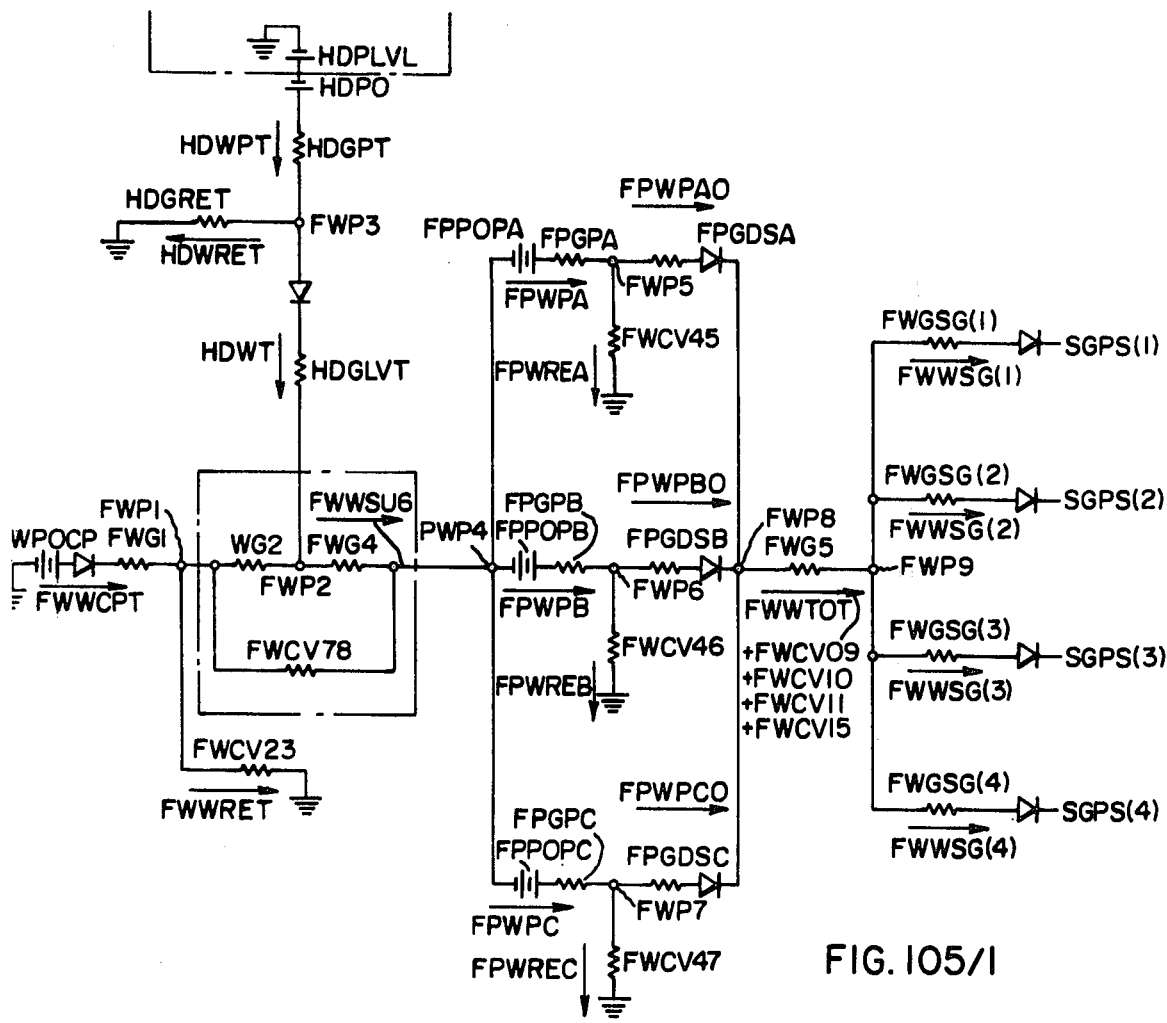
FIG. 105/1

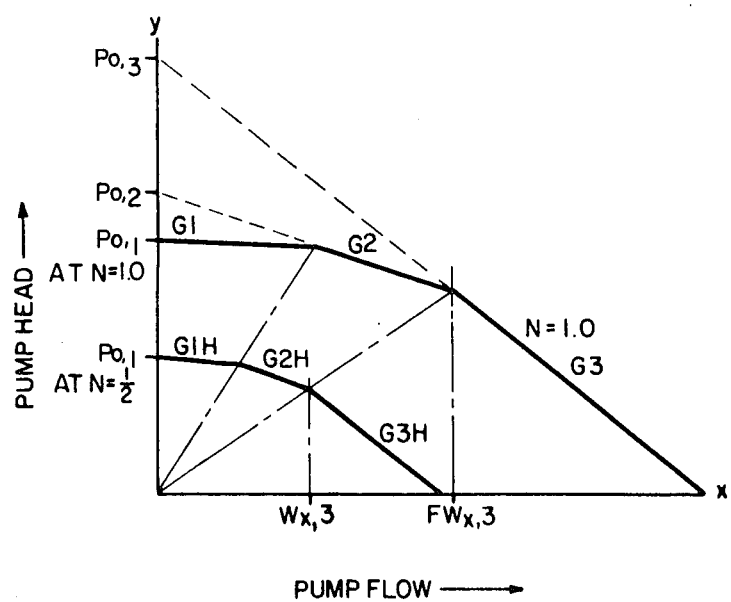
FIG. 105/2
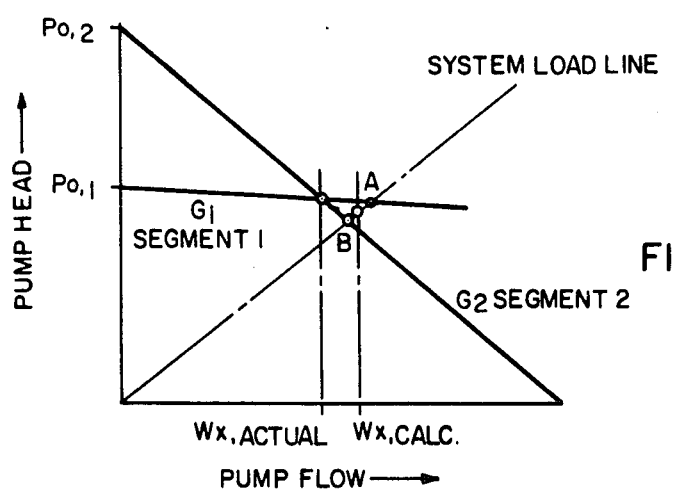
FIG. 105/4
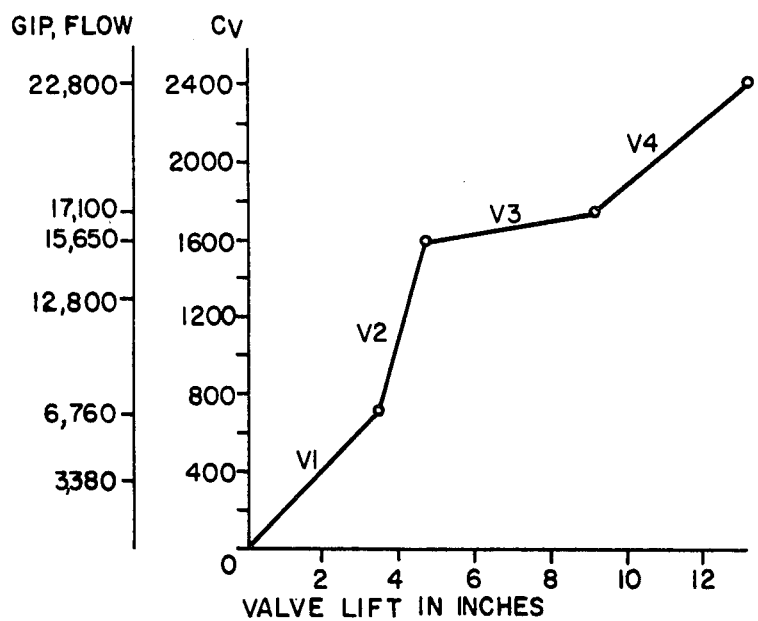
FIG. 105/5

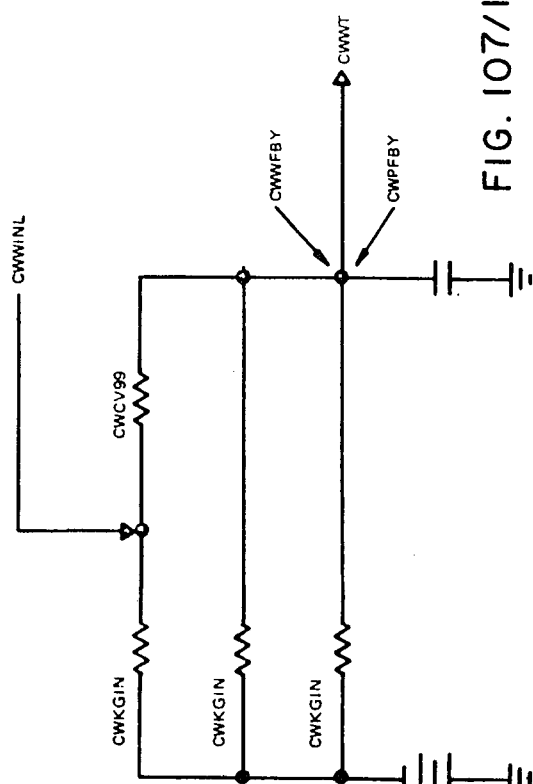
FIG. 107/1
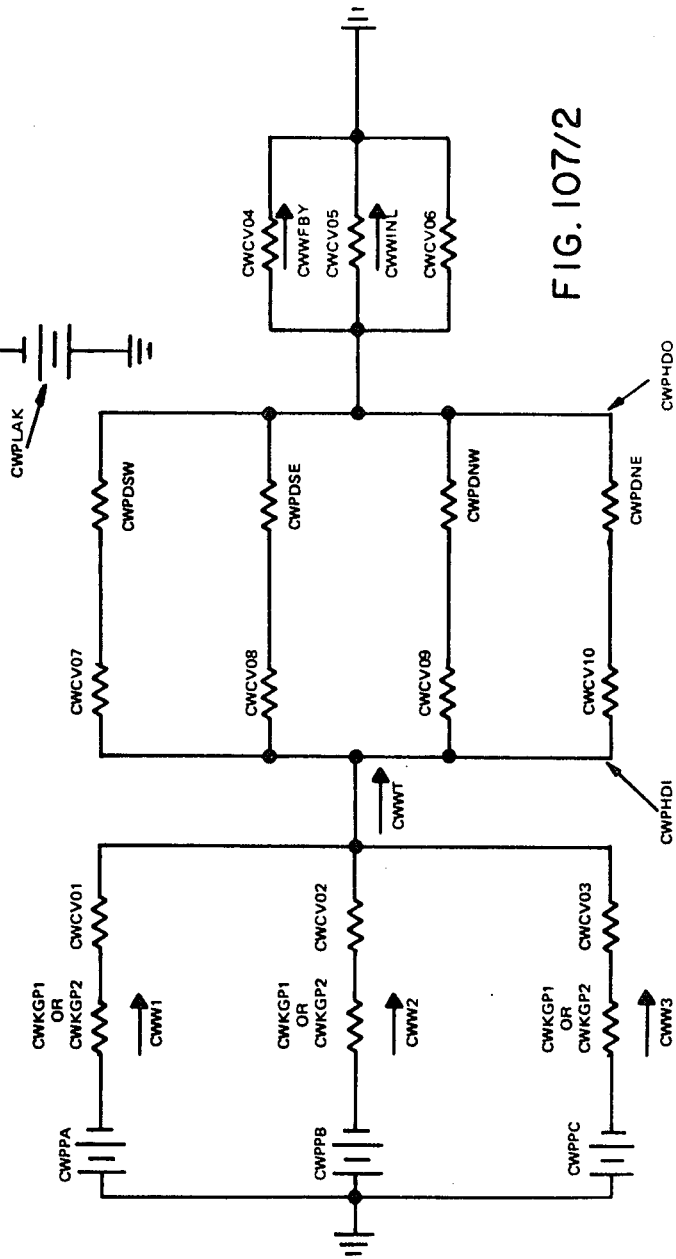
FIG. 107/2

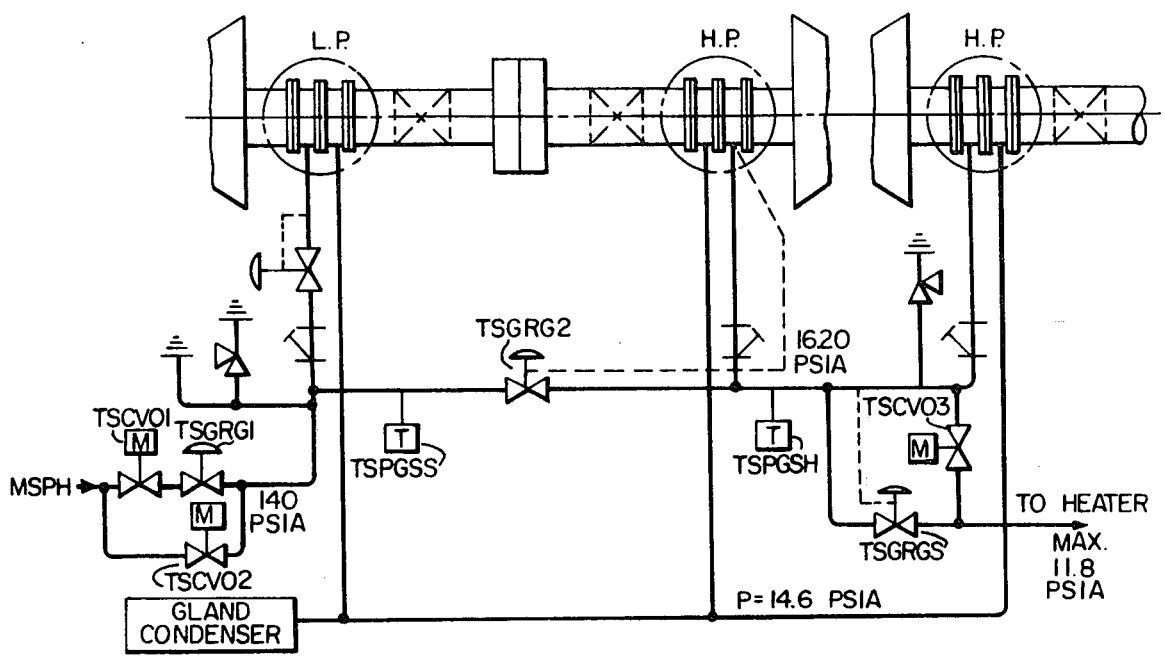
FIG. 109
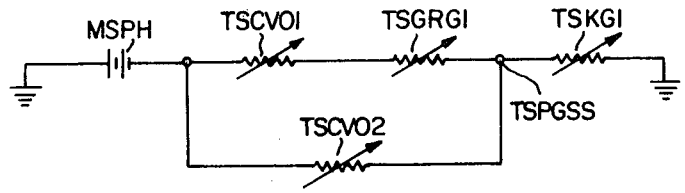
FIG. 109/1
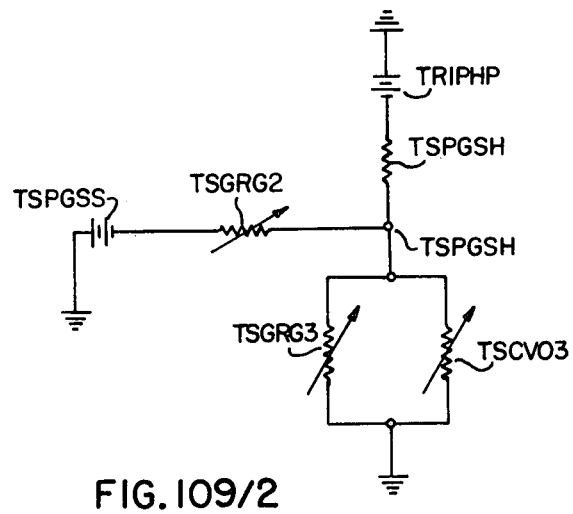
FIG. 109/2

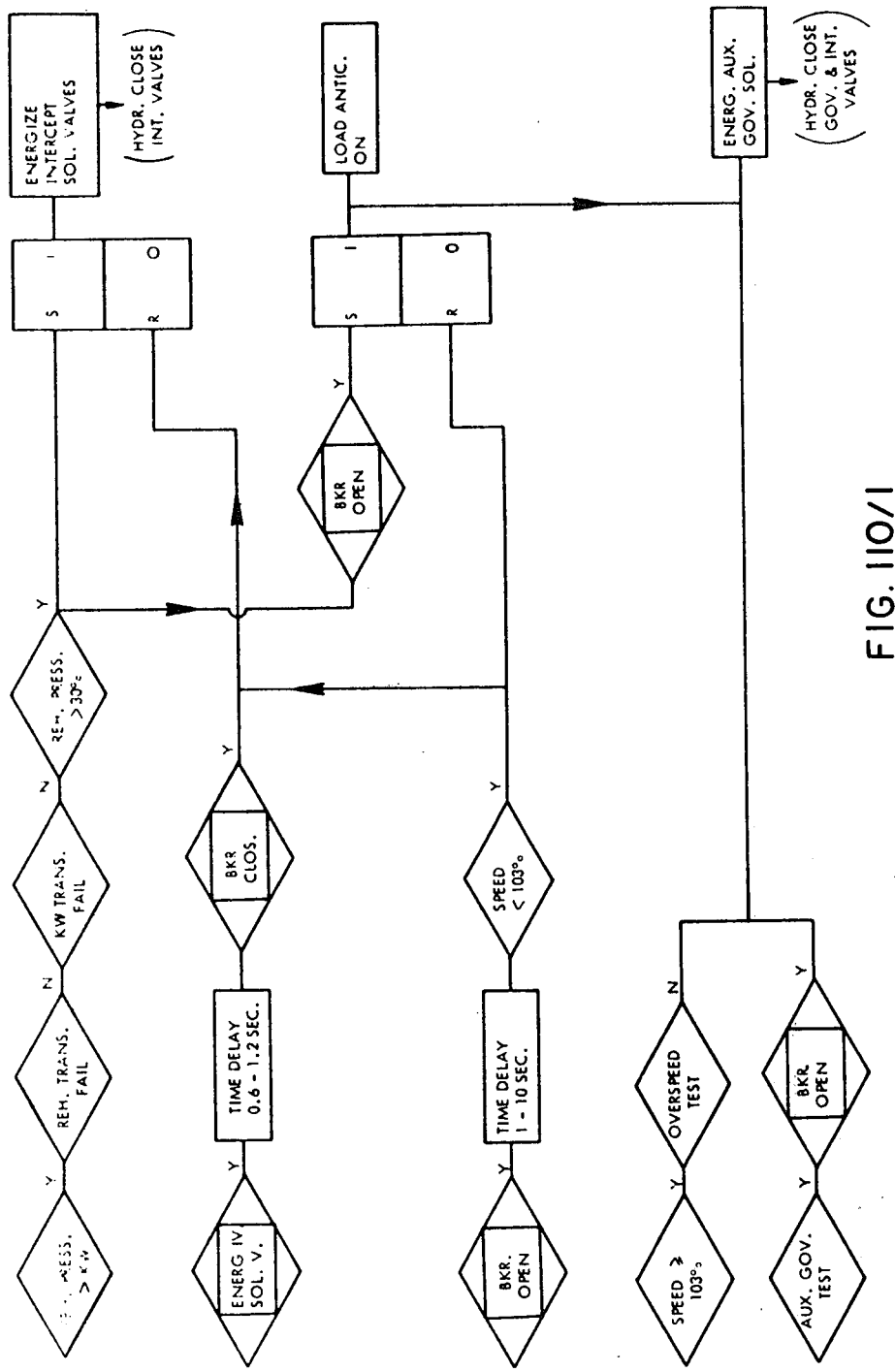
FIG. 110/1

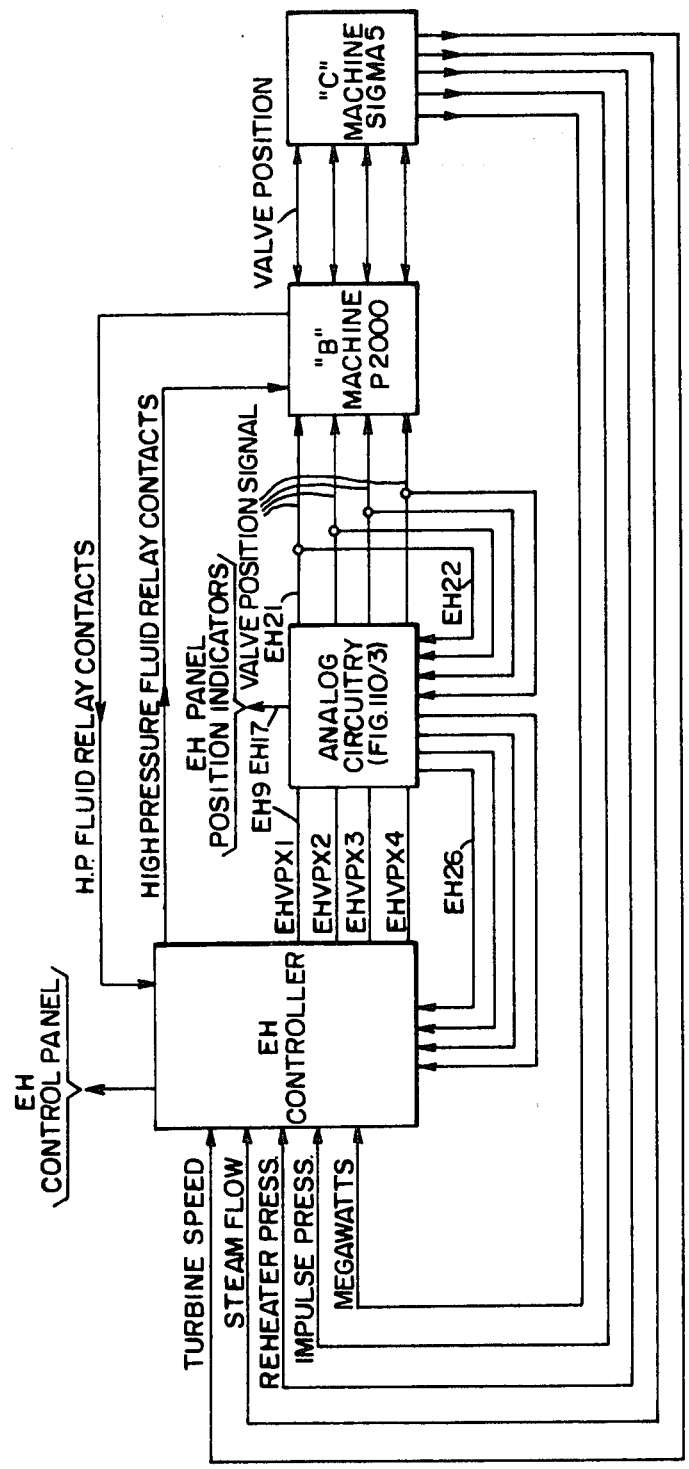
FIG. 110/2

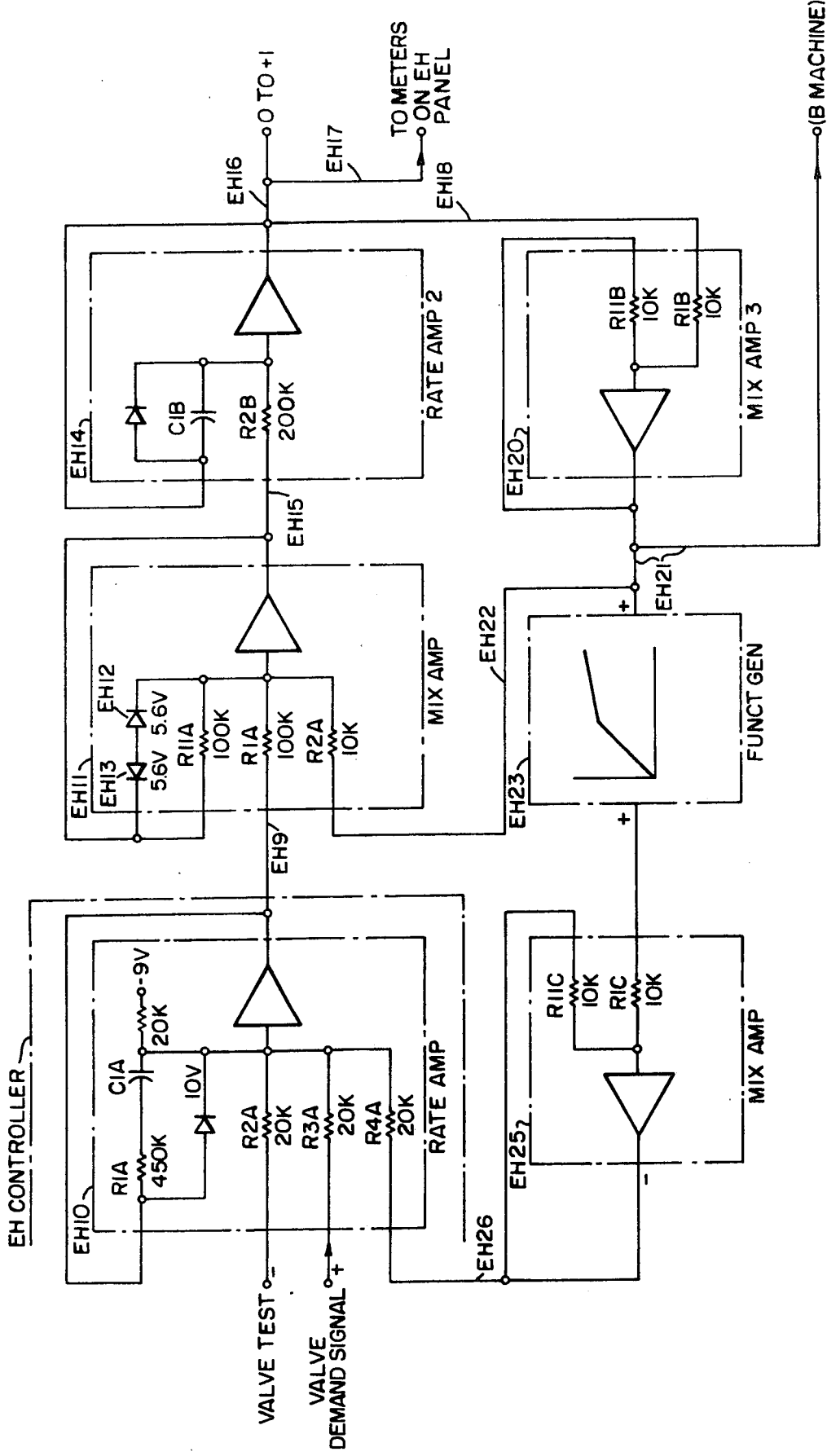
FIG. 110/3

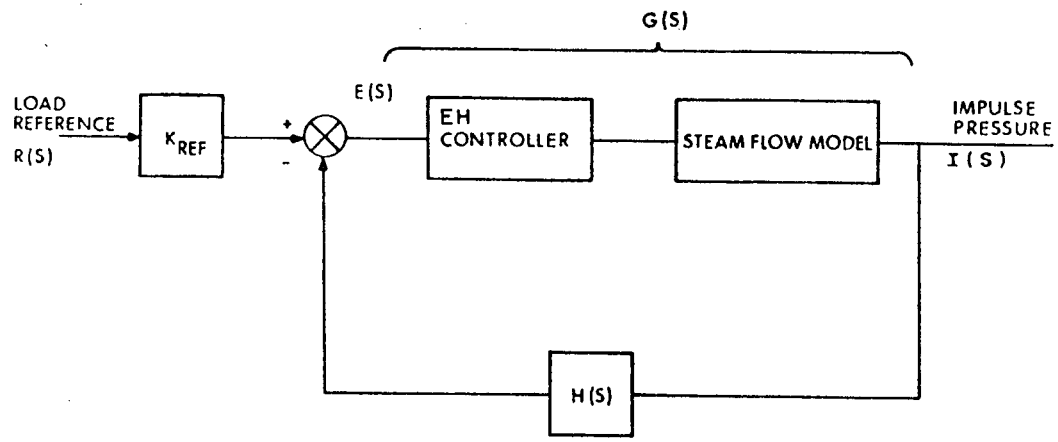
FIG. 110/4
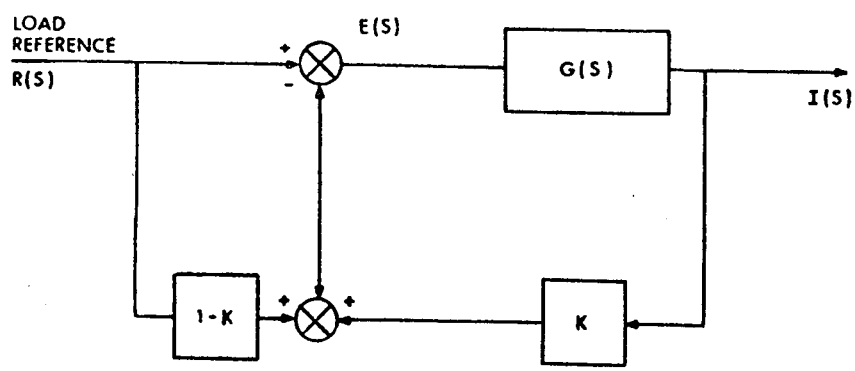
FIG. 110/5

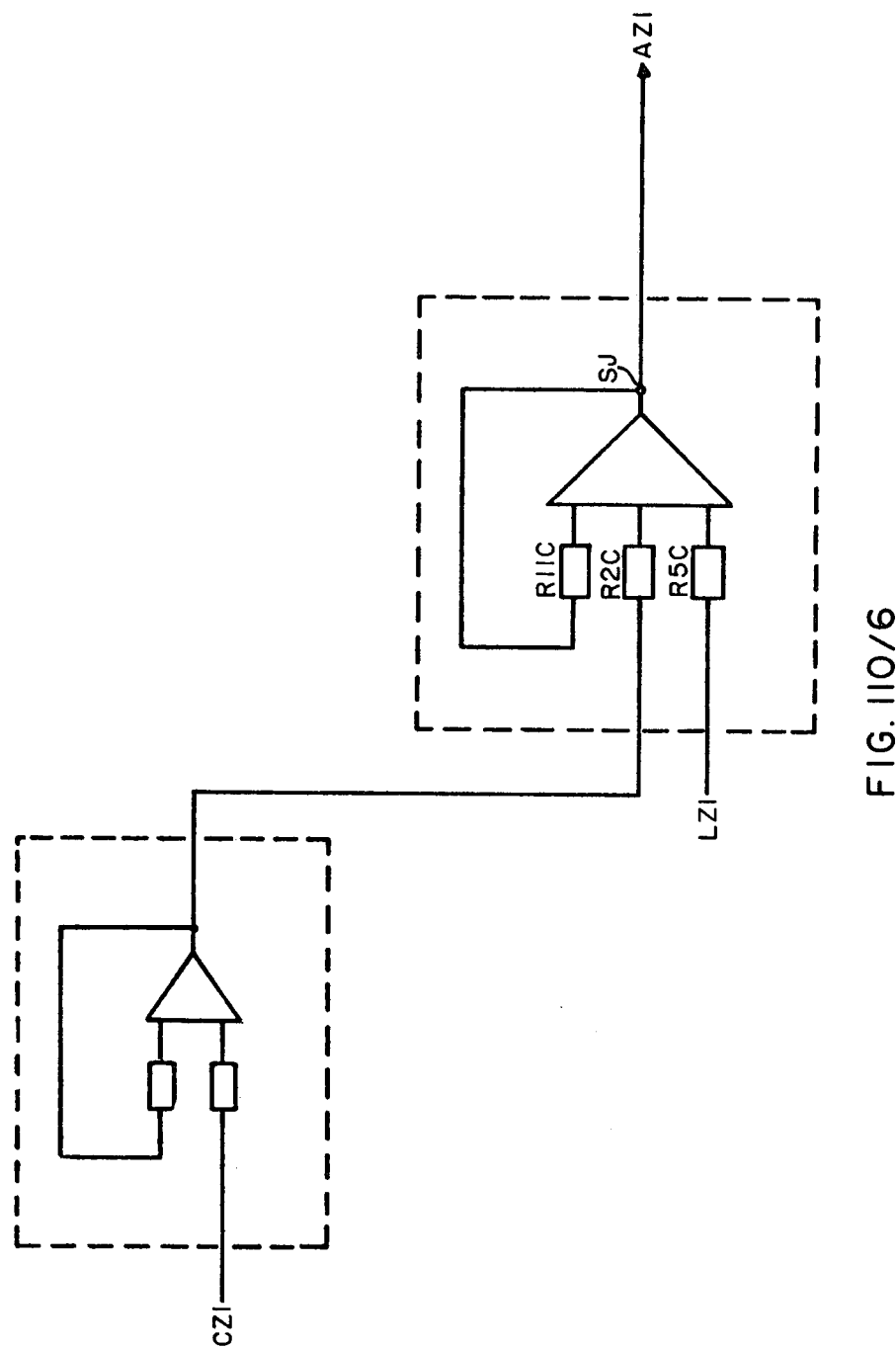

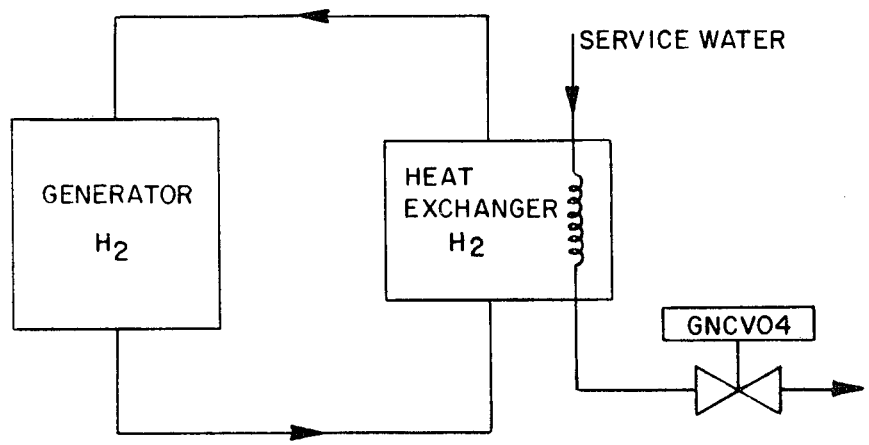
FIG. 112/5
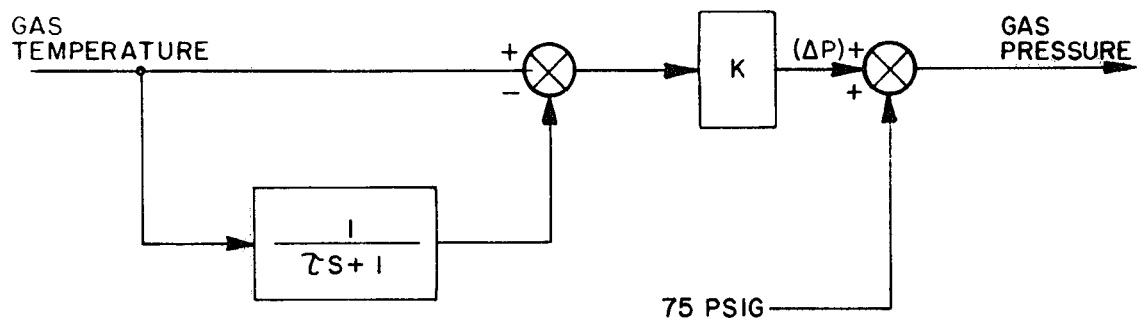
FIG. 112/6

SECONDARY SYSTEM MODELING AND METHOD FOR A NUCLEAR POWER PLANT TRAINING SIMULATOR

This is a continuation of application Ser. No. 335,293 filed Feb. 23, 1973, now abandoned.

CROSS REFERENCE TO RELATED APPLICATIONS

Reference is made to the following concurrently filed and related patent applications which are assigned to the present assignee.

1. Ser. No. 333,901 entitled "Training Simulator For A Nuclear Power Plant" and filed by G. L. Gregg, R. E. Putman and J. W. Gomola on Feb. 23, 1973 in U.S. Pat. Office.
2. Ser. No. 335,286 entitled "Nuclear Power Plant Training Simulator System and Method" and filed by R. W. Ferguson and R. E. Converse on Feb. 23, 1973 in U.S. Patent Office, now Patent No. 3,903,403.
3. Ser. No. 335,295 entitled "Nuclear Power Plant Training Simulator Modeling Organization and Method" and filed by W. H. Alliston on Feb. 23, 1973 in U.S. Patent Office, now Patent No. 3,919,720.
4. Ser. No. 335,181 entitled "Training Simulator For Nuclear Power Plant Reactor Monitoring" and filed by W. H. Alliston, F. R. Czerniejewski and B. A. Mutafelija on Feb. 23, 1973 in U.S. Patent Office, abandoned.
5. Ser. No. 335,288 entitled "Training Simulator For Nuclear Power Plant Reactor Control Model And Method" and filed by F. R. Czerniejewski on Feb. 23, 1973 in U.S. Patent Office, now Pat. No. 3,914,794.
6. Ser. No. 335,294 entitled "Training Simulator For Nuclear Power Plant Reactor Coolant system And Method" and filed by W. H. Alliston and A. A. Desalu on Feb. 23, 1973 in U.S. Patent Office now Patent No. 3,916,445.
7. Ser. No. 335,285 entitled "Engineered Safeguards Systems And Method In Nuclear Power Plant Training Simulator" and filed by A. A. Desalu on Feb. 23, 1973 in U.S. Patent Office, now abandoned.
8. Ser. No. 335,391 entitled "Fluid Distribution Network And Steam Generators And Method For Nuclear Power Plant Training Simulator" and filed by W. H. Alliston, S. J. Johnson and B. A. Mutafelija on Feb. 23, 1973 in U.S. Patent Office, now Pat. No. 3,914,795.
9. Ser. No. 335,183 entitled "Training Simulator And Method For Nuclear Power Plant Heater And Non-Linear Modeling" and filed by B. A. Mutafelija filed Feb. 23, 1973 in U.S. Patent Office now Pat. No. 3,935,885.

BACKGROUND OF THE INVENTION

The present invention relates to the full-scope real-time simulation of the dynamic operation of a nuclear powered electrical generating plant secondary system for training plant operators.

The increasing demand for well trained power plant operators together with the complexity of modern day power plants, has led to the realization that the simulator is the most effective tool for such training.

Also, with advancements in nuclear power plant technology, experienced operators from time-to-time need retraining in order to be competent. An actual nuclear plant cannot provide the operator with the required experience, such as starting up, changing load, and shutting down, for example, except after years of experience; and even then, it is unlikely that he would observe the effect of important malfunctions and be able to take the best corrective procedures.

Although simulators have been used for many years, in power plant design, it is only recently that they have been used for power plant operator training. An article in the July 22, 1968 issue of "Electrical World", entitled "Nuclear Training Center Using Digital Simulation" briefly describes the installation of a boiling water reactor plant simulator. An article in the same publication in the Oct. 6, 1969 issue entitled "Huge Simulator to Ready More Reactor Operators" discusses the proposed installation of a pressurized water reactor simulator. In Volume 10, No. 5 of the publication "Nuclear Safety" published during September and October, 1969 is an article entitled "Training Nuclear Power Plant Operators With Computerized Simulators"; and in the June, 1972 issue of the publication "Power Engineering" there is an article entitled "Simulators" which describes a number of power plant operator training simulators presently in use or proposed.

Design simulators usually cover only a small part of the process, and may run slower or faster than real-time; while training simulators must operate and respond in a manner identical to the actual plant. A design simulator may involve only a narrow range of conditions, while a training simulator must simulate from cold shutdown to well beyond normal operating conditions. A design simulator usually involves only the major process, while a training simulator should cover every auxiliary system with which the plant is concerned.

Further, the full-scope simulation of a nuclear power plant for operator training is of such extensive scope that it is advantageous to provide as many modeling simplifications as possible within the limits of steady-state and transient accuracy. The mathematical modeling of a nuclear power plant is concerned with material, energy and volume balances, which often result in mathematical variables such as temperatures, pressure, material flows and flow rates, concentration of materials, specific volumes and enthalpies, mechanical speeds, vibrations, electrical current, voltage and frequency, etc.

Training simulators presently in use for operator training, which are more or less complete in their simulation utilize a digital computer that is connected to control consoles that are identical in operation and appearance to the plant being simulated. Also, an instructor's console is connected to control the simulator, introduce malfunctions, initialize the simulated plant at selected states of operation, and perform other functions useful for training purposes and control of the simulator. These computers have been of the same type used for aircraft training in some instances and process control in others.

The secondary portion of the power plant which is concerned with steam generation, turbine operation, and power output is a closed system that involves many operational situations. In order to have an accurate simulation under all conditions of operation, it should take into consideration every cause and effect that relates to actual plant operation.

For example, the reheaters that remove moisture and heat the steam after it exhausts from the high pressure turbine, should be simulated in such a way that the temperature control and safety valve for the reheater can be also simulated.

The actual plant being simulated includes a turbine electro-hydraulic controller that responds to plant operation to control steam admitting valves to the turbine. The electro-hydraulic controller should be simulated to be functionally identical regardless of the repetition rate of the computer time steps, and to correlate the controller simulation with the turbine simulation in the most economical manner.

Also, the governor valves controlled by the electro-hydraulic controller should be simulated to account for the effects of choked-flow; that is, where the pressure upstream of the valve is a predetermined amount higher than the pressure downstream of the valve.

Further, a steam turbine is subject to what is termed "windage loss", that is, a loss of shaft power, caused by the counteraction of large turbine blades against a fluid under conditions of low steam flow, for example. In order to provide a complete simulation of dynamic operation, it is desirable to simulate this windage loss.

The condenser, which is an actual plant may at times include air that is detrimental to condenser efficiency, and is symptomatic of other conditions, should be simulated so that the effect of such air is included in the dynamic calculations.

The condensate and feedwater system portion of the secondary system pumps water from the condenser hot well and the heater drain tank to the secondary side of the steam generators. Numerous valves are included that can control and divert the various flows. Condensate pumps and heater drain pumps supply the feed pumps. The feed pumps have an extremely large capacity and provide a major amount of the system's pressure increase. A non-linear solution in the simulation of a network of this type requires a solution of numerous non-linear equations which could occasionally be unstable and require an iterative technique with an uncertain solution time and perhaps nonconvergence. For real-time simulation, a method and system for simulating the feedwater system must be assured, reasonable, and predicatable. For such a simulation, a linear approximation of the system permits the combining of admittances and pressure sources and permits a non-iterative simultaneous solution of the simulation equation.

The pumps in the system must be simulated over their entire operating range, which is non-linear. However, such non-linearity can be simulated by multiple linear approximation. Multiple linear approximations provide accurate representation and still allow the advantages of linear equations. The correct linear approximation can be selected during simulation execution according to pump flow and speed.

Further, the gland steam seal system that seals the shafts of the high and low pressure turbines and the generator cooling system, which cools the main generator with hydrogen, should be simulated in such a manner that they do not consume an inordinate amount of calculation time and in a simple and stable manner.

SUMMARY OF THE INVENTION

According to the broad principles of the present invention, a method and system for the real-time simulation for training purposes of the dynamic operation of a nuclear power plant including a secondary system having a steam turbine, reheaters, turbine controller, condensate and feedwater system with non-linear pumps, condenser, and auxiliary systems, utilizes apparatus wherein a control console with a plurality of manually operable devices to provide input data and automatic devices respond to simulated physical values to provide input data, and a plurality of indicating devices to respond to output data. A computer calculates physical values corresponding to system operation in accordance with the input data to provide output data for operating the indicating devices. The simulation of the secondary system is characterized by a linear network solution which permits the simultaneous solution of flow equations in combination with pumps having non-linear characteristics.

In another aspect, the method and system includes the simulation of the secondary system reheaters to include the temperature controller and safety valve, which simulation is broadly characterized by calculating a data value depending on heat transfer for coupling the shell and tube side of the reheaters.

In still another aspect, the secondary system steam turbine is simulated to include the effect of windage loss, which is broadly characterized by calculating a data value depending on net power of the simulated turbine in accordance with data values depending on turbine speed and steam inlet flow and density of steam in the condenser.

In still another aspect, the analog electro-hydraulic controller for the steam turbine is simulated, which is broadly characterized by an analog circuit means that converts a demand signal of the actual controller to a valve position signal and limits the velocity of the simulated valve operation to respond in real-time; and the simulation of the governor valves includes a linearization of choked flow conditions.

In still another aspect, the secondary system condenser is simulated to include the effect of air leakage in the condenser, which simulation is broadly characterized by calculating an energy balance on the steam only, on the assumption that all steam is condensed to obtain a data value depending on steam enthalpy to eventually calculate the data value depending on partial pressure of steam; and the data value depending on partial pressure of air is obtained by calculating data values depending on condenser volume, condenser air mass, and condenser steam temperature.

In yet another aspect, the secondary system gland steam seal system is simulated, which is broadly characterized by simulating a network for the high pressure turbine and one for the low pressure turbine, and calculating a data value depending on supply steam pressure to the high pressure turbine in accordance with a data value depending on a constant total admittance of the low pressure simulated network.

In another aspect, the secondary system generator cooling system is simulated, which is broadly characterized by calculating data values depending on the pressure of the gas cooling medium by a derivative lag circuit that changes gradually the effect of gas temperature on pressure in a predetermined time according to amount of deviation from maximum.

In a final aspect, the method and system is characterized by a secondary system simulation that utilizes the resultant physical values contained herein with respect to their effect on the interconnected portions of the simulated plant.

BRIEF DESCRIPTION OF THE DRAWINGS

FIG. 103/5 illustrates schematically the simulation involved with the moisture separator;

FIG. 103/6 is an analogous electrical network for the simulation of the low pressure turbine;

FIG. 103/7 is a graphical representation of the simulation for the assumed vacuum correction curves;

FIG. 103/8 is a graphical representation of the curves for vacuum loss load correction in the simulation;

FIG. 104/1 is a graphical representation of the percentage of air versus ideal heat transfer coefficient in the simulation of the condenser;

FIG. 104/2 is a graphical representation of the relationship between a factor for gland steam leakage admittance and gland steam header pressure for the condenser simulation;

FIG. 105/1 is an analogous electrical network of the feedwater system simulation;

FIG. 105/2 is a graphical representation of the pump head characteristics using three straight line segments in the simulation of the main feedwater pumps;

FIG. 105/3 is an analogous electrical network to illustrate the technique for connecting two non-ideal sources to a system load to illustrate round off error;

FIG. 105/4 is a graphical representation of pump head versus flow illustrating the manner of simulating the calculated versus actual break points in pump simulation;

FIG. 105/5 is a graphical representation of a valve simulation where the representative flow coefficient is calculated in the simulation;

FIG. 105/6 is an analogous electrical network for simulating the connection of feedwater heater strings to individual pumps;

FIG. 105/7 is an analogous electrical network illustrating the use of one equivalent pump in the simulation;

FIG. 107/1 is an analogous electrical network of the Forebay level of the circulating water system simulation;

FIG. 107/2 is the analogous electrical network utilized in simulating the circulating water system;

FIG. 109 is a schematic diagram of the gland seal system that is simulated in accordance with the present embodiment of the invention;

FIG. 109/1 is the analogous electrical network for the valves and piping to reduce the main steam header pressure utilized in the simulation;

FIG. 109/2 is an analogous electrical network for the valves and piping that maintain the required pressure utilized in the simulation;

FIG. 110/1 is a flow diagram of the overspeed protection controller of the system being simulated;

FIG. 110/2 is a functional block diagram illustrating the simulation of the electrohydraulic controller for the steam turbine;

FIG. 110/3 is a schematic diagram of the analog circuitry utilized in the simulation diagram of FIG. 110/2;

FIG. 110/4 is a schematic block diagram of the simulation of the controller and steam flow for the steam turbine;

FIG. 110/5 illustrates diagrammatically the manner of simulating the overall gain of the electrohydraulic controller;

FIG. 110/6 is the schematic representation of the implementation of the diagram of FIG. 110/5;

FIG. 112/5 is a block diagram of the generator hydrogen system in the system being simulated;

FIG. 112/6 is a functional diagram of the calculation utilized in simulating the system illustrated in FIG. 112/5.

GENERAL DESCRIPTION OF SIMULATED NUCLEAR POWER PLANT

Figure 1:
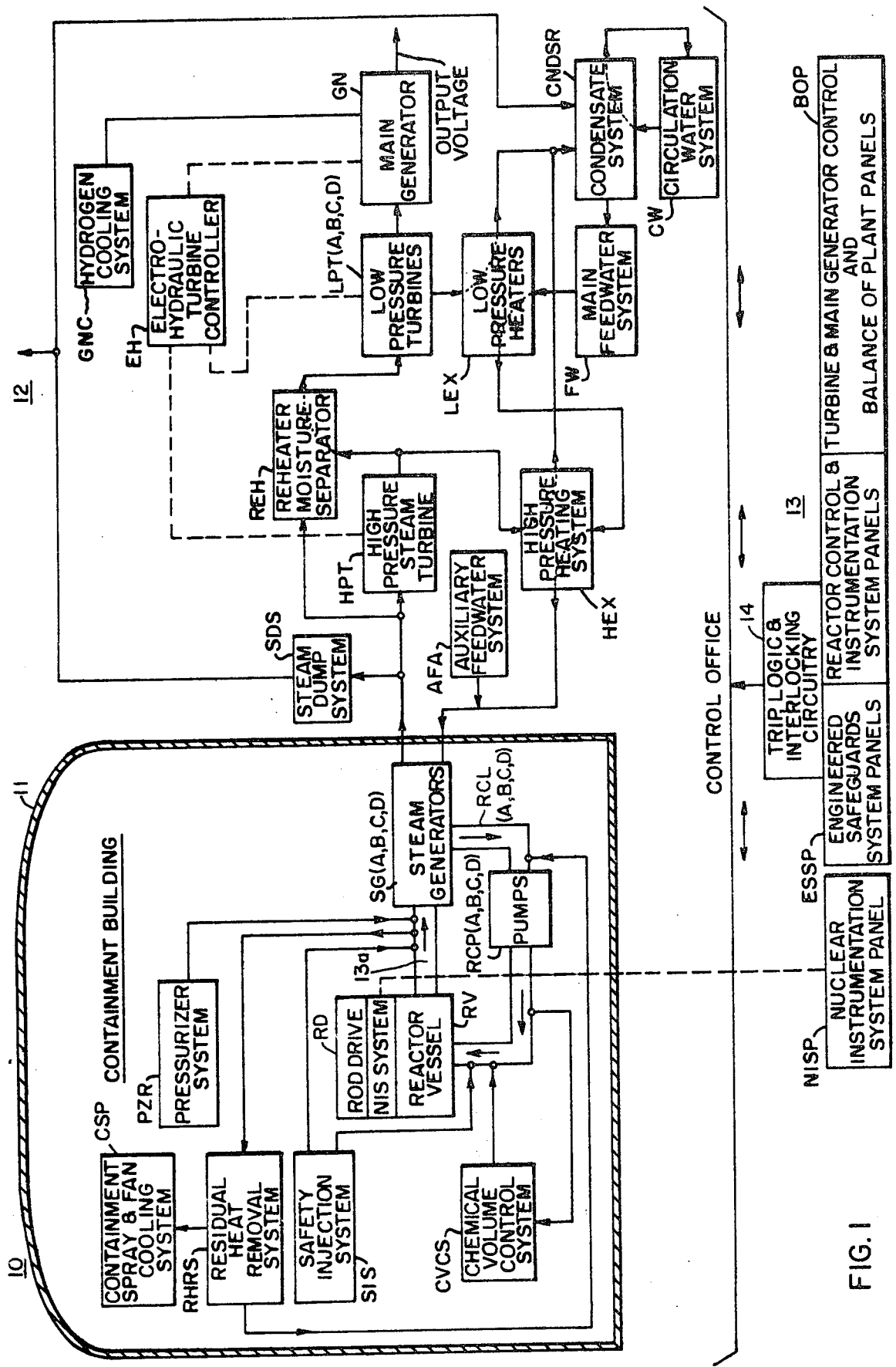
FIG. 1 shows a schematic block diagram of a nuclear powered electrical generating plant that is simulated in accordance with the present invention.

Referring to FIG. 1, the preferred embodiment of the invention is described in connection with the simulation of a nuclear power plant, in this case a four loop pressurized water reactor power plant. Such a plant includes a primary system generally referred to as 10 which is housed in a containment building 11, a secondary system, generally referred to as 12, and a control office that includes control and indication panels 13 for operating and monitoring the various elements in the power station. The plant itself is described herein in a general sense to an extent which will aid in understanding the invention. More detail on the plant is ascertainable from the more detailed invention description herein. Extensive background information on nuclear plants of various kinds is widely available in prior patents and publications. Certain invention features are applicable to nuclear plant types other than the pressurized water type.

The primary system includes a nuclear reactor housed in a reactor vessel RV and in this instance four closed reactor coolant loops RCL (A, B, C, and D), connected in parallel to reactor vessel RV. Each loop contains a reactor coolant pump RCP (A, B, C, and D) and a steam generator SG (A, B, C, and D). The reactor vessel RV, reactor coolant loop piping RCL, pumps RCP, and primary side of steam generators SG, all form what is referred to as a reactor coolant system RCS. The primary system 10 also includes an electrically heated pressurizer system PZR and certain auxiliary system hereinafter described.

High pressure water circulates through the reactor vessel RV to remove the heat generated by a nuclear chain reaction within a fuel arrangement disposed in the reactor. This heated water exits from the reactor vessel RV and passes via the coolant loop piping RCL to the steam generators SG. In the steam generators SG, the coolant water gives up its heat to the feedwater in the secondary side of the steam generator SG to generate steam for a turbine driven electrical generator GN. The reactor coolant cycle is completed when the coolant is pumped back to the reactor vessel RV for reheating in the nuclear reactor.

Rod drive system RD is used to control reactor power level and consists of clusters or banks of movable cylindrical neutron absorber rods. The absorber rods move within guide tubes in certain fuel assemblies in the reactor fuel arrangement. The reactor coolant pumps RCP are vertical single stage mix flow pumps of the shaft seal type; and are designed so that adequate coolant flow is maintained to cool the reactor core adequately under all conceivable circumstances. The steam generators SG are vertical U-tube units that contain integrally therewith, in the secondary side, moisture separation equipment that reduces the moisture content of the steam to one-quater percent or less. The electrically heated pressurizer PZR connected to one of the four reactor coolant loops RCL maintains the reactor coolant system RCS pressure during normal operation, limits the system coolant pressure variation during plant load transients, and keeps the system coolant pressure within design limits during abnormal conditions.

The reactor operating level is controlled inherently by a negative temperature coefficient of reactivity of the water; by control rod cluster positioning as already indicated; and by a soluble neutron absorber, such as boron in the form of boric acid. The boric acid is inserted into the coolant during cold shutdown, partially removed during startup, and adjusted in concentration during the lift time of the fuel in the core to compensate for such effects as fuel consumption, and accumulation of fission products, which tend to slow the nuclear chain reaction.

The primary system includes engineered safeguard systems, ESS including chemical and volume control system CVCS, safety injection system SIS, residual heat removal system RHRS, containment spray and fan cooling system CSP, and an accumulator discharge system (not shown) which is described in detail in connection with the description of the individual models.

The chemical and volume control system CVCS performs a number of functions, such as filling the reactor coolant system RCS, providing a source of high pressure water for pressurizing the system RCS when cold, maintaining the water level in the pressurizer system PZR when the RCS system is hot, reducing the concentration of corrosion and fission products in the reactor coolant, adjusting the boric acid concentration of the reactor coolant, and providing high pressure seal water for the seals of the reactor coolant pumps RCP.

The residual heat removal system RHRS portion of the engineered safeguard systems ESS transfers heat energy from the reactor core and the system RCS during plant shutdown and refueling operations. Components in the residual heat removal system RHRS are also employed in conjunction with the safety injection system SIS.

The safety injection system SIS supplies borated water to the system RCS to limit the fuel rod cladding temperature in the unlikely event of a loss of coolant accident. Also, the system SIS functions to provide a means of introducing a spray of borated water into the containment 11 as an additional dynamic heat sink. The system SIS includes several independent subsystems characterized by equipment and flow path redundancy. This redundancy assures complete reliability of operation, and continued core cooling even in the event of a failure of any single component to respond actively as intended. For example, during the passive accumulator injection phase of the system operation which is described in connection with the individual models, accumulator tanks rapidly inject borated water into the reactor coolant system automatically when the depressurization of loops RCL causes a reversal of the pressure drop across the accumulator check valves. The accumulators provide rapid cooling of the reactor core for large breaks which would otherwise result in core uncovering and overheating before the electrically driven low head safety pumps of the SIS system are energized and delivering coolant. The low head system of safety injection provides for injection of borated water into the RCL loops for large breaks, which would result in rapid blowdown and depressurization. A high head system for injection into the loops RCL for small breaks is provided for those instances that would result in slow blowdown and depressurization. The low head system utilizes pumps of the residual heat removal system RHRS which takes water from a refueling water storage tank, and pumps borated water through one of the residual heat exchangers, through an injection header and injection lines to each of the reactor coolant loops. The high head safety injection phase utilizes two subsystems which provide extremely rapid response to an SIS system actuation signal, utilizing a boron injection tank and a charging pump of the chemical and volume control system CVCS.

The containment building 11 completely encloses the entire primary system and insures that an acceptable upper limit for leakage of radioactive materials to the environment is not exceeded, even if gross failure of the elements contained therein were to occur. The containment spray system CSP is included in the primary system to limit the pressure in the containment atmosphere to below the containment design pressure, and remove sufficient iodine from the containment atmosphere to limit the radiation doses to safe value. This system delivers NaOH to the space within the containment building 11. The reactor containment fan cooling system portion of CSP which is also part of the containment building monitoring system removes heat from the containment building during normal operation, and during any loss of coolant accident. When a loss of coolant accident is sensed, the fan motors are automatically switched to low speed to provide circulation of the steam-air mixture in the containment building.

The steam generators SG (A, B, C, and D) deliver steam at appropriate pressure and temperature in the secondary system for conversion to mechanical and then to electrical energy in the turbines and the generators, respectively. The secondary steam is additionally used for various operational auxiliary services such as turbine shaft steam seals, turbine drives for main and auxiliary feedwater pumps and steam jet air ejectors.

Steam is admitted to a double flow high pressure turbine HPT that is controlled by governor valves with quick acting throttle or stop valves ahead of them for rapid isolation in an emergency. Four separate pipes convey steam from the governor valves to the turbine nozzle chambers. The steam passes through an impulse blading or control stage and a number of reaction stages of the high pressure turbine HPT; the impulse chamber steam presure is measured and used as a load measurement for use in reactor control.

On leaving the last row of high pressure blades, the steam has a moisture content of approximately 10%. Thus, the steam is then passed through a moisture separator and reheater REH to improve the turbine efficiency and reduce the low pressure turbine exhaust moisture. The exhaust steam from the high pressure turbine when first passed through the moisture separator portion REH removes approximately 10% of the flow which is extracted as moisture. The remaining 90% flows through steam heated reheater portion of REH where it receives approximately 100° F superheat. The moisture is removed and drained to a heater drain tank (not shown); and the steam which rises above the moisture separator passes over the reheater and is reheated by live steam.

The hot reheated steam is conveyed to the double flow low pressure turbines LPT (A, B, C) the number of which in use can depend on the electrical output required. The low pressure turbine exhaust directs the steam to a condenser CNDSR that has cooling water passing through tubes which condense the steam to water where it is collected in a chamber, called a hot well. The condenser cooling water is controlled by circulating water system CW. The condensate system CNDSR and the feedwater system FW return the condensed steam from the turbine condenser, and the drains of the regenerative feed heating cycle, to the steam generators SG (A, B, C, and D) while maintaining the proper water inventories throughout the cycle.

The feedwater system FW conveys the feedwater through low pressure heaters LEX and then through high pressure heaters HEX to the generators SG. The auxiliary feedwater system AFA is used when the main system is inoperative. These systems automatically maintain the water level of the steam generators SG during both steady-state and transient operation.

The turbine HPT is equipped with an electrohydraulic control system EH comprising a solid state electronic controller and a high pressure fluid supply. The electronic controller computes a control signal based on measured turbine speed, measured first stage steam pressure, and speed and loss reference values established by the dispatcher or initiated at the operator's control panel 13. The control signal is transmitted to the electrohydraulic actuator of each main steam throttle and/or governoring valve to produce the valve positioning needed to meet the reference load. During turbine startup, the throttle valves are position controlled to accelerate the turbine from turning gear or higher speed up to synchronous speed. The high pressure hydraulic fluid system provides the power for all turbine steam control valves, electrohydraulic actuators, and positions the governor valves in response to the electric control signals from the electronic controller. The interceptor valves are also operated by the hydraulic fluid, and they may be position controlled or simply controlled to be either open or closed.

The electrohydraulic control system provides turbine control during all phases of operation by varying the turbine valve openings. Hydraulic cylinders move the valves to the required opening with electrically operated servo-valves controlling the cylinder's position.

The main generator GN operated by the turbine is a hydrogen inner cooled synchronous generator with a water cooler stator and an output voltage of approximately 22 to 25 kV at 60 cycles. The excitation is provided by a shaft driven air cooled brushless exciter. Cooling for the generator is provided by system GNC which circulates hydrogen at a pressure of about 75 psig through the generator GN by fans attached to the generator shaft.

Various plant parameters including reactor parameters, coolant and steam pressures, temperature, and flows and liquid levels in the various systems, as well as the speed of the turbines and electrical output of the generator are sensed and displayed through meters, alarms, and annuciators on the central office panel 13.

Among the reactor parameters the position of the rods of the reactor and the state of all operable components are displayed to inform the operation of the condition or state of operation of the nuclear power plant.

The state of operation of the various components of the plant and certain fluid pressures, temperatures, and levels are connected through interlocking and logic circuitry 14 to prevent unsafe operation of selected system components and to trip or shut down the plant under abnormal conditions.

Nuclear instrumentation panel NISP is provided with various recorders, indicators, meters, and selector switches to display the neutron flux values in various sectors of the reactor, both in an axial and radial direction, which function is termed in-core flux mapping.

Also, a portion of the panel NISP displays through meters the flux in various sectors of the reactor vessel RV to inform the operator of the various ranges of nuclear flux, such as source, range, intermediate range, and power range of the reactor during start-up and shutdown, which operation is termed ex-core radiation detection. Further, the temperature of individual fuel rods of the reactor, and the radiation in various parts of the plant are monitored and displayed on the panels NISP. Finally, the auxiliary power to the plant is controlled by a portion of the panel NISP.

GENERAL DESCRIPTION OF SIMULATOR CONFIGURATION

The nuclear power plant simulator according to one embodiment of the invention comprise digital computation apparatus and peripheral equipment operatively connected to control and indication panels which are identical in appearance and wiring to the actual control and indication panels of the four loop pressurized water reactor power plant that is simulated. The general function, structure, and operation of digital computers is set forth in a publication entitled "Electronic Digital Systems" by Mr. R. K. Richards, which was published in 1966 by John Wiley and Sons, Inc. and bears the Library of Congress card catalog number 66-17618, to which reference is made for a detailed description thereof in order to aid in an understanding of the apparatus and methods in carrying out the invention.

Figure 2:
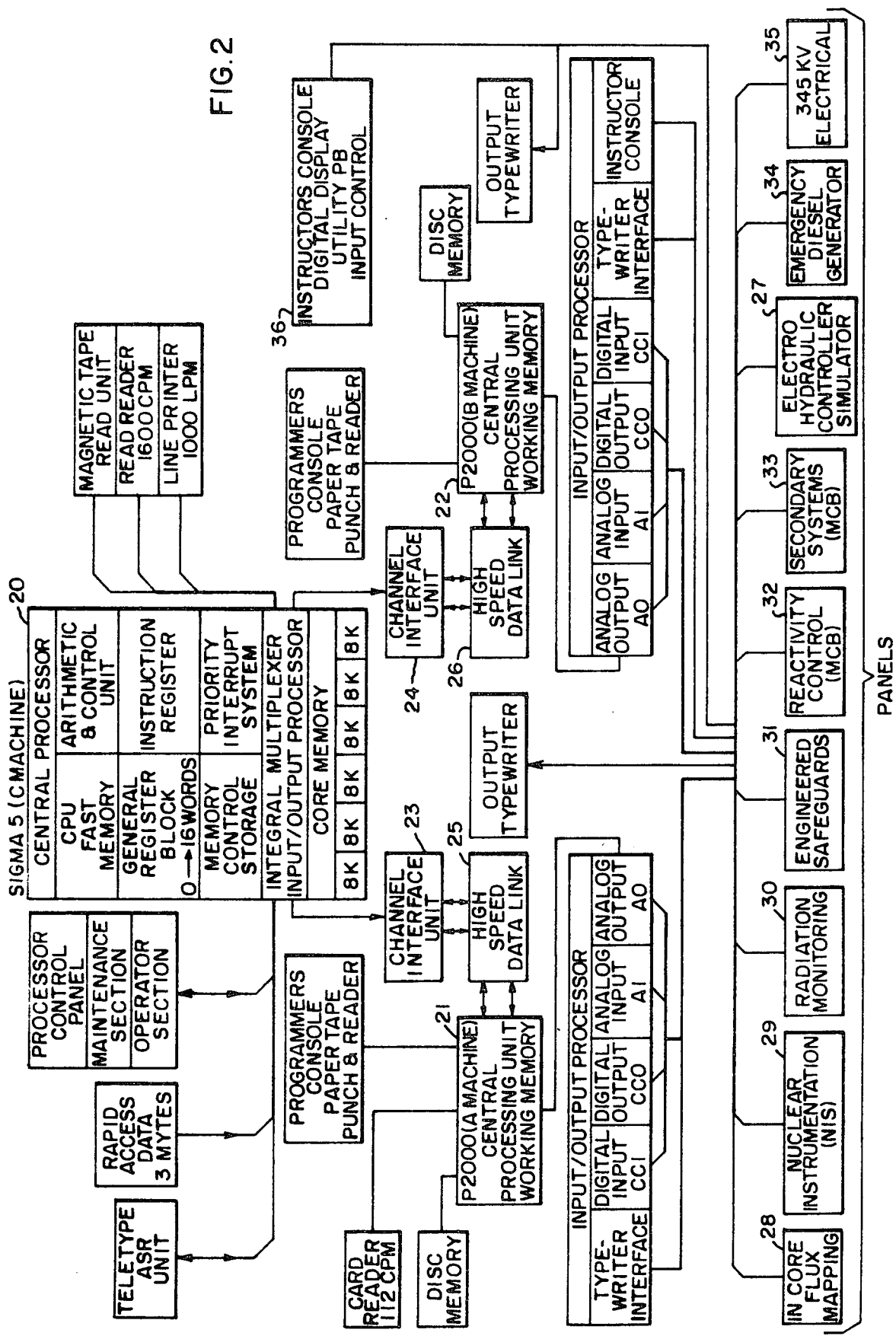
FIG. 2 shows a schematic block diagram of the apparatus used in simulating the operation of the plant shown in FIG. 1.

Specifically, and referring to FIG. 2, the simulation system includes a Sigma 5 digital computer 20 referred to at times in this specification also as the C machine and associated peripheral equipment. The Sigma 5 computer system is manufactured and sold by Xerox Data Systems, Inc. and has been in general use for over one year prior to the filling date of this application. For more information on the Sigma 5 computer system reference is made to the appendix.

The simulator also includes digital computers 21 and 22 referred to at times hereinafter also as the A machine and B machine, respectively and associated peripheral equipment of the type manufactured and sold by Westinghouse Electric Corporation, and which is known as model P2000, and which computers have been in general use for over one year prior to the filing date of this application. The P2000 digital computers 21 and 22 are described in a publication entitled "Prodac 2000 Computer Systems Reference Manual" copyrighted in 1970 by Westinghouse Electric Corporation and bears copyright Registration No. A244775, to which reference is made to aid in an understanding thereof.

The Sigma 5 computer, or C machine provides an extensive arithmetic capability for the power plant simulator. The computers 21 and 22, act as process input/output controllers for the C machine. In practicing many features of the invention, a single computer or other multiple computer arrangements may be employed.

Communication between the A, B, and C machines is provided by a combination of the Xerox Data Systems Model 7650 channel interface units 23 and 24, and high speed data link devices 25 and 26 respectively, described more fully hereinafter. The C machine provides the software control and synchronization for the multiple computer configuration involving the A machine, B machine, and C machine; and the A and B machines in addition to providing the process input/output capability for the C machine also provide a capability for instantaneous simulator responses through their external interrupt system, the processing of all interlock and protection system logic, and the processing of several employed in the simulator models, such as a reactor control rods program. The significant hardware features associated with each of the A and B machines as shown in FIG. 2 included in the appendix. The major C machine hardware subsystems illustrated in FIG. 2 and utilized in the present embodiment of the invention are also included in the appendix to this specification.

The simulation of the electrohydraulic control system EH as depicted in FIG. 1 and represented by a simulator panel portion 27 of FIG. 2 is accomplished in part by the actual analog electrohydraulic controller manufactured and sold by Westinghouse Electric Corporation, which has been in use for more than a year prior to the filling date of this application. The panels 27 through 35 in FIG. 2 provide the same outward appearance and operation as panels in an actual plant and are connected directly through appropriate computer system equipment to the A machine and the B machine.

Instructor's console 36, which provides the control facility to start, stop and manipulate the simulator is connected to software in the B machine.

A basic real time batch monitor (hereinafter referred to as RMB) software system of the C machine is a two partition system designed for normally running simultaneously foreground and background programs. The foreground programs include the system software extension programs which are made up of a sublevel processor, data link handler, and disc handler. Such foreground programs also include data conversion routines, and various dynamic models for the simulated systems, which include reactor models, primary system models, secondary system models, a valve handler routine, a pump handler routine, and a controller handler routine. In order to permit an economy in core memory requirements, in the present embodiment of the invention the foreground programs and the background programs are not run at the same time.

CONTROL PANELS

In controlling an actual nuclear power plant of the type being simulated, the individual control devices such as selector switches, levers, and pushbuttons close contacts to select certain components for operation, to energize motor operated valves, solenoids, and relays; and through a protective system of logic to select, or change the position or condition of various components for starting up, varying operation, shutting down, providing emergency measures in the event of malfunction, and testing components in subsystems of the plant. In addition, certain plant components or subsystems function in automatic control loops to which there are typically applied one or more monitored plant variables as feedback signals.

In monitoring the operation of an actual plant, temperature, pressure, flow, level, flux, and other physical measurements are detected by appropriate sensing devices which transmit such information to the control panels for operating meters, recorders, and indicators. As already indicated certain monitored variables are also used for control.

In realistically and accurately simulating the control and monitoring of a nuclear power plant in accordance with the present embodiment of the invention, such control panels together with the control and monitoring devices are an exact replica physically and operatively, of the plant being simulated. However, in simulating the system in accordance with the present embodiment, the control and monitoring devices of the control panels are wired to each other, and to turbine EH controller; and also to contact input and contact output terminals, respectively, on the A or B machines. The panel interface logic and the plant protective logic are contained in both the A and B machines as hereinbefore mentioned. The control consoles permit the student operator to control and monitor the operation of the plant in the same manner as the operator of an actual plant. For example, he can start up, increase the power, shut the plant down, and restart. At any time the instructor can change physical values or malfunction the models as previously described. Then the operator can change the operation of the plant to correct the malfunction or introduce emergency measures as required. The student is able to see realistically in real-time the consequences of any action that could be taken in the real plant.

In detailed drawings of the control panels, descriptive legends are associated with appropriate control and monitoring devices in a manner similar to an actual installation; and in addition thereto, software symbols in many instances are used to identify specific control panel devices with the same software symbol being used to identify the component being operated by such devices in the schematic diagrams of the actual system being simulated. In other instances, the actual valve number is used to the schematic diagram and the control panel where it will aid in understanding the simulation of the system.

REHEATER-MOISTURE SEPARATORS

Figure 103:
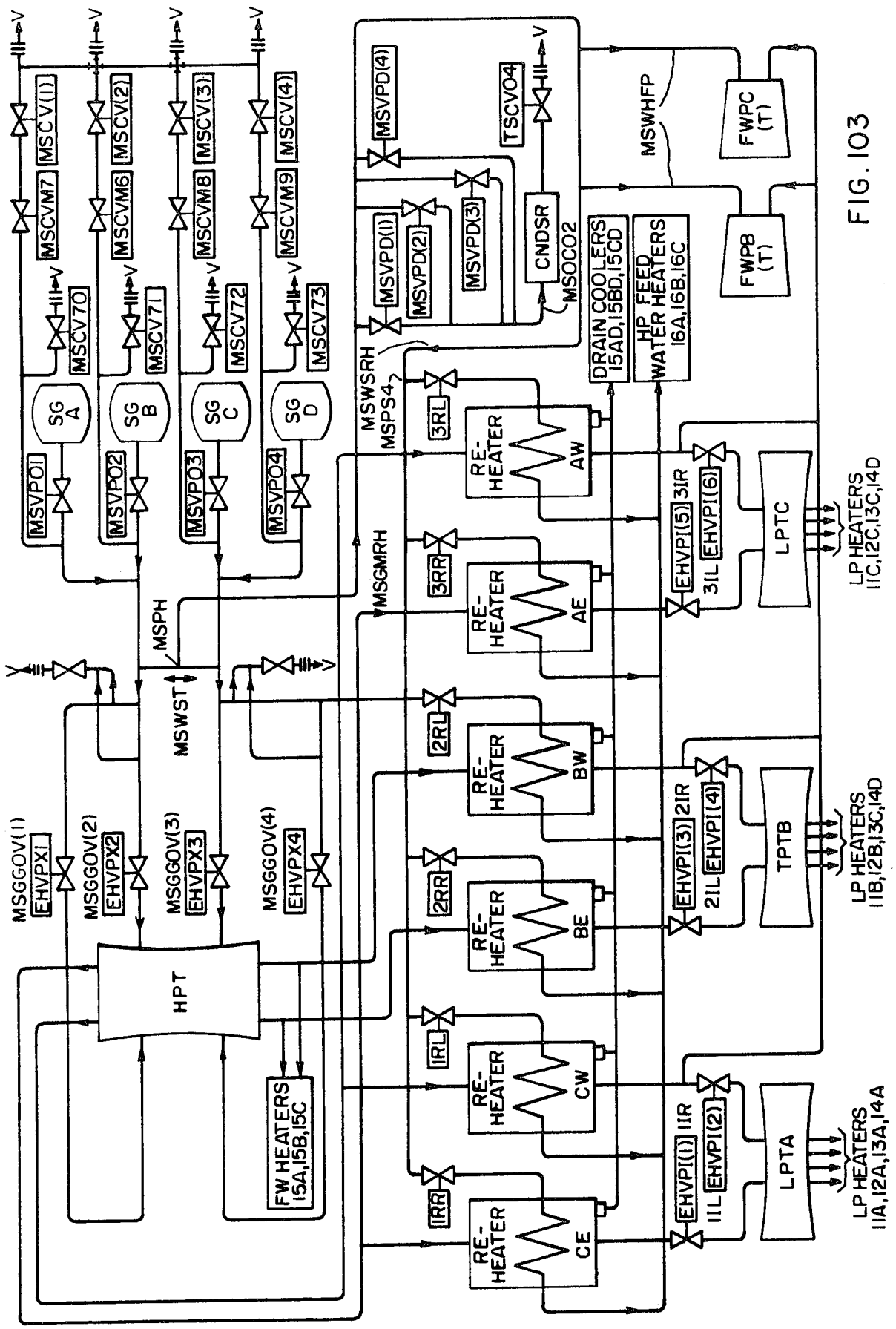
FIG. 103 is a schematic diagram of the main stream system of the type being simulated.

Referring to FIG. 103, after the steam passes through the high pressure turbine, it is conveyed directly to six reheater and moisture separators AE, AW, BE, BW, CE, and CW. The wet steam enters the reheater shells and flows through the shell where moisture is removed from the wet steam, and it then passes over the tube bundle; becomes superheated, and continues out of the reheater into the three stages of the low pressure turbine 1A, 1B and 1C. The steam entering the reheater from the high pressure turbine is termed cold reheat steam and the steam leaving the reheaters to the inlet of the LP turbines is termed hot reheat steam. The only valves in the cold and hot reheat steam lines are the intercept valves EHVP(1) to (6) at the inlet to the LP turbine stages. Hot steam is conveyed to the tube side of the six reheaters directly from the steam generators SG(A), SG(B), SG(C), and SG(D) to provide the thermal energy for reheating the cold reheat steam, and it then exhausts to the steam side of the high pressure feedwater header 16A, 16B, and 16C to provide thermal energy needed for heating the feedwater.

REHEATER SIMULATION (RHMSEP)

In simulating the six reheater and moisture separators, a single equivalent reheater moisture separator is preferably used in the model T46. The moisture separation process is assumed to yield the desired quality of steam and perform its function isotropically. An instantaneous energy balance on the cold reheat steam, and an instantaneous energy balance on the live steam are calculated. The cold reheat steam mass balance is maintained in order to determine the specific volume.

The simulated reheater is capable of reacting to a warm-up of the plant from a cold condition, a closure of any one or more of the intercept valves in the line to the three stages of the low pressure turbines, and a partial or zero live steam flow direct from the steam generators.

The inputs to the simulation RHMSEP include the cold reheat steam inflow SGWMS which is calculated in the subroutine STMGEN; and the hot reheat steam outflow LPW1 which is calculated by the low pressure turbine simulation in the subroutine RHMSEP.

The outputs of the reheater moisture simulation include the reheater pressure REPS, the reheater hot steam exit enthalpy REH4, and the hot reheater steam exit temperature RET4.

Referring to FIG. 103/5, the cold reheat steam flow REW6 to the moisture separator is calculated by the main steam flow network calculation previously described. The enthalpy of the high pressure turbine exhaust HPH3 is simulated as a constant which may be 1110 Btu's per pound for example. Thus, since the moisture separation portion of the eqivalent reheater is assumed to be 100% efficient and the separation to be isentropic, then the total steam flow REW6 into the moisture separator is equal to the steam flow REW2 from the moisture separator to the reheater plus the flow REW5 to the drain coolers. Thus, the product of REW6 and the inlet enthalpy constant 1110.0 is equal to the product of the flow and enthalpy from the moisture separator to the reheater plus the flow REW5 and enthalpy REH5 to the drain coolers. The enthalpies to the moisture separators and to the drain cooler (REH2 and REH5), respectively are the enthalpies of dry steam and pure water respectively. The exhaust enthalpies REH2 and REH5 are a function of the known reheater steam pressure REPS; thus, the above relationships can be solvent for the flow REW2 to the reheater and the flow REW5 to the drain coolers.

The flow of the hot reheated steam REW4 from the reheater is the sum of the steam flow to the low pressure turbine and the flow FPWST to the feedwater pump turbine header. The flow LPW1 is calculated by the low pressure turbine flow network; and the flow FPWST is calculated in the feed pump efficiency calculation. In the actual system being simulated, the flow to the feedwater pump turbines is obtained from the hot reheat steam of the reheater moisture separators when the plant power level is greater than 25%.

A mass balance equation is maintained on the equivalent reheater which balance is based on the inflow and outflow REW2 and REW4, respectively, and the response to the reheater safety valve. If the pressure in the shell side of the reheater exceeds 225 pounds per square inch absolute for example, the mass of steam REMS in the reheater is set equal to the mass of steam at 225 psia.

From the mass of steam REMS, the specific volume RESS is then calculated.

An instantaneous energy balance on the cold reheat steam will provide the average reheater enthalpy REHAVG. Since the specific volume REMS and the enthalpy REHAVG of the steam are known, the pressure REPS and temperature RETAVG are determined. It is known that superheated steam behaves in a similar manner to an ideal gas; thus the ideal gas equation can be modified as follows to yield accurate results:

$$PV = RT$$

$$PV = K_1(\text{REHAVG} + K_2)$$

To obtain temperature RETAVG, a plot of the superheat region shows that for any constant specific volume, the relation between temperature and enthalpy is a straight line in accordance with the following equation:

$$\text{REHAVG} + f_2(v)$$

The functions $f_1$ and $f_2$ are spline fits that determine the straight line approximation for any specific volume RESS. An instantaneous energy balance on the cold reheat steam yields a differential equation which can be solved for the exhaust enthalpy REH2 as follows:

$$\dot{Q}_{IN} + \Sigma \dot{w}h = (\dot{M}h_{avg}) = \dot{M}h_{avg} + M\dot{h}_{avg}$$

$$\dot{Q}_{IN} + W_2h_2 - W_4h_4 = (W_2 - W_4)h_{avg} + M\dot{h}_{avg}$$

$$\text{since } h_{avg} = \frac{h_2 + h_4}{2}$$

$$\dot{h}_{avg} = \frac{\dot{h}_2 + \dot{h}_4}{2}$$

$$\text{Thus } \dot{Q}_{IN} + W_2\left[\frac{h_3}{2} - \frac{h_4}{2}\right] - W_4\left[\frac{h_4}{2} - \frac{h_2}{2}\right]$$

$$= \frac{m}{2}\left[\dot{h}_4 + \dot{h}_2\right] \frac{2}{m}\dot{Q}_{IN} + \frac{(W_2 + W_4)}{2}\left[h_2 - h_4\right] - \dot{h}_2 = \dot{h}_4$$

The enthalpy REH2 or as stated in the above equation $h_2$, is obtained by a differencing of the present value of REH2 with the past value REH20(OH).

An instantaneous energy balance on the live or hot reheating steam results in a differential equation which can be solved for the enthalpy of the condensed water REH3. The temperature of the condensing steam which is the cold reheat steam RETAVG is obtained by dividing the enthalpy REH3 by the specific heat of water at a constant pressure. The subcooling of the water in this simulation is assumed to be negligible. Since the heat which is transferred into the cold reheat steam is removed from the hot live steam, the balance on the hot live steam takes the following form:

$$-\dot{Q}_{IN} + Wh = (\dot{M}h_{avg}) = \dot{M}h_{avg} + M\dot{h}_{avg}$$

Because all the live steam is assured to be condensed, the inflow is equal to the outflow REW1. Moreover, the average enthalpy of the hot or live steam is the enthalpy REH3 + REH1 divided by 2. Thus, the enthalpy REH3 is solved in accordance with the following equation:

$$h_{AVG} = \dot{h}_1 + \dot{h}_3)/2 = \dot{Q}_{in} + W_1(h_1 - h_3) = O + (M/2)(\dot{h}_1 + \dot{h}_3)(2/M)(-\dot{Q}_{in} + W_1(h_1-h_3)-h = \text{REH3}$$

The heat transfer between the hot live steam and the cold reheat steam is based on the average cold steam temperature RETAVG and the hot live steam condensing temperature RET1 as follows:

$$Q_{IN} = UA[T_1 - T_{avg}]$$

The reheater heat transfer coefficient is calculated from the overall performance data of the actual system being simulated. A terminal temperature difference exists at a 100% load. For example, if the exhaust temperature is 473° then the hot steam inlet temperature RET1 is 498°. Also, if the reheater pressure REPS is 163 psia, for example, the incoming stem temperature is then approximately 360°. The average reheater temperature RETAVG would then be 421° approximately. The heat requirement in such an example is approximately 637 Btu's per hour per million gallons so that the heat transfer coefficient RETUA would be equal to the following:

$$UA = Q/(T_1 - T_{avg}) = (637.322/(498.2 - 421.04) = 8.26234$$

HIGH AND LOW PRESSURE TURBINES

Referring to FIG. 103, the three low pressure turbines LPTA, LPTB, and LPTC are all connected to a common shaft and are driven in parallel by steam flow from the six reheaters AE and AW, BE and BW, and CE and CW through the intercept valves EHVIP(1)-(6). From each of the low pressure turbine stages LPTA, LPTB, and LPTC there are four extraction points that supply steam to the twelve low pressure feedwater heaters 11A through 14A, 11B through 14B, and 11C through 14C, respectively. The remainder of the extraction steam exhausts to the condenser CNDSR by bypassing the feedwater heater train.

The high pressure turbine HPT which is modeled with these fixed admittances is discussed in connection with the main steam network simulation, although certain aspects of the HPT modeling are included with the low pressure turbine simulation.

Low Pressure Turbine Simulation (RHSMEP)

In simulating the three stages of the low pressure turbine LPT(A), (B), and (C) in the model T46, a single equivalent turbine is utilized in this case. The extraction points to the feedwater heaters of the equivalent turbine are preferably simulated as a single extraction line. The low pressure feedwater heaters, as previously discussed, are provided with steam from the single equivalent extraction line.

The three low pressure turbine stages supply approximately 70% of the total generated plant power, while the high pressure turbine supplies about 30%. Therefore, each low pressure turbine stage supplies approximately 23%. This 70%-30% division is used in simulating the turbine models.

Both the high pressure and low pressure turbine models are capable of responding to the closure of the intercept valves EHVPI(1)-(6) due to a decrease in the electrical load, a closure of the governor valves EHVPX(1-)-(4) and the intercept valves in response to a turbine trip, and closure of all or all of the extraction steam valves FWCV36 through PWCV35, inclusive.

The outputs of this simulation preferably include the inlet flow LPW1 to the combined low pressure turbine, the developed power HPUMW and LPUMW of both the high pressure and the low pressure turbines, and the speed GNN of the turbine generator unit. Also, the outputs preferably include the loss of mechanical power to a partial loss of condenser vacuum, and a loss of mechanical power due to windage losses in the low pressure turbines.

The inputs to this simulation include the reheater pressure REPS, of cold reheat steam (calculated in RHMSEP) and the steam pressure FWPH1 of the feedwater heater group one which is also calculated in the subroutine RHMSEP; the position of the six intercept valves EHVPI(1)-(6); the status of the generator breaker PB7002X which is transmitted from the B machine; and the condenser pressure CDP which is calculated in the subroutine CNDSR.

Referring to FIG. 103/6, the simulation of the low pressure turbine includes an effective inlet admittance which is the product of the fixed inlet admittance LPG1 and the sum of the positions of the intercept valves EHVPI(1)-(6) which is termed LPGIV. When all six intercept valves are opened the intercept valve admittance LPGIV is one. The remaining two admittances include the exhaust admittance LPG3 which is fixed and the extraction admittance LPG2 which is variable and includes the effect of a check valve. The admittances for the high pressure turbine were previously discussed in connection with the main steam network description.

The low pressure turbine admittances referred to above have been chosen to yield an extraction pressure LPPEXT that simulates the extraction point close to the extraction outlet of the turbines. For example, the flow LPW1 through the inlet admittance (LPGIV times LPG1) at 100% plant load is 9.840184 × 10⁶lb/hr/ and the total presure drop is 163 - 65.1 psid. The exhaust admittance LPG3 is based on a flow of 7.565329 × 10⁶ lb/hr/ and a pressure drop of 65.1 −0.75 psid.

The extraction admittance LPG2 is a function of low pressure turbine inlet flow FPW1 and it compensates for the plant load level. The admittances LPG2 and calculated for plant load of 40, 60, 80, and 100% and then fitted against the plant load level. The flow LPW2 that is used for the extraction admittances LPG2 is the sum of all the extraction flows. The pressure difference is based on the first low pressure extraction pressure LPPEXT and the equivalent low pressure feedwater heater pressure FWPH1. The feedwater heater pressure FWPH1 follows the condenser pressure CDP.

The high pressure turbine power HPUMW is calculated by an algebraic energy balance as follows:

HPUMW = (HPW1*HPH1 − HPW2*HPH2 − HPW3*HPH3)*K where K is a conversion factor. This energy balance yields the next power HPUMW delivered to the high pressure turbine blading. According to the data for the operation of the turbine being simulated, the three enthalpies HPH1, HPH2, and HPH3 do not vary throughout the operating range.

The power of the low pressure turbine is obtained from the inlet steam flow LPW1 and the exhaust steam flow LPW3. The inlet and exhaust flows are normalized by their 100% load level values. These normalized values are weighted equally by multiplying each value by 0.5 and adding the two products. The sum of the two products is then multiplied by 759.69 for example to reflect the total output of the low pressure turbine LPUMW, which is expressed in accordance with the following:

$$HPMUW = [(W_1/7.84) * 0.5 + (W_3/7.5653) * 0.5] + 759.69$$

Low pressure turbines of the type being simulated have blade diameters that approach as much as 15 feet. Under conditions where the flow of steam is low, the tips of these blades are traveling at such a high rate of speed that in effect the turbine blades whip through the low steam flow. This whipping action causes the blades to heat the steam entering the low pressure turbine creating a mechanical loss known as windage. Relatively, considered the turbine blades are whipping through a still fluid. Under these conditions energy is delivered back to the steam in the form of heat. This heat is the windage loss that reduces the gross output of the turbines. The loss is a function of turbine speed, load and density of the fluid. The fluid comprises mainly of steam and some air. The windage loss approximately 3% of the entire plant output, when the turbine output is zero and is running at synchronous speed with condenser pressure normal. This loss drops to 3/10 of a percent of the plant output when the turbine output increases to 10%. There is a constant friction factor of 1 megawatt which is due to dry friction and is assumed in the simulation to be present at all times. In the model, the LP windage loss is calculated first in terms of a torque, and then this torque is converted to a power term.

In simulating the LP windage loss the fluid mechanics equation where force is equal to the product of the fluid density and the relative velocity of the steam and the mean blade diameter, plus a constant $K_1$, is utilized. This relationship is then related to torque T, and the steam density by utilizing another constant $K_2$ in accordance with the following equation:

$$T = K_2(L/\text{NORM}) V^2 \text{REL}$$

where $V^2_{REL}$ is the relative velocity. Then, the relative velocity is related to turbine speed N and turbine steam flow W in accordance with the following:

$$T = (L/\text{NORM})(K_3N - K_4W)^2$$

Since turbine steam flow, turbine speed, and turbine power is known, the torque T is then related to power P using another constant in accordance with the following equation:

$$P = (L/\text{NORM}) N [K_5N - K_6W]^2$$

Assuming that the density L is normal and the turbine speed N is synchronous, the specified quantities for power N and steam flow W are used to calculate the constants $K_5$ and $K_6$. The result of such calculation is the simulation of the turbine's windage loss.

In the preferred simulator embodiment the windage condition is simulated when the flow is equal to zero and the speed is equal to one or where the loss is approximately 3% at a turbine speed of 1800 rpms in accordance with the following equation:

$$T_{LS} = 1.16948 \times 10^5 [FT + LB/10^6]$$

It is also simulated for the condition where the flow is one and the speed is one or in other words where there is approximately a 3/10 of a percent loss at 1800 rps in accordance with the following equation:

$$T_{LS} = 1.3428 \times 10^4 [FT + LB/10^6]$$

The friction loss is considered at 1 megawatt at 1800 rpms as follows:

$$K_3 = 3.9113 \times 10^3 [FT-LB/10]$$

Thus, the torque T is calculated in accordance with the following equation:

$$T = \frac{3.9113 \times 10^3}{[3. + 977 \times 10^2 - N - 2.3547 \times 10^2 W_1]2_1}$$

The normalized steam density L is calculated by combining the mass of air CDMAIR and the mass of steam CDMS in the condenser as described hereinafter. Since the steam mass in the condenser is essentially constant, the density L is calculated as follows:

$$L = (CDMS + CDMAIR/CDVT)$$
$$/CDMS/CDVT = 1.0 = (CDMAIR/CDMS)$$

where CDVT is the condenser volume.

The total condenser pressure CDVT has a significant effect on the mechanical power that the low pressure turbine can develop. When the steam is not permitted to expand to its maximum specific volume and minimum pressure, the available energy is lost to the condenser by way of condensation.

Referring to FIG. 103/7 there are certain correction of the plant's output load for various condenser flows, and such corrections are non-linear. In the present embodiment, this simulation approximates such predetermined data as straight lines; and the data is extrapolated to a pressure of 2.5 psia.

Referring to FIG. 103/8, the assumed vacuum correction curve a function to generate the proper slope and the Y intercept for a given condenser pressure are obtained. By selecting the slopes, and Y intercepts for pressures of 0.75 psia, 1.25 psia, 1.50 psia, 1.75 psia, 2 psia and 2.50 psia, two second order fits $f_1$ and $f_2$ are obtained. Therefore, a coefficient Y representing the loss to the total turbine output which range is between 0 and 1, is obtained in accordance with the following equation:

$$Y = f_1(CDP) * LPW3 + f_2(CDP)$$

In the above equation LPW3 is the turbine exhaust flow and CDP is the condenser pressure. The resulting coefficient Y is multiplied by both the high and low pressure turbine power output to obtain the net power output of the turbine.

At very low turbine speeds, such as around 200 rpm for example and below, there are substantial inefficiencies due to the slow moving blades. For example, at zero speed, the steam flow strikes a stationary blade that resembles an angled flat plate. Torque T is now assumed to be a function of the steam flow velocity VSTM, and a mean rotor velocity RW where R is the mean rotor radius and W is the rotor speed so that the square of the difference between the steam velocity and the mean rotor velocity multiplied by a constant is equal to the torque. The mean rotor radius R, of course, is constant and the steam velocity VSTM is related to the steam flow HPW1F, then the torque is obtained in accordance with the following equation:

$$T = (K_1 \text{HPW1F} - K_2 N)^2$$

where HPW1F is the steam flow through the high pressure turbine, and N is the normalized turbine speed. The constants $K_1$ and $K_2$ are selected on the assumption that at zero speed, a steam flow of 100,000 lbs/hr is capable of accelerating the unit at 300 rpms per minute; thus, the constant $K_1$ which is multiplied by the flow HPW1F is equal to 30784.95. By calculating the windage loss at 300 rpm, and estimating the necessary flow of 0.5% of rated power to maintain the 300 rpm speed, $K_2$ is found to be the constant 561.569. Above 300 rpms, the normal turbine power calculation is used in the simulation.

Turbine speed is calculated from a continuous intergration of the acceleration. The acceleration calculation is performed by totaling the available drive power and the use of power in the electrical load to determine the net power available to accelerate or decelerate the turbine shaft. This net power is then divided by turbine speed to determine a torque, and the torque is divided by the turbine inertia to determine the turbine acceleration. The additional forces, which include the alternating current coupling that exists between the generator and the 345 kv system, and the force that is produced by the generator damper windings are added. These forces are termed the synchronizing force and the total compares the turbine speed to a standard of 1800 rpm.

CONDENSER

The feedwater is pumped from the hot well of the condenser by the condensate pumps of the feedwater system. The cooling water is circulated in the condenser in the circulating water system; and the steam enters the condenser from the low pressure turbine exhaust, the feedwater heaters, the feedwater pump turbines, and the steam dump valves.

Figure 93B:
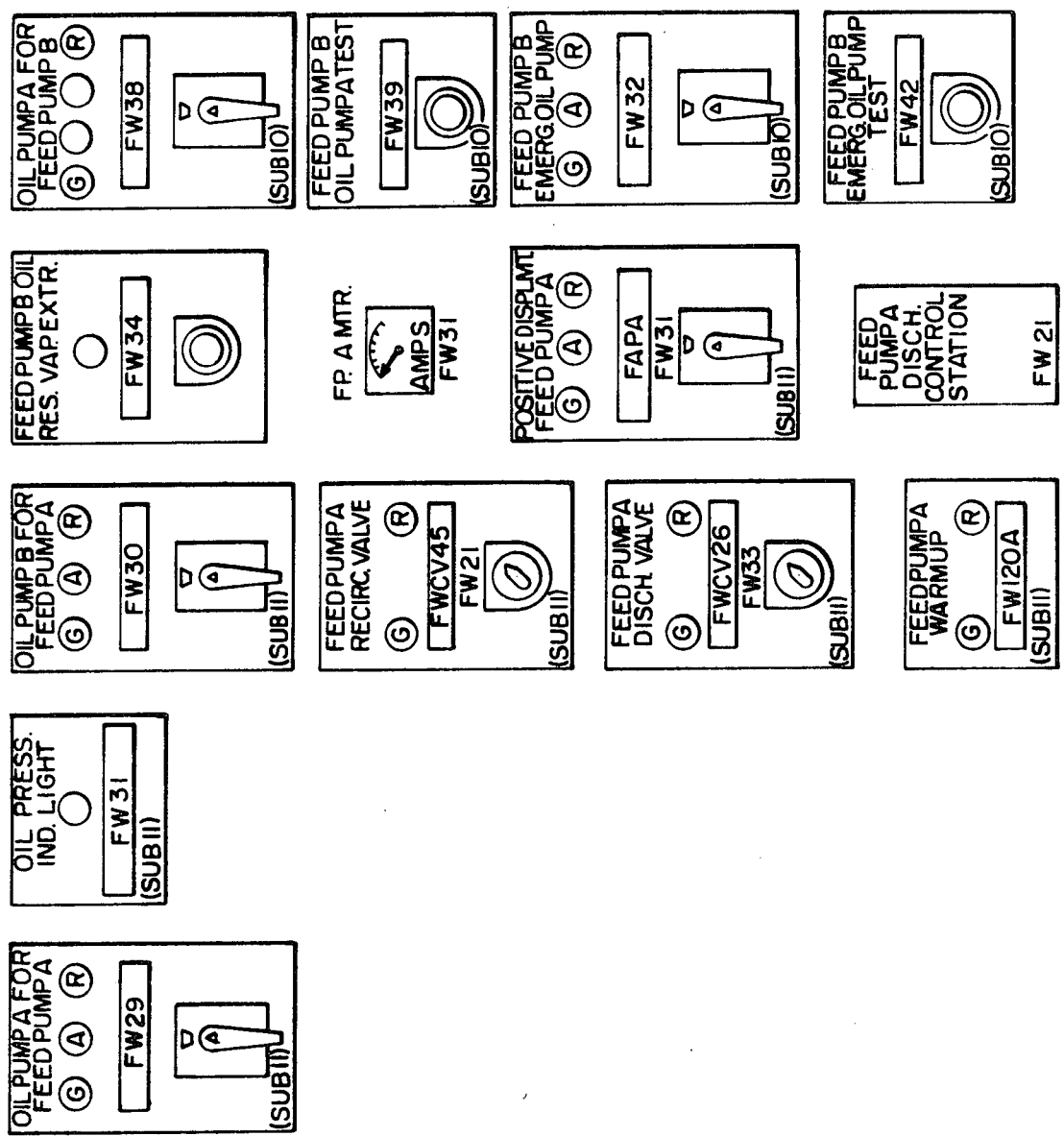
FIGS. 93B, 93D, 93G, 93I, 93K and 93L through 93R illustrates a front view of a portion of the control console for controlling and monitoring a portion of the simulated secondary system.
Figure 93:
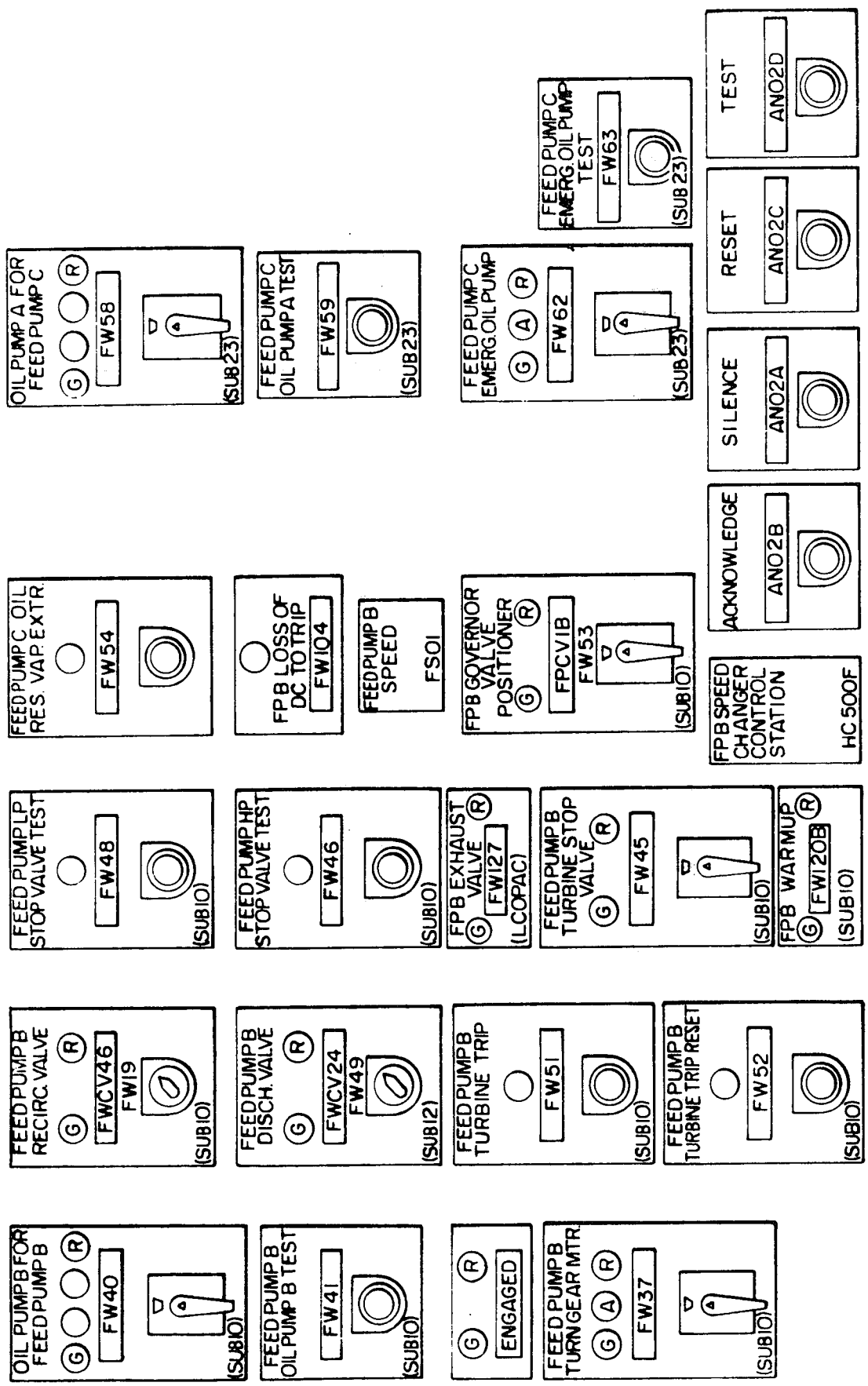
Figure 93G:
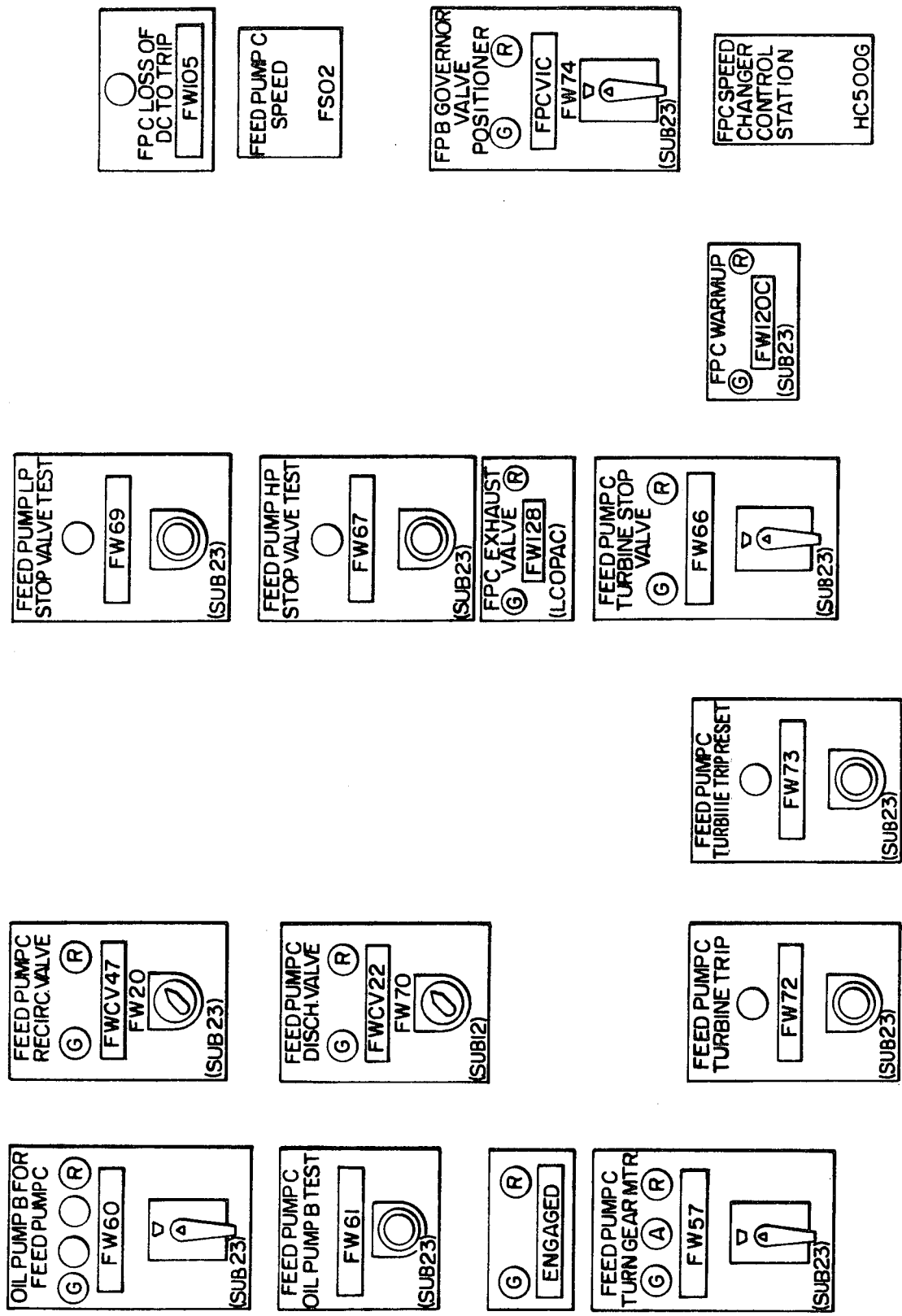
Figure 93:
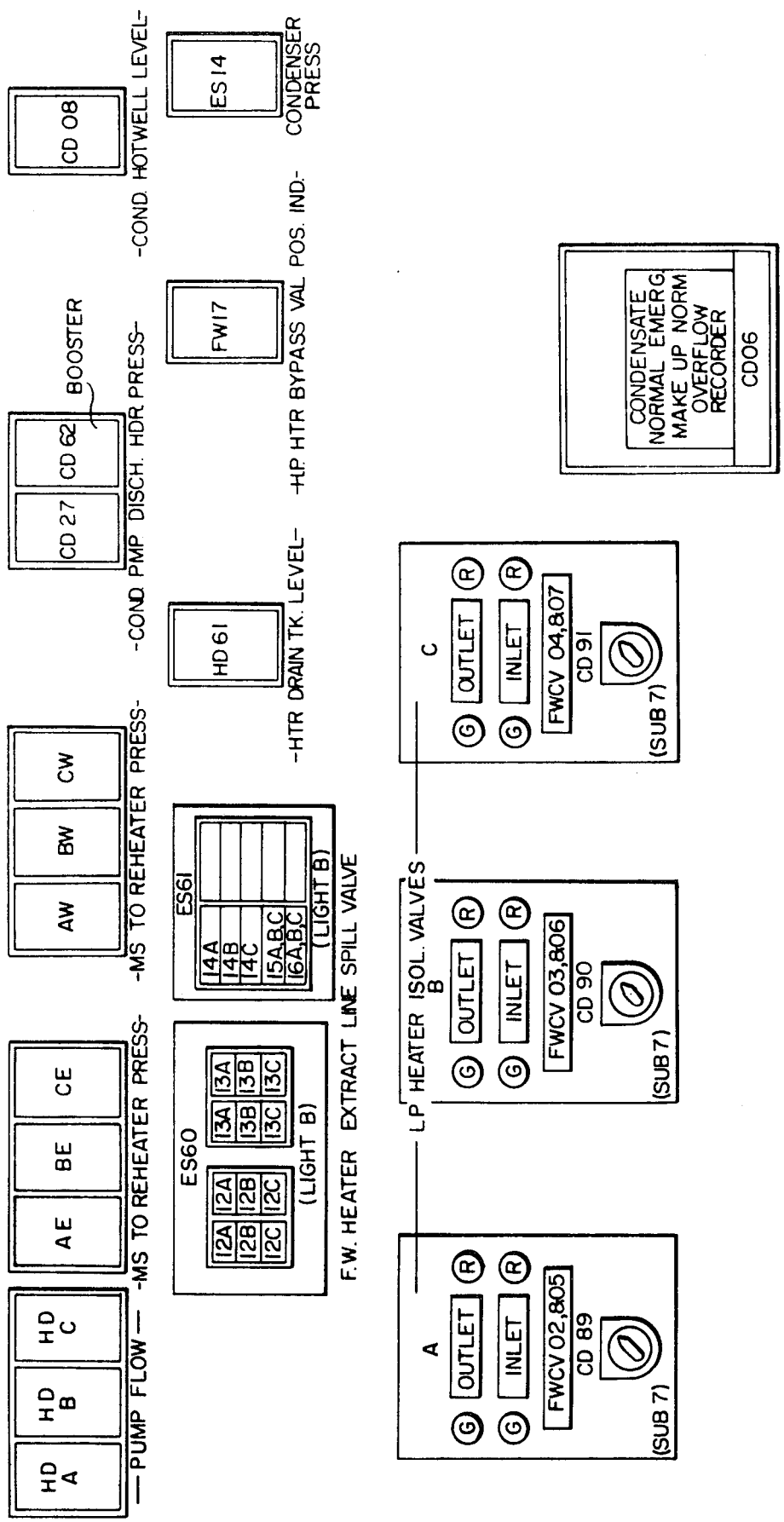
Figure 93L:
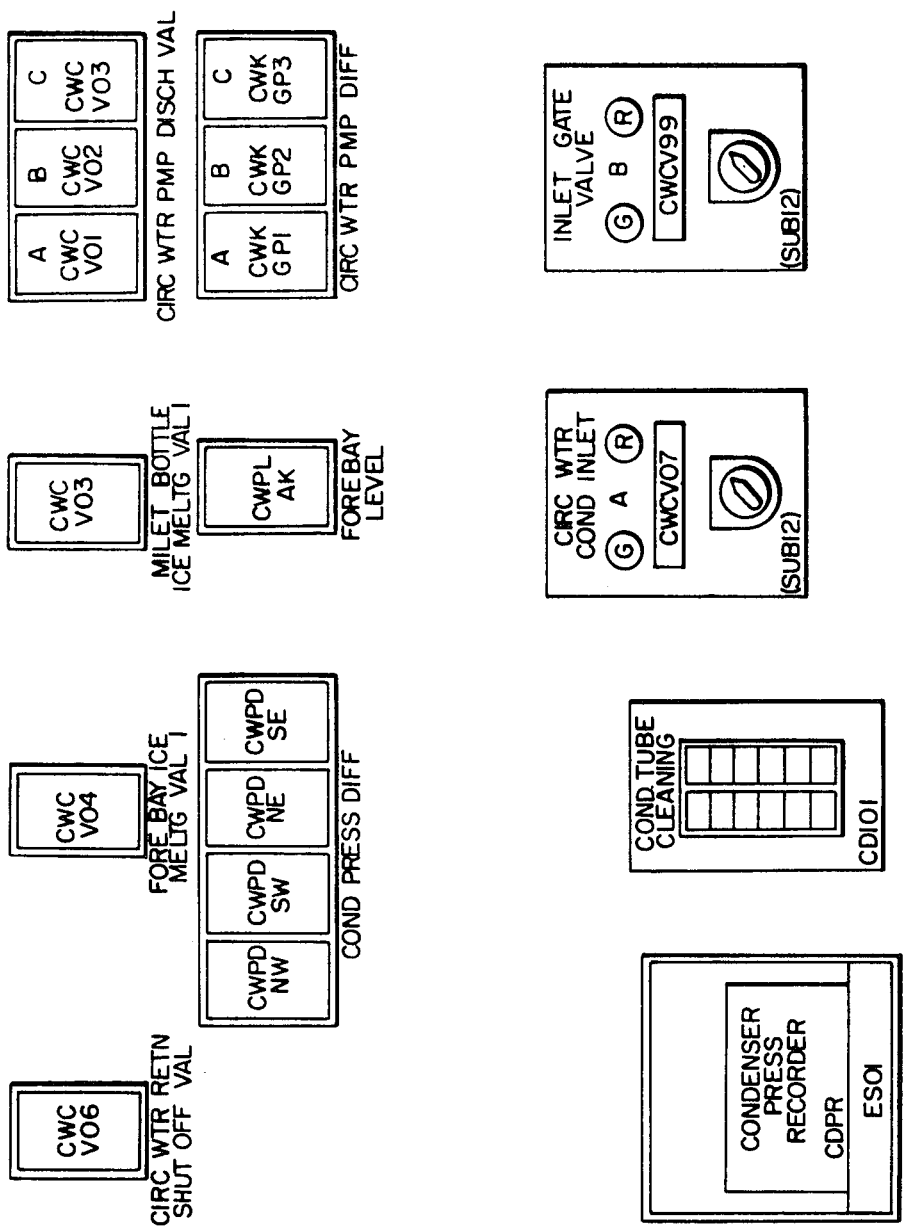

FIG. 93L illustrate the central office meters, which monitor various conditions in the condenser such as pressure differential; and a pressure recorder, a condensing tube cleaning indicator and the condensate normal emergency and makeup overflow recorder. The various detailed portions of the condenser structure that affect its operation and other parameters which must be considered will be described in connection with the description of the simulation.

The model T54 of the condenser employs the subroutine CNDSR. The condenser model is preferably capable of responding to variations in heat load due to turbine load changes and the operation of the steam dump valves MSVPD, variations in the flow of circulating water, the effect of the circulating water inlet temperature on the heat coefficient of the condenser, and the effect of the presence of air on the rate of condensation.

The inputs to the simulation of the condenser include the low pressure turbine exhaust flow LPW3, which is calculated in the subroutine RHMSP, the steam flow MSWDMP from the steam dump valves, which is calculated in the subroutine STMGEN, the gland steam seal supply pressure TSPGSS, which is calculated in the subroutine BOPAUX, the feedwater flow FWWCPT to the condensate pumps, which is calculated in the subroutine FWFLUD, and the steam flow FPWST through the feed pump turbines, which is calculated in the subroutine BPPEFF.

The outputs from the simulation of the condenser model include the condenser total gaseous pressure CDP, the circulating water system outlet temperature CWTO, and the water level of the condener hot well CDL. The outputs of the simulation are indicated in the central control office by the appropriately labeled indicators of FIG. 93L.

In the modeling of the condenser, the steam is preferably modeled as a single lump. Thus, temperature and moisture gradients are not considered and difussion is ignored. The condenser steam mass CDMT is assumed to be constant. The simulation equations are based on the assumption that all the incoming steam CDWTIN is condensed; compressive effects are ignored. The condensed fluid in the equivalent hot well is preferably assumed to be at the same temperature as the steam, i.e., subcooling is ignored. Further, the three individual hot wells in the condenser are lumped into a single equivalent hot well that is assumed to have a constant uniform cross-section. All the heat transfer CDQ between the steam and the circulating water is assumed proportional to the steam temperature CDTS and the average of the circulating water inlet temperature CDTI and the circulating water outlet temperature CWTO. The constant exhaust enthalpy LPH3 of 1100 Btu's/lb is described in the simulation of the turbines.

The condenser is modeled using instataneous energy of steam. The steam enthalpy CDHS is calculated by considering the net heat transferred and the various steam flows that must be condensed. The condenser steam temperature CDTS, the steam pressure CDPS, and the water enthalpy CDHW, are all assumed to follow saturation conditions. The independent variable steam enthalpy CDHS is utilized in three spline fits to generate CDTS, CDPS, and CDHW. The heat transfer from the steam to the circulating water system termed CDQ is proportional to the difference between the steam temperature CDTS and the average of the inlet circulating water temperature CWTI and outlet water temperature CWTO. The total condenser pressure CDP is the sum of the partial pressure of the steam CDPS and the partial pressure of air CDPAIR. The partial pressure of air is determined from a mass balance on the air and an assumed air temperature equal to the steam temperature.

The condenser heat transfer coefficient CDUA is a function of both the circulating coolant water inlet temperature CWTI and the amount of air in the condenser CDMAIR. The heat transfer coefficients for several circulating water inlet temperatures are based on the condenser manufacturer data and utilized with second order fits to provide exact heat transfer coefficients at the specified points. The heat transfer coefficient CDUA also depends upon the presence of non-condensible gases such as air. The gases form a vapor layer between the cold tubes of the condenser and the exhaust steam. The efficiency is reduced considerably because the steam must pass through the air, which acts as an insulation layer in order to get in contact with the condensing tubes.

Referring to FIG. 104/1 it is shown that 1% air in the condenser causes the heat transfer coefficient to be reduced to 36.5% of its normal value, for example. Similarly, a percentage of air of 2% will cause a reduction to approximately 22% of the normal value of the heat transfer coeffiecent. Between 1% of air by volume to 0 in the condenser, there is a sharp curve which illustrates the significant effect of a small amount of air in the condenser. The lower limit of the air effect in the condenser has been simulated at 10% and a second order least squares fit of this function has been utilized.

The circulating coolant water outlet temperature CWTO is otained from an energy balance on the water in the condenser tubes. The water enthalpy CDHW is converted to the temperature CDTS by assuming a constant specific heat of one. The energy balance on the water in the condenser tubes has the following form:

$$Q_{IN} + \Sigma wh = (M_w \dot{h}_w) = \dot{M}_w h_w + M_w \dot{h}_w$$

where:
$Q_{IN}$ = the net heat in,
$\Sigma wh$ = the sum of the product of flows and enthalpies in and out,
$M_w$ = the mass of the water in the tubes, and
$h_w$ = the enthalpy of water in the tubes.

The rate of change of mass $M_w$ in the condenser is zero since the tubes are assumed to be full at all times. Thus, $$Q_{IN} + W C_p(CWTI-CWTO) = M_w \dot{h}_w$$

where:
$c_p$ is the specific heat of water assuming that:

$$h_w = \frac{C_p(CWTI - CWTO)}{2}$$

$$\frac{[Q_{IN} + W_{cp}(CWTI - CWTO)] 2.0}{C_p} = (CWTI) + (CWTO)$$

The circulating water inlet temperature change CWTRI is assumed to be constant and equals zero. The equation for the simulation of the model has the following form:

$$CWTR\phi = [CDQ/CWCP + CWWT(CWTI-CWT\phi)] 2.0/CWMW$$

where:
CWTR$\phi$ is the outlet circulating water temperature rate,
CDQ is the heat transferred to the coolant circulating water,
CWCP is the specific heat of water,
CWWT is the total flow of water, and
CWMW is the mass of water in the tubes.

The outlet temperature CWTO is calculated by integrating the rate CWTRO. The mass of water in the tube CWMW is 691,000 pounds for example.

The heat transfer between the steam and the circulating water CDQ is calculated from the coefficient CDUA and the temperature difference between the steam and the circulating water. As previously mentioned, the water temperature in the tubes is assumed to be the average of the inlet and outlet circulating water temperatures. Thus, the CDQ or the heat transferred is as follows:

$$CDQ = CDUA[CDTS - (CWT\phi + CWTI)/2]$$

The condenser steam enthalpy CDHS is computed from an energy balance on the steam. Because of the effects of compressibility during a fast transient and the mass of steam in the condenser being assumed constant, and all the incoming steam being assumed to be condensed, the energy balance for CDHS where $h_s$ represents the enthalpy is as follows:

$$h_s = (Q_{IN} + \Sigma wh)/M_s$$

The term $\Sigma wh$ which represents all the incoming flows of steam into the condenser has been calculated together andrepresents the power into the condenser system. The total power which is termed CDUTIN is calculated from flows and their respective enthalpies which include the feed pump turbine steam flow FPWST, the steam dump flow MSWDMP, the low pressure turbine exhaust flow LPW3, and the group one feedwater heater drain flow FWWHl3. The flows FPWST, at MSWDMP, and LWP3 are assumed to have constant enthalpies. Thus, the enthalpy rate of the condenser steam is computed from the following equation:

$$CDHSR = [- CDQ + CDUTIN - CDWTIN * CDHW]/CDMT$$

The terms in the above equation have all been previously mentioned with the exception of the term CDWTIN which is the sum of the flows into the condenser, CDHW which is the enthalpy of the condensed water, and CDMT which is the total mass of metal and steam into the condenser.

The steam enthalpy CDHS is obtained by integrating the enthalpy rate CDHR. In the simulation program, limits are imposed on the enthalpy. The lower limit of 1077.7 for example corresponds to 35° F which is the lowest possible circulating water inlet temperature. The upper limit of 1164.1 corresponds to a pressure of 30 psia, above which the condenser rupture disk would be broken. The total mass of steam is assumed to be constant at 244 pounds for example. This mass corresponds to a specific volume of 640 cubic feet per pound and a condenser volume of 156,000 cubic feet. The assumed specific volume corresponds to a pressure of 0.50 psia and represent the minimum value that can be expected. A metal mass CDMMTL of $5.50 \times 10^6$ lbs. is assumed to be affected by the steam in a heat transfer relationship. This mass includes the circulating water tubes and the walls of the condenser. The effective metal mass is determined by considering the specific heat of both steam and metal. The following equations illustrate this determination.

$$M_{mtl} C_{pmtl} T_s + M_s C_{ps} T_s = M_{tot} C_{ps} T_s$$

Dividing the relation by $C_{ps} T_s$:

$$M_{mtl} (C_{pmtl}/C_{ps}) + M_s = M_{tot}$$

The effective metal mass is therefore $M_{mtl} (C_{pmtl}/C_{ps})$ The specific heat of metal $C_{pmtl}$ has a value of 0.10 (BTU/lb/° F) while the specific heat of steam at low pressure is 0.50 (BTU/lb/° F). Hence, the effective metal mass is $1.10 \times 10^6$ lb. Since all flows, heats and masses are scaled by $10^6$, the condenser modeling program uses a value of 1.10 for CDMMTL.

To obtain the water level in the condenser hot well CDL, a mass balance is maintained which considers inflows that include all the incoming flows that are inputs to the steam energy balance termed CDWTIN, all the feed pumps recirculation flows FPWREA, FPWREB, and FPWREC, the condensate booster pump recirculation flow FWWRET, the condenser normal and emergency makeup flows from the condenser level controller CDWNMU, CDWEMU, and the heater drain tank overflow HDWOF. Also, the condenser normal and emergency overflow flows from the condenser level controller CDWNOF and CDWEOF, the condensate pump suction flow FWWCPT, and the heater drain tank makeup flow HDWMU are considered in the mass balance.

The total mass of water in the hot well CDMW is determined by integrating the net mass flow CDMRW. The condenser level CDL is obtained by assuming a constant specific volume of 0.016 cubic feet per pound. A rectangular volume is assumed for the equivalent hot well and the plan area CDA is assumed to be 2,000 sq. ft. for example. Thus, the total hot well volume of 10,000 cu. ft. is divided by an assumed 5 foot height to determine the plan area CDA.

A level controller, which is mounted on the hot well of the condenser, pneumatically and automatically starts opening a valve to admit by gravity emergency condensate flow makeup into the hot well. There are four level set points and four control flows for the hot well controller. In order to simulate the effect of these control valves, the flows for the emergency makeup are simulated as five second time delays that range from zero to the maximum value. The condenser level controller signal CDLINS is utilized for the implementation of malfunctions. The true level is modified by multiplying such level CDL by coefficients. A heat balance is not performed on the hot well because the water enthalpy CDHW is assumed to be the saturation value that corresponds to the steam enthalpy CDHS.

The amount of air present in the simulated condenser is determined by maintaining a mass balance on such air. The inflows for such mass balance include the leakage through the turbine seals TSWGLD, leakage due to a malfunction CDWLEK, and a flow due to the vacuum breaker valve TSCV04. The air is removed from the condenser through the vacuum pumps TSWVAC and the air ejectors TSWAG and utilize the partial pressure of air CDPAIR and the partial pressure of steam CDPS in calculating the amount of air removed. In simulating the air in the condenser, it is assumed that without turbine seals the vacuum pump is capable of establishing 9 psia in the condenser after five minutes of operation. With the establishment of turbine seals, it is assumed that the vacuum pump can reduce the condenser pressure further to 5 psia after five additional minutes of operation. With the turbine seals established and one air ejector operating, it is assumed that the pressure can be reduced to 0.75 psia in an additional 10 to 12 minutes. It is further assumed that when the turbine seals are established, there is essentially zero leakage provided that there are no other malfunctions.

With the air inflow at zero, it is assumed that the zero flow suction pressure of the vacuum pump is 5 psia. The admittance of both the vacuum pump and the gland seals is determined from a single differential equation as follows:

$$\text{CDWARI} - \text{CDWARO} = \text{CDMAIR} = (\text{CD}\dot{\text{P}}(194)\text{CDVT})/RT \quad (1)$$

where:
CDWARI − CDWARO are the air flows into and out of the condenser, respectively,
CDMAIR is the rate of change air mass in the condenser,
CD$\dot{\text{P}}$ is the rate of change of condenser pressure,
CDVT is the total volume of the condenser,
R is the gas constant, and
T is the air temperature.

With the flows CDWARI and CDWARO expressed as pressure drops times the steam gland leakage admittance TSKG and the vacuum pump internal admittance TSGVAC, the general equation becomes:

$$\text{TSKG}(14.7-\text{CDP}) - \text{TSGVAC}(\text{CDP}-5) = \text{CD}\dot{\text{P}}[\text{CDVT}(144)/53.3(45-9.69+80)] \quad (2)$$

At 9 psia for example, assume that the inflow past the seals TSWGLD is equal to the outflow of the vacuum pump TSWVAC, so that:

$$\text{TSKG} = (9-5)\ \text{TSGVAC}/(14.7-9) = 0.702\ \text{TSGVAC} \quad (3)$$

By substituting (3) above into equation the following equation applies:

$$9 - \text{CD}\dot{\text{P}} = \frac{\text{CD}\dot{\text{P}}}{[\text{CDVT}(144)/53.3(539.69)\text{TSGVAC}]}$$

or $9 - \text{CD}\dot{\text{P}} = \text{CD}\dot{\text{P}}(K)$

Assuming K is a time constant of 2.5 minutes or $4.166 \times 10^{-2}$ hours for example, then TSGVAC is equal to $1.102 \times 10^{-2}$. Thus, using the value $1.102 \times -10^{-2}$ for TSGVAC, TSKG is equal to $0.702(1.1012 \times 10^{-2})$ or $7.734 \times 10^{-3}$.

An internal admittance for the steam jet air ejectors TSGXAJ is calculated by the same procedure as that used for the internal admittance of the vacuum pump TSGVAC. For example, assuming that a zero flow suction pressure of 0.3 psia, and a time constant of 3.5 minutes, an internal admittance of $1.34 \times 10^{-2}$ is obtained for the air ejectors.

Referring to FIG. 104/2, the graph shows a relationship between a factor for gland steam leakage admittance and the gland steam header pressure. As previously discussed the turbine gland steam leakage admittance TSKG is calculated for the instance when the system is not in service. When sufficient steam pressure is available at the supply header TSPGSH, the admittance TSKG is divided by a factor. This factor is assumed to range from 0 to 10,000 as the gland steam header pressure TSPGSH varies from 0 to 154.7 psia.

In simulating the malfunction that involves an air leak CDWLEK, into the condenser such air leak is calculated to raise the condenser pressure CDP to a value just below the turbine trip point. The heat transfer coefficient CDUA is then reduced so that the steam temperature CDTS must increase in order to maintain the necessary heat transfer. For example, an admittance air leak CDGLEK of $11 \times 10^{-6}$ performs this simulation satisfactorily.

A vacuum breaker valve TSCV04 on the condenser is intended to admit air to the condenser for the purpose of raising the condenser pressure CDP. This valve has a stroke time of 25 seconds and a maximum admittance of $20.3 \times 10^{-2}$. Utilizing this value an acceptable rate of increase in condenser pressure from 0.75 to 14.7 psia in 40 seconds is obtained.

The partial pressure of air CDPAIR in the condenser is calculated from the condenser air mass CDMAIR and the air temperature, which temperature is assumed to be equal to the steam temperature CDTS. The simulation equation for the condenser partial air pressure CDPAIR is as follows:

$$\text{CDPAIR} = [\text{CDMAIR}\ (53.3)(\text{CDTS}+459.69)/\text{CDVT}\ (144)]$$

The total condenser gaseous pressure CDP is the sum of the partial pressure CDPS and CDPAIR.

MAIN FEEDWATER SYSTEM

The purpose of the main feedwater system is to supply an automatically controlled flow of demineralized feedwater to the steam generators SGA, SGB, SGC, and SGD to maintain desired secondary water levels in the generators while generating secondary steam at sufficient pressure and temperature to drive the turbine generator, and at the same time maintain the necessary rate of heat removal from the reactor primary coolant system RCS.

Figure 105A:
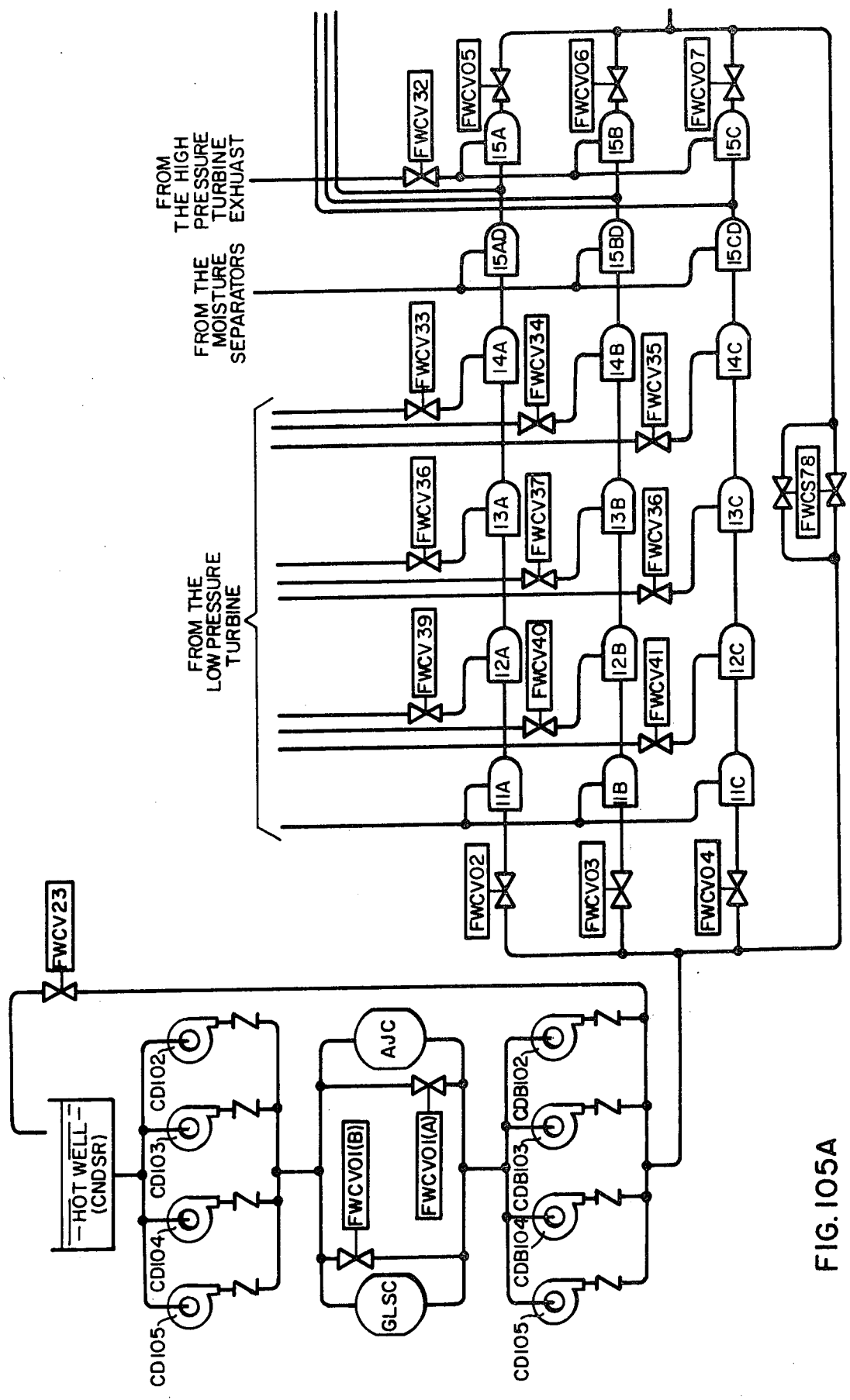
FIGS. 105A and 105B when placed end-to-end illustrates schematically the feedwater system of the type being simulated.
Figure 105B:
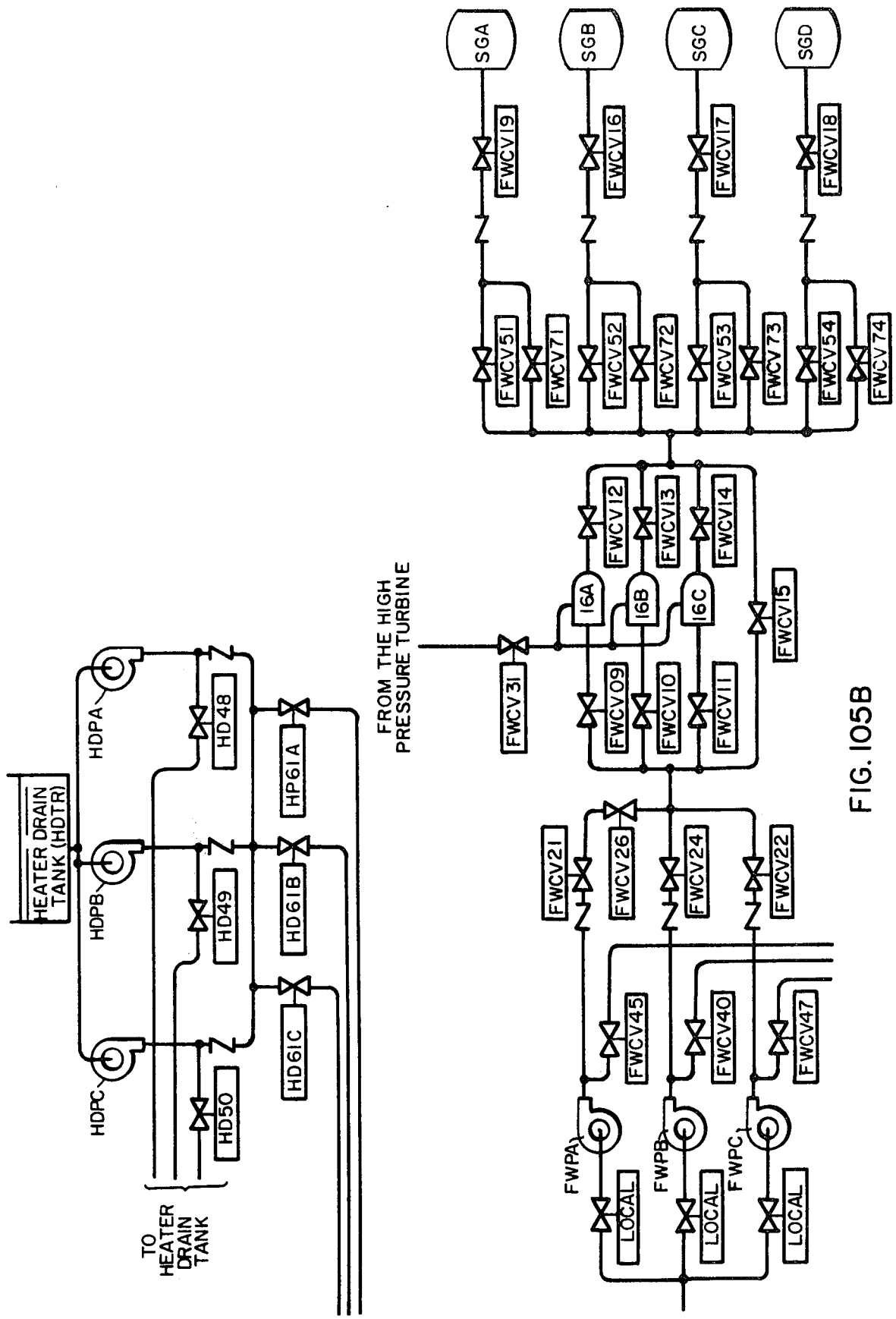

Referring to the control panels 93B, 93C, 93D, 93G, 93H, 93I, 93J and 93K and the diagram of FIGS. 105A and 105B, the feedwater system that is simulated in accordance with the preferred embodiment of the invention is the closed type with deaeration accomplished in hot wells of the condenser CNDSR. Condensate is removed from the condenser by four condensate pumps CD102, CD103, CD104 and CD105; and then pumped through air ejector condenser AJC and gland steam condenser GLSC to the suction of four condensate booster pumps CDB102, CDB103, CDB104, and CDB105. Valves FWCV01(A) and FWCV01(B) are flow control valves to govern the rate of flow of the condensate through the air ejector condenser AJC and the gland steam condenser GLSC.

The condensate from the condensate booster pump CDB is then pumped through inlet valves FWCVO2, FWCVO3, and FWCVO4 to three strings of feedwater heaters. The first string of heaters include feedwater heaters (LP) 11A, 12A, 13A, 14A, drain cooler 15A and low pressure heater 15AD. The second string of low pressure feedwater heaters include heaters 11B through 15BD inclusive. The third string include 11C through 15CD inclusive. The feedwater is then conducted through outlet valves FWCV05, FWCV06, and FWCV07 for each of the strings into a common header to the suction side of the main feedwater pumps FWPA, FWPB, and FWPC through three locally operated suction valves. Each of the feedwater pumps includes a respective discharge valve FWCV26, FWCV24, and FWCV22 in each of the discharge lines which converge into a common header. The feedwater pump FWPA includes control valve FK-FW21 to aid the discharge flow control of the pump FWPA which is a motor driven pump. The feed pumps FWPB and FWPC are both steam driven. Recirculation valves FWCV45, FWCV46, and FWCV47 control the recirculation of its associated feedwater pump.

The feedwater is then pumped through the high pressure feedwater heaters 16A, 16B and 16C, each of which has an inlet and outlet valve FWCV09-FWCV12, FWCV10-FWCV13, FWCV11-FWCV16, respectively. The feedwater is then conducted through feedwater flow control valve FWCV51, FWCV52, FWCV53 and FWCV54, and isolation valves FWCV18, FWCV16, FWCV17 and FWCV18 to the steam generators SGA, SGB, SGC, and SGD. The bypass control valves LCV-510A, LCV-520A, LCV-530A and LCV-540A are controlled by the remote set point controllers on the control console. The remaining valves, with the exception of those that are locally controlled as mentioned, are controlled from the central control office.

The heater drain pumps HDPA, HDPB, and HDPC take their suction from the heater drain tank HDTR and pump the feedwater through valves 61A, B, C, to the line between the drain coolers 15A and 15AD, 15B and 15BD, and 15C and 15CD into the suction side of the feedwater pumps FWPA, B, C (FIG. 105B). Recirculating valves HD48, 49, and 50 operate in conjunction with the valves HD61 to respond to the heater drain tank level controller in the central office.

Feedwater Fluid System Simulation (FWFLUD)

The model T50 (FWFLUD) is capable of simulating the operation of any or all of the condensate pumps, condensate booster pumps, heater drain pumps, and feedwater pumps, previously mentioned; the partial or complete operation of any or all of the valves in the feedwater system; the effect of all the systems check valves; and the effect of fluid density on the feed pump capabilities.

The inputs to the simulation FWFLUD include the pump speeds FPNPB and FPNPC for the turbine driven feed pumps FWPB and FWPC from the subroutine BOPOTL; the valve admittances and pump speeds from the valve handler VHAND and the pump handler PHAND; the main and bypass feedwater control valve admittances FWCV51 to FWCV54 and FWCV91 to FWCV94, respectively, from the control station handler CONHAND; and pressures SGPS(1) to SGPS(4) of the steam generators SGA through SGD from the subroutine STMGEN.

The pressures and flows which the simulation includes in its calculation for generated outputs are feedwater flows through the feed heaters as well as the bypass lines used in the simulation of the feed heaters in the routine RHMSEP; and the feedwater flows FWWSG(1) to FWWSG(4) into the steam generators for the steam generator simulation in the routine STMGEN.

Referring to FIG. 105/1, the feedwater system is illustrated schematically as an electrical network. This network is represented by nine nodal equations. Although a fluid system, such as the feedwater system of the preferred embodiment of the invention, is non-linear, the nine equations which represent the feedwater system are linear, and yet provide an accurate simulation as hereinafter described. In correlating the fluid system's components and the network's admittances and sources, zero flow pressures are represented as follows: FWPOCP represents the zero flow pressure of the condensate and condensate booster pumps CD and CDB, respectively, HDPO and HDPLVL represent the zero flow pressure of the three heater drain pumps HDPA, B, and C and the suction pressure of the heater drain tank HDTK respectively. The suction pressure of the heater drain pumps is assumed to be constant at eighty-five psia; and FPPOPA, FPPOPB, and FPPOPC represent the zero flow pressure of the three feed pumps FWPA, B, and C.

FWG1 represents the internal admittance of the condensate pumps CDP as well as that of the parallel combination of the gland steam condensers GLSC and bypass valves SWVC01. The gland steam condensers GLSC are assumed to have a pressure drop of 28.6 psid at a total flow of 10.128 lb/hr/$10^6$.

The term FWG2 represents three parallel heater strings. One string comprises the heaters 11A, 12A, 13A, 14A, and the drain cooler 15A. This string is paralleled with the other two heater strings 11B through 15B and 11C through 15C. The maximum admittance of each of the isolation valves FWCV02, 3, 4 (FIG. 105A) is set equal to the admittance of its associated string of feedwater heaters. Actually, each isolation valve has a maximum admittance of 1 which is multiplied by its heater string's constant admittance. The pressure drop of one heater string is assumed to be 68 psid at a flow of 3.75 lb/hr/10⁶.

The term FWG4 represents the three feedwater heaters 15AD, 15BD, and 15CD. These isolation valves are utilized in calculating the admittance of the entire string of feedwater heaters. The pressure drops in the three heaters 15A, B, and C are assumed to be 17 psid at a flow of 3.75 lb/hr/10⁶.

The three heaters 16A, B, and C including the bypass valves FWCV15 are represented by the term FWG5. In this instance, the heaters are assumed to be of equal capacity, and there are included piping losses as well as the pressure drop to compensate for the distance between the feedwater system and the steam generators. A pressure drop of 287 psid is assumed to occur at 3.847 lb/hr/10⁶ for each of the heaters.

The term HDGLVT is the total admittance of the three heater drain tank level control valves HD61A, B, and C. These valves are identical and driven by the same signal.

The pressure drops throughout the feedwater fluid system, including those in the feedwater heater tubing, those in the valves except as hereinafter described, and the piping losses, are linear throughout the range of their operation. The admittances of all the tube and piping losses are calculated from the specifications for a 100% plant output. The maximum admittance for control valves are calculated from the valve specifications. However, the heater drain tank level control valves HD61A, B, C and the discharge control valve FWCV21 for the motor driven feedwater pump FWPA are non-linear in their characteristics. Also, the characteristics of the pump in the feedwater fluid system FWLUD are non-linear.

According to one embodiment of the invention, the method for maintaining a linear solution of the entire feedwater fluid system with non-linear components is described in connection with FIGS. 105/2, 105/3, and 105/4. In carrying out this method, the pump and valve simulations are solved in accordance with their admittances. Referring to FIG. 105/2, the nearly parabolic pump head versus pump flow characteristic is converted to linear admittances by utilizing three segments, G1, G2, and G3, for the main feedwater pumps. Two straight line segments are used for the condensate boosters and heater drain pumps to approximate the curvature of the pumps head versus flow curve (not shown).

In obtaining the equations for these three straight line segments, the manufacturers head versus capacity curve at rated speed is approximated. The coordinates are noted for each intersection and then used to calculate the slopes for the straight line segments. The intercepts on the Y-axis for all the segments are found by mathematically extending the lines to the Y-axis. Points PO,1 and PO,2 and PO,3 in FIG. 105/2 are the Y-axis intercept for the three segments G1, G2 and G3. The Y intercept is the pressure that would result from having zero flow through the pumps. However, only segment G1 is valid for zero flow since the program FWFLUD selects segment G1 for low flows.

The pump characteristic curve depends on the speed at which the pump is operating. Thus, at half speed, the pump characteristic curve is different. The segments of FIG. 105/2 for half speed are labeled as G1H, G2H and G3H. The shape of the curve remains the same although its size is reduced at lower speeds. Also, the slope of the line segments G1H, G2H and G3H remain the same while the intercept on the Y-axis smaller.

The variation of the pump head pressure versus pump flow characteristic with pump speed is found in accordance with the following equation:
$$H = K_1 N + K_2 V^2$$

where:
$H$ is head, $N$ is normalized speed, and $V$ is flow.
At zero flow, $$H = K_1 N$$

so that $Ho$ (zero flow head) is a linear function of speed, as follows:

$$Ho = K_1 N$$

In selecting the proper line segment for a particular pump, it is necessary to know the flow at which the pump line segments will intercept; that is, the break point flow. For example, the intersections of the line segments G2 and G3 for rated speed is shown on the flow or X-axis as $FW_{X,3}$; and the intersection of the line segment G2H and G3H are shown on the X-axis as $W_{X,3}$. Thus, if the $K_{X,3}$ is a constant and N is the normalized pump speed and $W_{X,3}$ is the break point flow, then $W_{X,3}$ equal $K_{X,3N}$. By knowing the break point flow and the pump flow, from a previous time step or calculation, the correct line segment is chosen to represent the pump characteristic during the current time step.

Referring to FIG. 105/3 and analogy which illustrates a problem due to round-off error in a computer, is shown, and it implements the well-known technique for connecting two non-ideal sources to a system load where PO,1 and G1 represent one source and PO,2 and G2 represent the other source. The internal admittance is the reciprocal of the slope of the line segments. An open circuit voltage is analogous to the zero flow head. Because of the computer round-off error the actual intersection of two line segments may vary from the calculated value, and an inaccurate flow is then calculated, which is overcome as hereinafter described.

Referring to FIG. 105/4, which illustrates a head versus flow calculation in accordance with the analogy of FIG. 105/3, the system load line is determined by the system load resistance, and the line segments G1 and G2 are determined by the source open circuit voltages and internal admittances in accordance with the electrical analogy previously mentioned.

Due to round-off error, in certain instances, where the actual intersection of the line segments G1 and G2 of FIG. 105/4 referred to as $W_X$ is to the left of the calculated intersection $W_X$, a solution involving segment G1 will yield a flow which is greater than the precalculated break point flow $W_X$. Because segment G2 should be utilized in simulating the pumps operation in this event, a new solution with segment G2 is performed. However, the actual flow $W_X$ in this instance is less than the flow $W_X$ calculated. Therefore, the break point flow $W_X$ calculated is reduced by a small amount to insure that it is always to the left of the actual break point flow.

The heater drain pumps HDPA, HDPB, and HDPC are preferably simulated by a single equivalent pump. The simulation by an equivalent single pump is possible because the discharge valves HD61A, B, C and the speed control is common to all three pumps. In this simulation, when the zero flow pressure is greater than the pump discharge header pressure, the equivalent pump admittances are increased by the admittance of an additional pump. Also, the equivalent zero flow pressure becomes the average of all the pump zero flow pressures. The head of the pump is converted to pressure by assuming a constant fluid specific gravity of 0.91. In this simulation, the single equivalent pump is represented by two line segments with the flow break point between the first and second segment being dependent upon certain specified coordinates characteristic of the pump.

Similarly, the condensate pumps CD102 through CD105 and their associated booster pumps CDB102 through CDB105 are lumped into a single equivalent pump. Although, in the actual fluid system the condensate pumps and their associated booster pumps are separated by the gland steam condensers and the deaeration condensers as well as the valves FWCVO1 (A)(B), the network linear simulation permits the combination of the pumps CD and CDB. A constant specific gravity of one is utilized, which permits the direct use of pressure rather than heads and units of flow. For the condensate stage and the condensate booster stage, coordinates are utilized for flow and pressure in accordance with the particular pump, a flow break point between the two line segments for the lump single equivalent condensate pumps and condensate booster pumps is determined and such equivalent pump has a zero flow pressure which is the sum of the two individual zero flow pressures of the condensate and the condensate booster pumps. The internal admittance of the pumps and their associated booster pumps are combined in series in the network to give the equivalent pump in internal admittance.

With respect to the feedwater pumps FWPA, FWPB, and FWPC, each one is preferably modeled individually; and because the water density varies with feedwater temperature, the feedwater pumps are simulated on the basis of head and volumetric flow. Because head and volumetric flow rather than pressure and mass flow are utilized, the pump linear approximation is represented as follows:

$$H = H_O - KQ$$

where:
 $H$ is head(feet),
 $K$ is an internal impedance, and
 $V$ is volumetric flow ($FT^3/HR/10^6$).
 Note that:

$$P = H_O[(\gamma)/(144)] - [(K)/(144)]v$$

where:
 $\tau$ is fluid density ($LB_m/FT^3$) and
 $P$ is pressure ($LB_f/IN^2$)
 Further, note that:
 $W = \gamma V$ where:
 $W$ is mass flow ($LB/HR/10^6$)
so that:

$$P = H_O[(\gamma)/(144)]-(\kappa)/(144)]W = P_o - W/G$$

where:
 $G$ is the pump internal admittance, and
 $P_o$ is the zero flow pressure.

With respect to the valve PWCV21 (FIG. 105B), a representative flow coefficient is calculated as a function of a valve which is simulated as admittance is accordance with the illustration of FIG. 105/5. The admittance of the valve is a function of valve position. The pressure drop $\Delta P$ is calculated as follows:

$$V = C_v\sqrt{(\Delta P/G)}$$

where:
 $V$ is volumetric flow $(GAL/MIN)$,
 $\Delta P$ is pressure drop (PSID), and
 $G$ is specific gravity of the fluid (assumed to be constant at 0.88).

Since the pressure drop and the flow are known, the admittance at the valve position can be calculated. Four line segments V1, V2, V3, and V4 are used to represent the valve flow characteristic as a function of valve position. Typical admittances are:

| Admittance $(LB_m/HR/10^6)/(LB_f/IN^2)$ | Valve position (percent) |
|---|---|
| 0.0 | 0.0 |
| $3.409 \times 10^{-2}$ | 23.6 |
| $6.996 \times 10^{-2}$ | 32.86 |
| $8.624 \times 10^{-2}$ | 64.3 |
| $1.25 \times 10^{-1}$ | 100. |

Referring to the electrical analog of FIG. 105/6, the actual system includes three individual valves HD61(A), (B), and (C) that connect with respective heater strings between the feedwater heaters 15A and 15AD, 15B and 15BC, and 15C and 15CD, respectively.

Referring to FIG. 105/7, when all the feed heater isolation valves FWCVO2 through FWCVO7 are open, symmetry permits the use of one equivalent valve HD61 for the valves HD61A, B, C. When any one of the feed heater strings 11A through 15A or 11B through 15B or 11C through 15C are isolated the admittance of the equivalvent level control valve HD61 is reduced by one-third. Thus, when a string is isolated the flow contribution of the associated heater drain level control valve HD61(A) or (B), or (C) is zero. Accordingly, the analogous electrical networks can be connected as shown in FIG. 105/7 to reduce substantially the number of equations to solve in the simulation. During the isolation process, when one or more of the feedwater heater strings are being isolated, the modeling may be slightly imperfect during the travel of the valves; however, by completion of the valve stroke the simulation is valid.

Referring again to FIG. 105/1, the admittances which correspond to pump admittances depend upon pump flows. In selecting the proper admittances, the pump flows and the calculations from the previous time step are utilized. After the network is solved, the new pump flows are utilized to check the assumed pump admittances. In the event one of the pump admittances is invalid, the network is immediately recalculated with the correct admittance. All flows are checked for reverse flows at points where check valves are used; and if reverse flow is indicated, the network is re-solved with the proper admittance set to zero. Although, the network could be solved many times during a single time step for the reasons just considered, the number of iterations has been limited in the present embodiment of the invention to a number maximum.

The solution of the nine linear equations in connection with the electrical analogy previously mentioned is accomplished by means of the subroutine CROUT hereinafter described. In solving the feedwater equations, an algorithm is used in CROUT to reduce a square symmetric matrix to an upper triangular matrix. An explicit solution for the system of equations is provided by using the CROUT algorithm offline; and by back substitution, a vector of unknowns is obtained. It will be noted from the below described equations that a sparse and symmetric matrix is obtained. In producing the upper triangular matrix, the following procedure is utilized. First, a matrix equation is formed as follows:

$$T_{ij} = \frac{1}{L_{ij}} \left[ A_{ij} - \sum_{r=1}^{i-1} L_{ir} T_{rj} \right] \quad T_{ij} = \frac{A_{1i}}{n_{11}}$$

Thus, as shown above an upper triangular matrix and a lower triangular matrix is obtained. The upper triangular matrix is then used in the back substitution to obtain the vector X as follows:

$$\begin{bmatrix} 1 & T(1,2) & & & & & & & \\ & 1 & T(2,3) & T(2,4) & & & & & \\ & & 1 & T(3,4) & & & & & \\ & & & 1 & T(4,5) & T(4,6) & T(4,7) & & \\ & & & & 1 & T(5,6) & T(5,7) & T(5,8) & \\ & & & & & 1 & T(6,7) & T(6,8) & \\ & & & & & & 1 & T(7,8) & \\ & & & & & & & 1 & T(8,9) \\ & & & & & & & & 1 \end{bmatrix} \begin{bmatrix} X(1) \\ X(2) \\ X(3) \\ X(4) \\ X(5) \\ X(6) \\ X(7) \\ X(8) \\ X(9) \end{bmatrix} - \begin{bmatrix} K(1) \\ K(2) \\ K(3) \\ K(4) \\ K(5) \\ K(6) \\ K(7) \\ K(8) \\ K(9) \end{bmatrix} = \begin{bmatrix} K(1) \\ K(2) \\ K(3) \\ K(4) \\ K(5) \\ K(6) \\ K(7) \\ K(8) \\ K(9) \end{bmatrix}$$

$$\begin{bmatrix} 1) & A(1,2) & & & & & & & \\ 2) & (2,2) & A(2,3) & A(2,4) & & & & & \\ & A(2,3) & A(3,3) & A(3,4) & & & & & \\ & A(2,4) & A(3,4) & A(4,4) & A(4,5) & A(4,6) & A(4,7) & & \\ & & & A(4,5) & A(5,5) & & & A(5,8) & \\ & & & A(4,6) & & A(6,6) & & A(6,8) & \\ & & & A(4,7) & & & A(7,7) & A(7,8) & \\ & & & & A(5,8) & A(6,8) & A(7,8) & A(8,8) & A(8,9) \\ & & & & & & & A(8,9) & A(9,9) \end{bmatrix} \begin{bmatrix} B(1) \\ 0 \\ B(3) \\ B(4) \\ B(5) \\ B(6) \\ B(7) \\ B(8) \\ B(9) \end{bmatrix} =$$

$$\begin{bmatrix} 1) & & & & & & & & \\ 2) & L(2,2) & & & & & & & \\ & A(2,3) & L(3,3) & & & & & & \\ & A(2,4) & L(4,3) & L(4,4) & & & & & \\ & & & A(4,5) & L(5,5) & & & & \\ & & & A(4,6) & L(6,5) & L(6,6) & & & \\ & & & A(4,7) & L(7,5) & L(7,6) & L(7,7) & & \\ & & & & A(5,8) & L(8,6) & L(8,7) & L(8,8) & \\ & & & & & & & A(8,9) & L(9,9) \end{bmatrix} \begin{bmatrix} 1 & T(1,2) & & & & & & & \\ & 1 & T(2,3) & T(2,4) & & & & & \\ & & 1 & T(3,4) & & & & & \\ & & & 1 & T(4,5) & T4,6) & T(4,7) & & \\ & & & & 1 & T(5,6) & T(5,7) & T(5,8) & \\ & & & & & 1 & T(6,7) & T(6,8) & \\ & & & & & & 1 & T(7,8) & \\ & & & & & & & 1 & T(8,9) \\ & & & & & & & & 1 \end{bmatrix} \begin{bmatrix} K(1) \\ K(2) \\ K(3) \\ K(4) \\ K(5) \\ K(6) \\ K(7) \\ K(8) \\ K(9) \end{bmatrix}$$

$$AX = C$$

where:

$$\underline{A} = \begin{bmatrix} a11 & A12 & A_{1m} \\ a21 & A22 & A_{2m} \\ a_{n1} & A_{n2} & A_{nm} \end{bmatrix} \quad \underline{X} = \begin{bmatrix} X_1 \\ X_2 \\ X_n \end{bmatrix} \quad \underline{C} = \begin{bmatrix} C_1 \\ C_2 \\ C_n \end{bmatrix}$$

The augmented matrix is formed from the matrix A and column matric C which is decomposed as:

$$\begin{bmatrix} a11 & A12 & A1 & C1 \\ a21 & A72 & A2 & C2 \\ \cdot & & & \\ \cdot & & & \\ A_{n1} & A_{n2} & A_{nm} & C_{n1} \end{bmatrix} = \begin{bmatrix} L_{11} & & & \\ L_{12} & L_{22} & & \\ \cdot & & & \\ \cdot & & L & L_{nm} \\ L_n & & X & \end{bmatrix} \cdot \begin{bmatrix} I & T_{12} & T_{13} & \cdots & T_1 K_1 \\ & I & T_{23} & & T_2 K_2 \\ & & \cdot & & \\ & & & \cdot & \\ & & & & I K_n \end{bmatrix}$$

From this decomposition, the following general relationships apply:

$$L_{ij} = A_{ij} - \sum_{r=1}^{j-1} L_{ir} T_{rj} L_{i1} = A_{i1}$$

Circulating Water System Simulation (CIRWR)

Figure 93M:
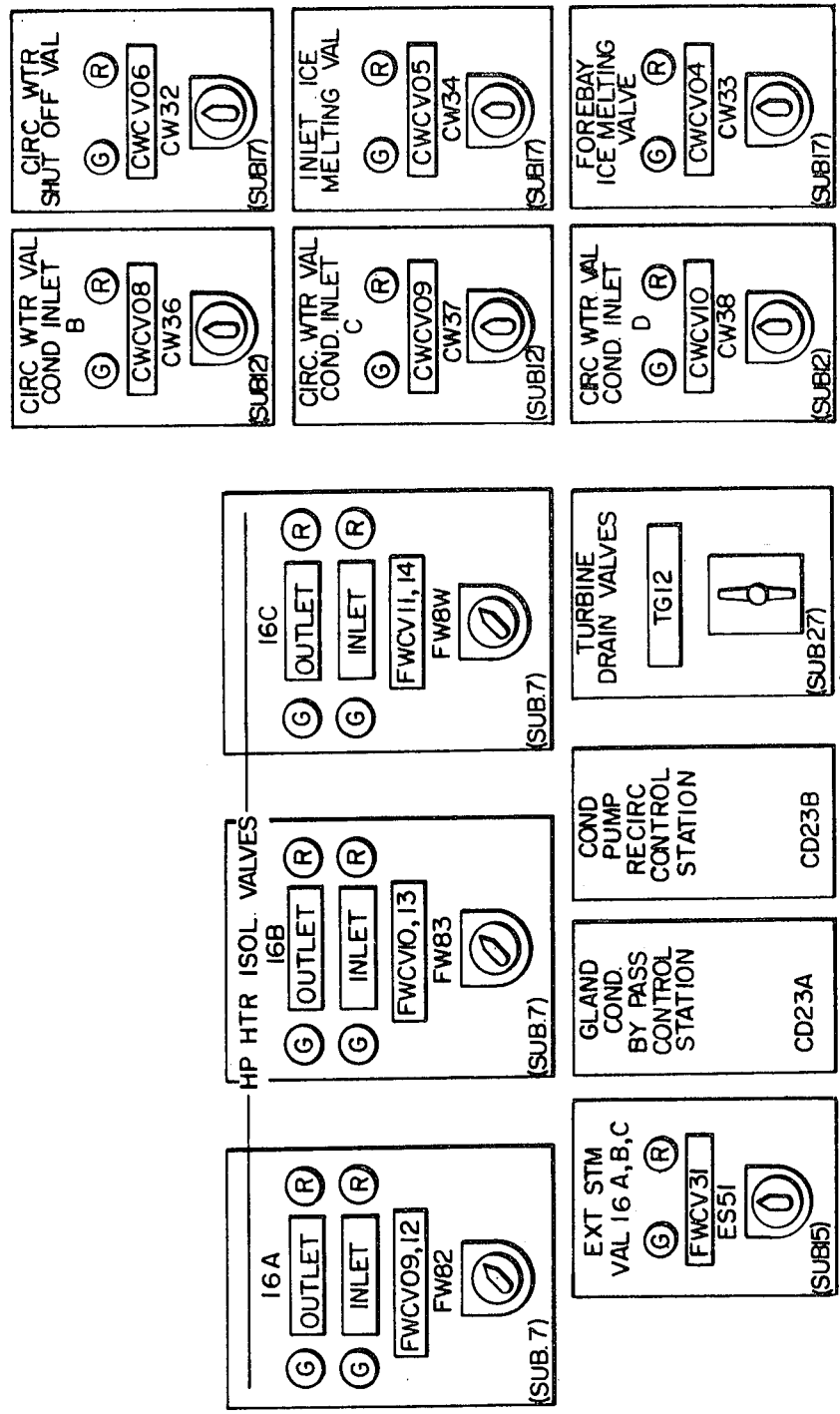
Figure 93N:
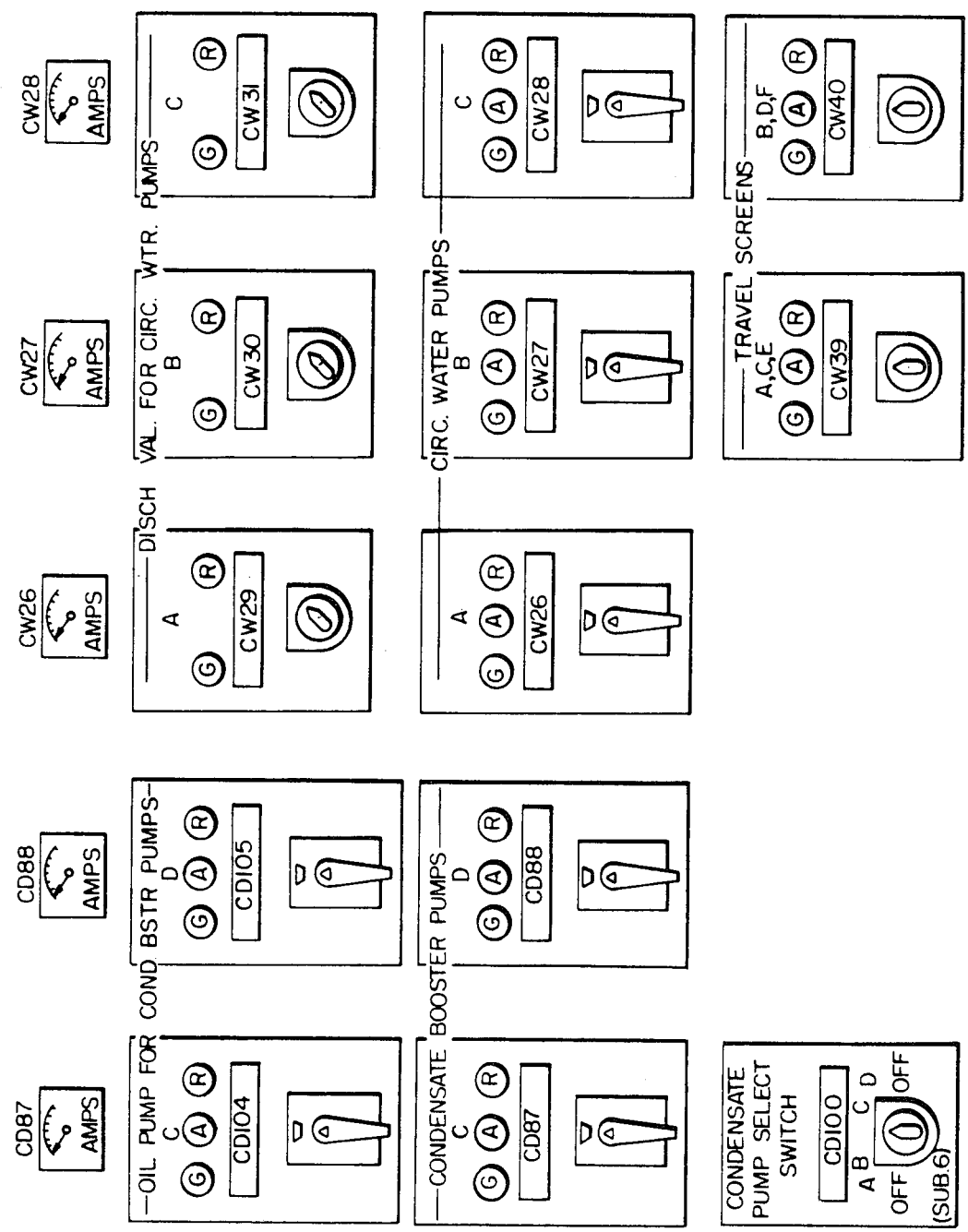
Figure 93:
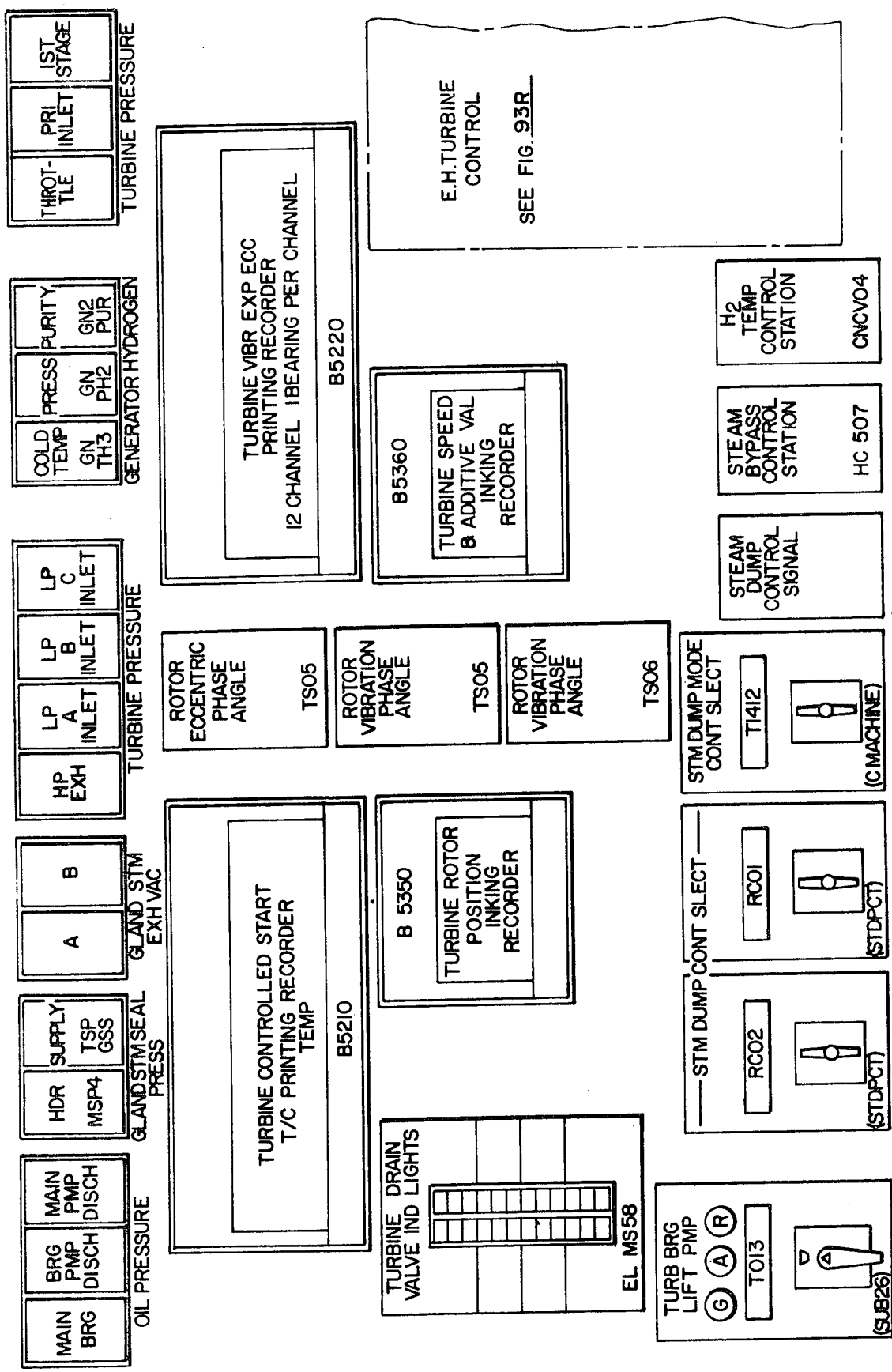

Referring to FIGS. 93L, 93M and 93N of the control consoles, and FIG. 107 the circulating water system simulation T61 will be described in connection with the analogous electrical network of FIG. 107/1 and 107/2. The system CIRWTR is capable of simulating the operation of any or all valves in the circulating water system, the operation of any or all of the pumps CWPP(A), (B), (C) in the system, and the closure of the inlet gate valve and its effect on the level of the water in the fore bay structure.

The inputs to the simulation are the pertaining valve admittances and pump speeds from the valve handler program and the pump handler program hereinbefore described. The total circulating water flow CWWT to the condenser CNDSR is the only output of this system that is used by other models or programs. In the control panels there are outputs that provide for the various valve position indications, the fore bay level structure and the circulating water pump differential pressures.

Figure 107:
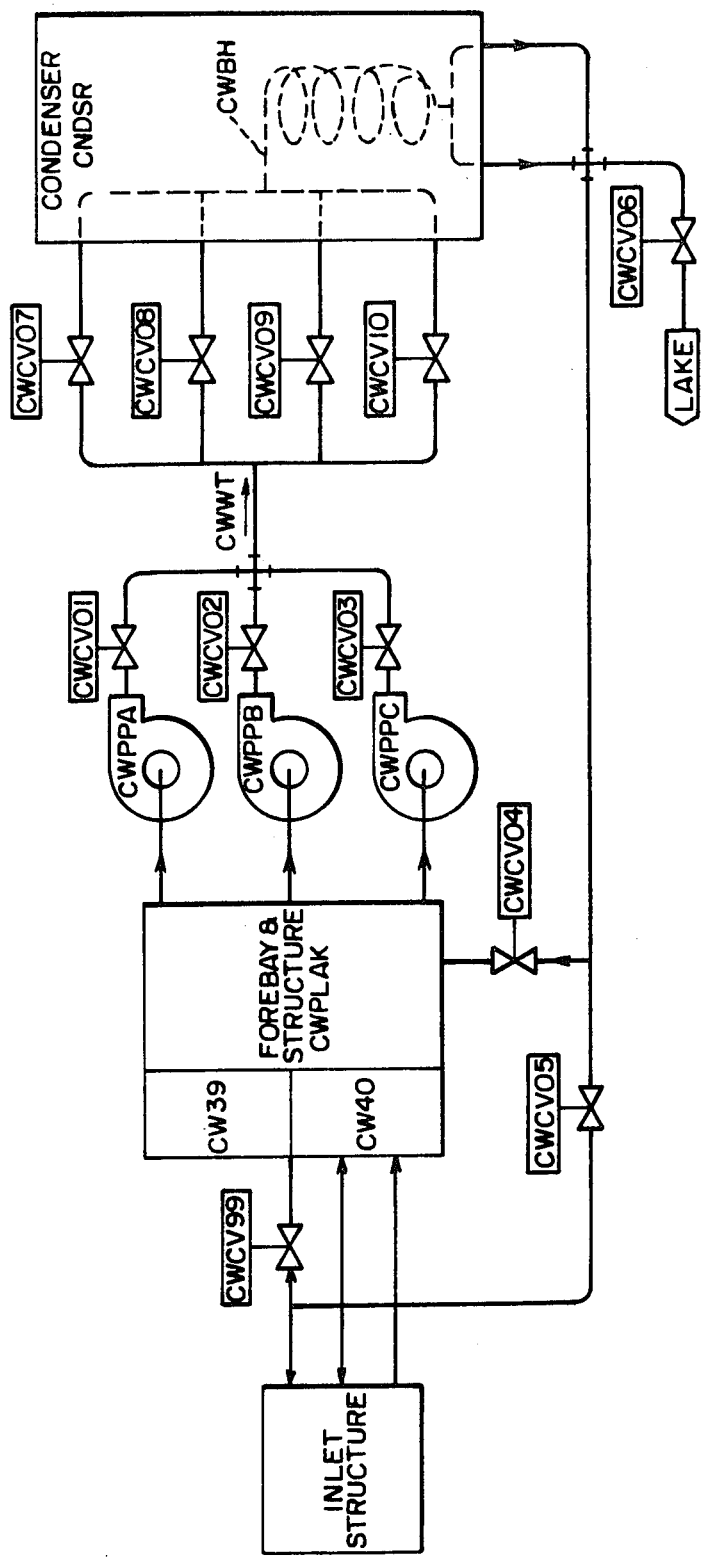
FIG. 107 is a schematic diagram of the circulating water system of the type simulated in accordance with the present embodiment of the invention.

Referring to FIG. 107/2, each pump CWPPA, CWPPB, and CWPPC is simulated as an ideal voltage source with an internal admittance, while piping pressure drops and valve effects are simulated with linear admittances. The network is solved by a node equation for the pump discharge header CWWT. It should be noted that the pump header node can be isolated by closing all the pump discharge valves CWCV01, CWCV02 and CWCV03 and all the condenser water box valves CWCV07, CWCV08, CWCV09 and CWCV10. In this event, the header pressure CWPHD1 is permitted to decay rapidly and all flows are set to zero. The condenser water box discharge header CWPH may also be isolated by the closing of the condenser water box valve CWCV07 through CWCV10, and it is treated in a similar manner.

Referring to FIG. 107 under normal conditions the main water intake from the lake is through the inlet gate valve CWCV99; but under winter operating conditions for example, it is sometimes desirable to close the inlet gate valve CWCV99, and recirculate warm water out to the inlet structure to valve CWCV05 rather than discharge the water from the condenser directly to the lake through CWCV06. The fore bay is a tank that is represented by a capacitance (See FIG. 107/1). The static pressure or head at the inlet structure CWPLAK is assumed constant. The pressure or head at the fore bay structure inlet is a function of the water level in the fore bay structure. This level is determined by a mass balance of the inflows and outflows. For example, should the inlet gate valve CWCV99 be closed, the flow contribution of one inlet line to the four bay structure is lost, resulting in a reduction in level.

The circulating water pump CWPPA, CWPPB, and CWPPC are simulated according to head versus capacity curves inherent in the pump operation. The parabolic nature of these curves is simulated by two straight line segments. The head versus capacity curves are converted to pressure versus mass flow curves by assuming a constant specific gravity; and the segments pass through the following points when the pump is at a particular rated speed:

| PRESSURE | FLOW |
|---|---|
| 25.50 | 0.00 |
| 18.20 | 122.64 |
| 0.0 | 195.00 |

The two shutoff pressures for the segments are 25.5 and 48.95 PSID while the corresponding internal admittances are 16.846 and 3.9835 ($lb_m$ — $In^2$)/hr — $10^6$ — $lb_f$). The inner section of the two straight line segments is located at a flow of 122.64 × $n$(1b/hr/$10^6$), where n is the normalized pump speed.

The shutoff pressures for the two straight line segments vary linearly with pump speed, while the internal admittances remain constant. The determination of which shutoff pressure and associated admittance should be used depends upon the break point flow. The break point flow is that flow of the pump where the line segments intersect. At rated pump spaced this flow is 122.64 1b/hr/$10^6$. When the actual pump flow is greater than the break point flow, the second segment is used to simulate the pumps. A more detailed description of the pump simulation is given in connection with the description of the main feedwater system simulation PWFLUD.

As previously mentioned, the piping pressure drops and all the valves in the system are simulated as linear admittances, with the exception of the three valves CWCV01, CWCV02, and CWCV03. The last mentioned valves are used for throttling and their valve positions are displayed in the central office. The admittance of these valves is made proportional to the flow area, and the flow area is determined by the following trigonometric equation:

$$A = (1 - \cos(x)) A_{max}$$

where $A$ = area
$A_{max}$ = maximum area
$x$ = valve position (0 to $\pi/2$).

The function $G = (1 = \cos(x)) G_{max}$
where $G$ = valve Admittance ($lb_m$ — $IN^2$/hr/$10^6$/$lb_f$)
$G_{max}$ = maximum admittance The admittance is simulated by three straight line approximations. The pump discharge valves CWCV(01),(02), (03) are assumed to have a 3 PSID pressure drop at the pump design flow of 122.64 1b/hr/$10^6$. This assumption results in a maximum admittance of 40.80 ($lb_m$ — $IN^2$)/(hr — $10^6$ — $lb_f$). The total resistance downstream of the pumpheader CWWT comprises the condenser tubes and the valves CWCV07 through CWCV10, and the circulating water return line and its valve CWV06.

The design conditions for the preferred embodiment specify two circulating water pumps CWPP in operation, with each pump providing a flow of 122.64 (1b/hr/$10^6$), at a discharge pressure of 18.2 PSID. The total pressure drop from the pump header CWPHD1 to the lake discharge must be (18.2 — 3.0) equals 15.2 PSID at a total flow of 245.28 (1b/hr/$10^6$). Under these design conditions, the admittances of the individual downstream components have been produced. A drop of 2 PSID is assumed for the circulating return valves CWC05 at the above flow. The resulting maximum admittance 122.64 ($lb_m$ — $IN^2$)/(hr — $10^6$ — $lb_f$), the piping pressure loss is lumped with the valve pressure loss. The remaining pressure drop of 13.2 PSID is lost across the four sets of condenser tubes and their associated valves CWCV07-10 inclusive. The admittances of one set of condenser tubes and its associated valve is:

4.65 ($lb_m$ — $IN^2$)/(hr — $10^6$ — $lb_f$).

The network is given an admittance that ranges from 0 to 4.65, depending on the valve position. The flow through the tubes depends solely on this admittance. Referring to FIG. 4A49, the differential pressure across the condenser tubes is displayed on the control console. This value is generated by utilizing the flow and dividing it by the estimated constant admittance. This method effectively multiplies the valve admittance andd the tube admittance. The constant for the estimated admittance results from an assumed differential pressure of 6.5 PSID at a flow of (245.28/4.0) = 61.32 (1b/hr/$10^6$).

The inlet bottle ice melting valves CWCV05 and the four bay inlet ice melting valve CWCV04 having admittances that are deduced from the circulating water return valve. Estimates of these maximum admittances are obtained by multiplying the return valve admittance by the ratio of the valve areas. The inlet bottle valve is a 12 foot valve, and the return valve is a 14 foot valve. Therefore the maximum valve admittance is 90.0 ($lb_m$ — $IN^2$)/(hr — $10^6 lb_f$). The fore bay ice melt valve is an 8 foot valve and similarly has an admittance of 40.0 ($lb_m$ — $IN^2$)/(hr — $10^6$ — $lb_f$).

GLAND STEAM SEAL SYSTEM

Figure 93P:
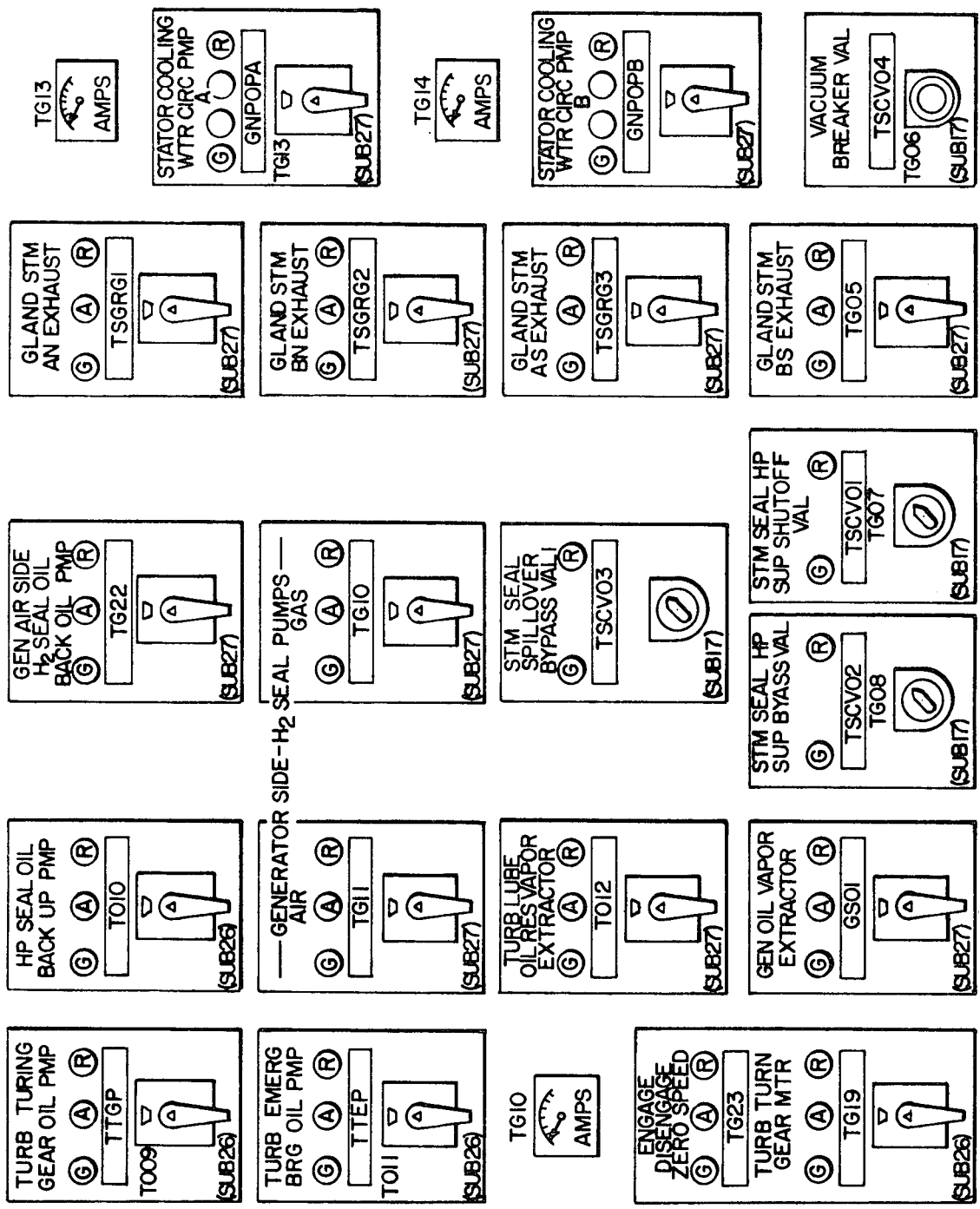

Referring to FIG. 109, and that portion of the control console illustrated in FIGS. 930 and 93P, the gland seal system conducts steam from the main steam header through supply valve TSCV01, regulator valve TSGRG1, and the low pressure and high puressure labyrinth seals on the rotors of the main steam turbines.

The gland seal system prevents the leakage of air into, or steam from the turbine cylinders along the rotor ends. After sealing the labyrinth seals, the steam goes to a gland condenser. The purpose of a gland steam seal system is well known and needs no further description

Gland Steam Seal System Simulation (BOPAUX)

The gland steam system which is included in model T47 (BOPAUX) is capable pof simulating manipulation of all the motor operated bypass and shutoff valves in the seal system; (see FIG. 93P), the effect of main steam header pressure variations on seal system pressures as indicated in the meters in FIG. 93O, and the effect of the high pressure turbine internal pressure on the seal system pressures.

The inputs to the model BOPAUX include main steam header puressure MSPH, and normalized turbine impulse pressure HPWIN. The syste has two outputs, gland steam seal supply pressure TSPGSS, and gland steam header pressure TSPGSH.

In simulating the system, the assumption has been made that a total design steam seal flow of 1000 pounds per hour applies. This assumed flow could be any appropriate value because the gland seal steam flow is not considered in the steam plant balance.

Referring to FIGS. 109/1 and 109/2, the model BOPAUX is formed by two parts. In FIG. 109/1, the first part shows the electrical analogy of the valves and piping that reduce the main steam header pressure MSPH and establish a supply pressure TSPGSS at approximately 140 psia for example. Referring to FIG. 109/2, the second portion of the system is the combination of piping and valves that maintain the required pressure, such as 16 to 80 psia, for example, in the high pressure turbine seals. The sizes of the individual valves have been estimated on manufacturer's information.

In FIG. 109/1, the constant load is represented by the admittances TSKG1. Because the design considerations require a 140 psia pressure and a flow of $1.0 \times 10^{-3}$ lb/hr/$10^6$, the load admittance TSKG1 is calculated in accordance with the following:

$$SKG1 = \frac{1.0 \times 10^{-3}}{(140 - 0)} = 7.15 \times 10^{-6} \left[ \frac{lb/hr/10^6}{psi} \right]$$

A main steam header pressure MSPH of 185 psia will permit a supply pressure TSPGSS of 140 psia to be maintained. If the shutoff valve TSCV01 admittance is assumed to be ten times greater than the regulator TSGRG1 admittance, and the assumed flow as previously described is used, the maximum regulator admittance is as follows:

$$\frac{10[TSGRG1_{max}]^2}{[1 + 10]TSGRG1_{max}} = \frac{1.0 \times 10^{-3}}{185 - 140}$$

$TSGRG1_{max} = 2.44 \times 10^{-5}$ (lb/hr/$10^6$)/(lb psi-/IN$^2$)

and:

$TSVC01_{max} = 2.44 \times 10^{-4}$ (lb/hr/$10^6$)/psi).

The bypass valve TSCV02 is assumed to have the same maximum admittance as the regulator admittance TSGRG1.

The regulator valve is assumed to have a proportional-plus-integral transfer function. The proportional band is assumed to be 75 psia, the reset time is assumed to be 30 seconds, and the set point is 140 psia. The regulator valve TSGRG1 is assumed to have a time constant of five seconds. A single node equation applies to the supply header node.

Referring to FIG. 109/2, the gland steam seal header pressure TSPGSH involves the high pressure turbine seals exclusively. The header pressure TSPGSH is influenced by both the supply pressure TSPGSS and the internal pressure of the high pressure turbine TRIPHP. When the high pressure turbine pressure TRIPHP is low, the regulator TSGRG2 maintains the pressure at approximately 16 psia. When the turbine pressure is greater than 16 psia, the regulator TSGRG3 ccontrols the pressure. The admittance TSKG2 represents the piping resistance; and the bypass valve TSCVO3 is utilized if there is a failure of the regulator TSGRG3.

A value for the regulator admittance TSGRG2 is calculated by assuming that one fourth of the assumed flow of 1000 pounds per hr. for example, is used to seal the high pressure turbine. For a header pressuree of 16 psia, a supply pressure of 140 psia, a flow of 250 pounds per hr., and a regulator that is half open, the maximum admittance for TSGRG3 as follows:

$$TSGRG3_{max} = \left[ \frac{2.50 \times 10^{-3}}{140 - 16.0} \right] 2 = 1.56 \times 10^{-5} \left[ \frac{lb/hr/10^6}{psi} \right]$$

The constant admittance TSKG2 can be deduced by considering the instance when the turbine pressure is zero and the header pressure is 16 psia. For a flow of 250 pounds per hours, the admittance TSKG2 is as follows:

$$TSKG2 - \frac{2.50 \times 10^{-3}}{160 - 0} = 1.56 \times 10^{-5} \left[ \frac{lb/hr/10^6}{psi} \right]$$

The turbine internal pressure TRIPHP is known to vary with load. Since the turbine is an axial flow machine, the internal pressure that effects the rotor seals is nearly the exhaust pressure of the steam. In actuality this pressure exceeds 20 psia at 10 to 15% of the load. Assuming that such internal pressure TRIPHP is 21 psia for example at 15% of the load, and that the normalized impulse pressure HPWIN is the indication of load, then TRIPHP is calculated as follows:

T21PHP = (21.0/0.15) (HPWIN) = 140.0(HPWIN)

The spillover regulator maximum admittance TSGRG3 can be determined from the 100% load condition of the turbine. The turbine pressure at 100% is 140 psia, the header pressure is in the neighborhood of 20 psia, and regulator admittance TSGRG2 is zero. The node equation can be written to solve for the required value G that will yield a header pressure of 20 psia as follows:

20 = 140 (TSKG$^2$/TSKG2 + G)

G = $9.36 \times 10^{-5}$ (lb/hr/$10^6$/psi)

Assuming that the regulator TSGRG3 is half opened, the maximum admittance would be as follows:

$TSGRG3_{max} = 2[9.36 \times 10^{-5}] = 1.872 \times 10^{-4}$
(lb/hr/10⁶/psi)

The spillover bypass valve TSCVO3 is assumed to have a maximum admittance that is equal to the regulator TSGRG3 maximum admittance. The regulators are assumed to have a porportional-plus-integral transfer function. The proportional bands are both 10 psia, and the reset times are 30 seconds. The header pressure regulator TSGRG2 has a set point of 16 psia, and the spillover regulator TSGRG3 has a set point of 20 psia. The regulators are assumed to have time constants of five seconds.

The header pressure equation is based on FIG. 109/2, i.e., a node equation is solved for the header pressure.

TURBINE CONTROLLER SYSTEM

Figure 93Q:
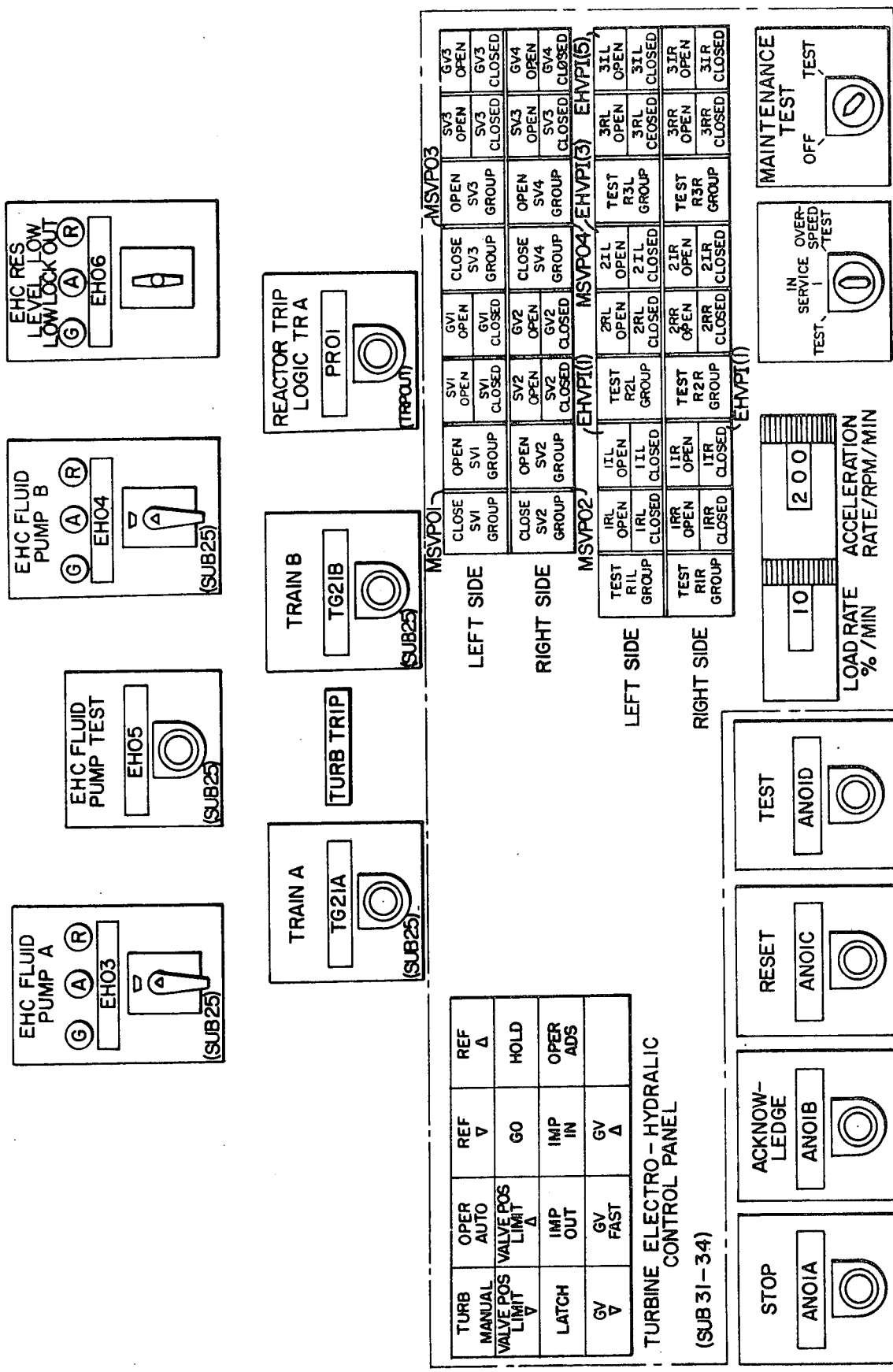
Figure 93R:
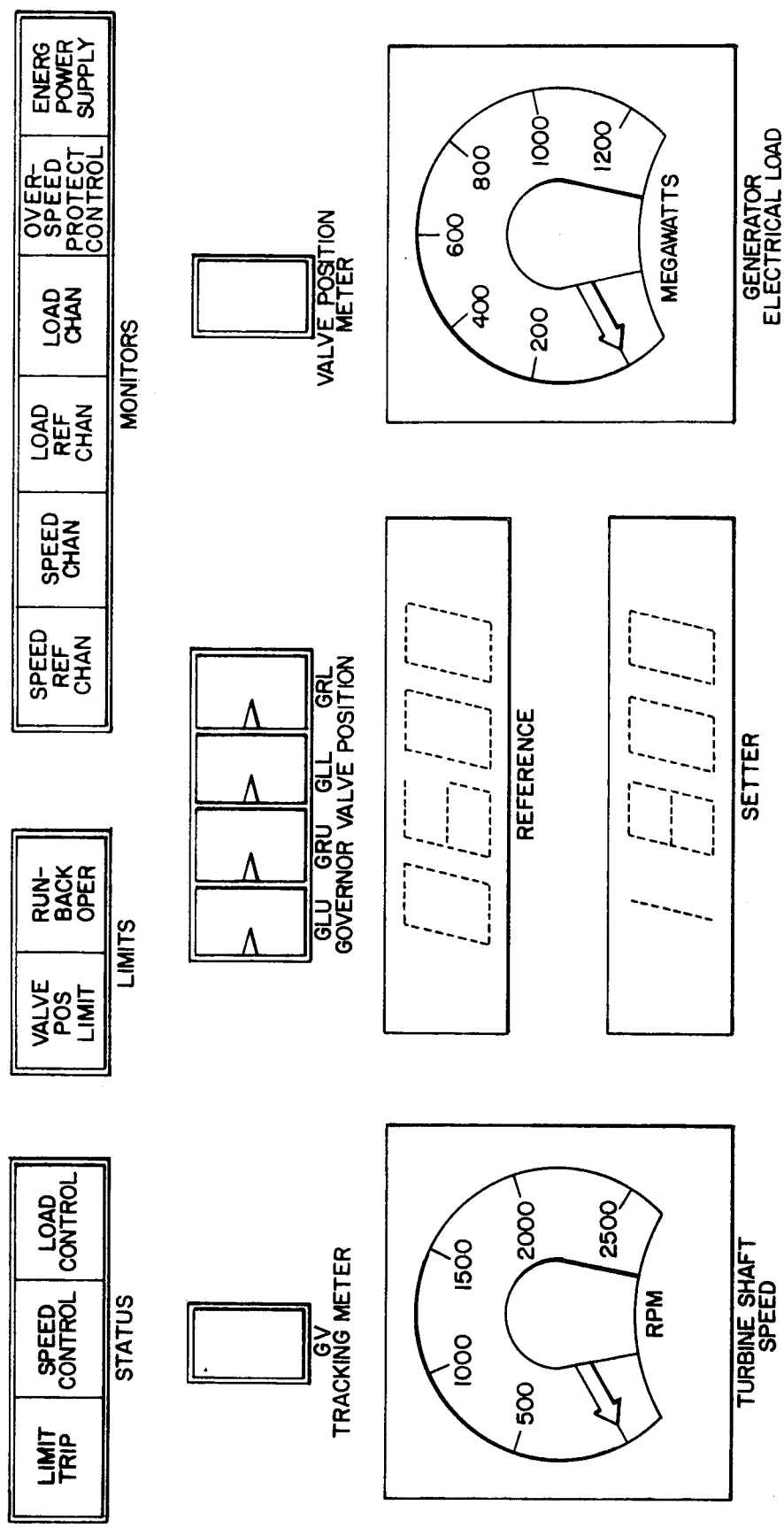

In the system being simulated and referring to FIG. 103, and the control panel illustrated in FIGS. 93Q and 93R, stop valves MSVP(O1), 02, 03, (04), and governor valves EHVPX1, 2, 3, 4, in the four high pressure steam inlet lines provide the prime steam control for the system. The stop valves provide limited startup steam flow control and provide a safety function to abruptly cutoff turbine inlet steam flow if the turbine protection sensors detect a condition that could damage the turbine. In the plant being simulated in the present case, the modulating governing valves EHVP(X1), (X2), (X3), (X4) are under servo control of the analog electrohydraulic EH control system T44, and are used to bring the turbine up to synchronous speed and substantially to maintain control speed as the turbine meets varying electrical load demands. In other plant simulations, the particular manner in which the governor valves are operated under closed loop control can vary without affecting the applicability of most invention features disclosed herein.

Reheat stop valves 1RR, 2RR, 3RR, and 1RL, 2RL, and 3RL, and the intercept valves EHVP (11), (12), (13), (14), (15), and (16) for each of the six low pressure inlet lines regulate the flow from the high pressure steam stored in the high pressure turbine and moisture separator reheater system. The open-close intercept valves IR and IL function to limit the turbine overspeed following an electrical load rejection. The governor valves EHVP (X1), (X2), (X3), (X4), in this situation close to reflect the new load requirement, but even with inlet steam flow cut off the steam already stored in the high pressure turbine and moisture separator reheaters would continue to drive the low pressure turbines and the turbine system would tend to speed up under the decreased electrical load. The intercept valves IR and IL trigger closed at 103% overspeed setting, and begin to reopen slowly after the turbine returns to synchronous speed. If the stored steam again causes an overspeed condition, the intercept valves IR and IL trigger closed again and the cycle is repeated until the stored energy is dissipated. The open-close reheat valve RR and RL operate in conjunction with the stop valves (O2), (O3), (O4) to abruptly secure steam flow to the turbine in the event of a turbine trip and prevent damage to the turbine system.

The hydraulically actuated valves are manipulated by an electrohydraulic high pressure fluid control system. The electrohydraulic pumping system maintains the high pressure on a common header supplying the piston actuators through an inlet control valve system. The return lines to the EH reservoir are secured by back pressure on ball check valves until trip signals open in-line block valves unseating the ball checks, releasing the high pressure hydraulic fluid back to the reservoir, and causing the valves to close abruptly.

The governor valves are positioned by a servo system in response to signals from the EH controller and are tripped closed by hydraulic action. The stop valves reheat valves RR and RL and intercept valves IR and IL are opened by hydraulic pressure below the actuator piston and are tripped closed by a compression spring above the piston when the hydraulic pressure is removed. The governor valves EHVPX1, (X2), (X3), (X4) and intercept valves IR and IL are tripped by solenoid valves in response to a signal from the auxiliary governor to minimize turbine overspeed and prevent a total turbine trip. They are re-opened upon loss of the overspeed signal to stabilize the turbine and synchronous speed. All valves would be tripped by a solenoid valve tied to the reactor trip and steam generator high HI-HI level sensors or by the diaphragm operated valve linking the EH system to the turbine lube oil and automatic stop oil safety system. This action would cause a total turbine trip and effect an associated generator trip. Thus, control of the turbine valves in the system being simulated is accomplished by two interrelated systems: a high pressure fluid system which provides the means to move all the valves; and an electronic controller EH that comprises an analog control system and a protective system of logic.

Figure 110:
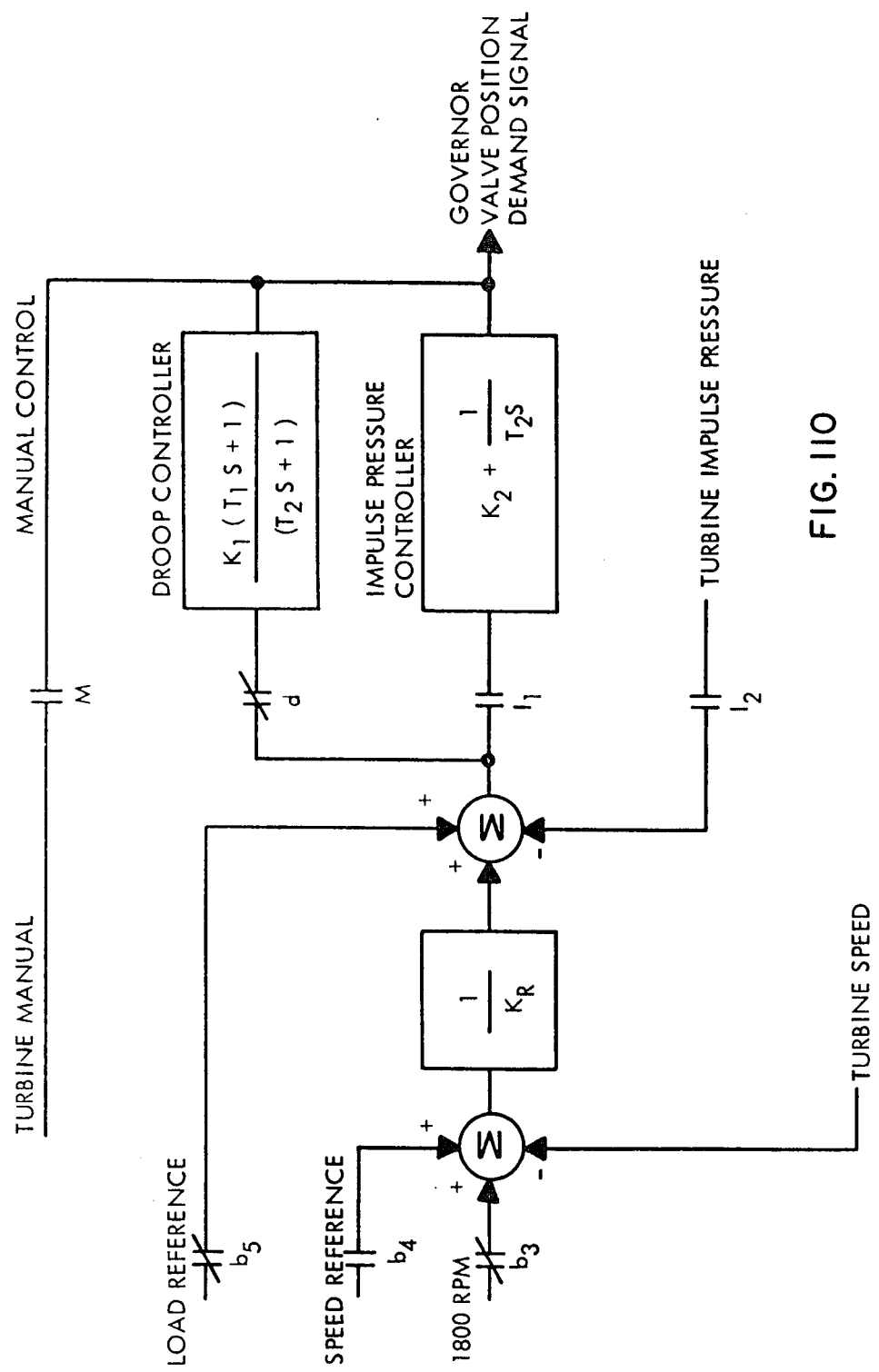
FIG. 110 is a schematic diagram of the analog control system for the electrohydraulic controller of the system simulated.

Referring to FIG. 110, the analog control system in the EH controller modulates the governor control valves EHVPX1, (X2), (X3), (X4), which valves are the primary means of controlling the speed and load. The EH controller is capable of modes of operation that include wide range speed control, load control without turbine impulse pressure feedback, load control with turbine impulse pressure feedback, and turbine manual control.

During wide range speed control, the main generator circuit breaker must be open; and contacts $L_3$, $1_5$, $I_1$, $I_2$, and M are also open. Contacts $B_4$, and $d$ are closed. The controller maintains turbine speed through governor valve positioning as a function of the error between true turbine speed and the speed reference setting on the operator's panel as shown in FIG. 93R.

When the main generator breaker is closed, and the impulse pressure option is not chosen, the turbine load is controlled by the load reference settings. In this instance, contact $b_4$, $I_1$, $I_2$ and M are open, and contacts $b_3$, $b_5$, and $d$ are closed. The EH controller maintains turbine speed at 1800 rpm and responds to the load reference signal 0 to 100% on the operator's panel. In the load mode, the controller output is a function of both turbine speed error and the load reference.

For a substantially linear relation between the load reference and the actual turbine load, the impulse pressure mode is selected. Contacts $b_4$, $d$, and M are then open and contacts $b_3$, $b_5$, $I_1$, and $I_2$ are closed. Turbine impulse pressure is fed back as a measure of turbine load. The controller output responds to turbine speed error and load error in the porportional-plus-integral mode.

In case of a failure in the controller circuits, manual control by the operator is possible. In this event, contacts $d$, $I_1$, and $I_2$ are open, while contact M is closed. Contacts $b_3$, $b_4$ and $b_5$ depend upon the generator circuit breaker status. The plant protective logic, when activated, reduces the controller reference regardless of the operating mode. In speed, load, or manual modes, the controller reference can be reduced at a rate of 200% per minute by providing a contact closure to the controller.

Referring to FIG. 110/1, the overspeed protection controller of the system being simulated is a logic system that augments the analog control system. The system considers plant conditions that affect turbine speed. If a drop in electrical megawatts is detected, a possible turbine overspeed condition is averted by a rapid closure of the intercept valves IR and IL. Furthermore, if turbine speed becomes greater than 103% of rated speed, both the governor valves and intercept valves are closed.

The governor control valves EHVP(X1), (X2), (X3), (X4) are the primary control devices in the turbine system and are controlled by the EH controller. These valves are fast acting valves that are capable of traveling short distances almost instantaneously. They do have a maximum velocity, however, and require approximately 2 seconds to travel the full stroke. The stop valves MSVPO1, (O2), (O3), (O4) are to insure a leak-proof seal at the governor valve. The stop valves can be closed quite rapidly, requiring 0.25 seconds to travel full stroke. In order to re-open, the valves require about 15 seconds to travel completely open. The intercept valves IR and IL are used to shutoff the steam flow to the low pressure turbine, and can close in 0.25 seconds and re-open in 15 seconds. The reheat stop valves RR and RL are also fast in closing and slow in opening. The EH control system has the ability to test any one of the valves. EH controllers for the control of turbine generating systems of the type previously described and simulated in accordance with the present invention have been in general use for more than a year prior to the filling date of this application.

Simulation of Turbine Controller System

In simulating the EH controller as previously described, a complete EH hardware system identical in function to the one utilized in the desired embodiment of the system being simulated, is utilized as part of the simulation. The signals that it normally receives from sensors on the various devices in the actual power plant are provided by the B machine. Such a controller normally provides signals to the appropriate component in the actual system; and these signals are instead received by the B machine.

According to the present invention, and referring to FIG. 110/2 which shows diagramatically the turbine controller system simulation, and FIG. 110/3 which shows diagrammatically the analog circuitry of FIG. 110/2 the simulation of the governor valves EHVP(X1), (X2), (X3), and (X4) is accomplished by analog circuitry that is connected to the EH controller. The valve positions are represented as first order lags with a time constant of 0.10 seconds. However, the velocities of the governor valves are limited to a maximum of 50% stroke per second. The function generators that are normally used in the actual system to linearize total valve capacity with a valve demand signal are also utilized as part of the simulation. For each of the governor valves, analog circuitry is connected to the standard EH controller to be responsive to the governor valve position demand signal as shown in FIG. 110.3.

Referring to FIG. 110/2 and 110/3, a valve demand signal is output on line EH9 by rate amplifier EH10, which rate amplifier is standard in the EH controller of the type previously described. The signal on line EH9 is a DC voltage ranging from 0 to 10 volts which is indicative of the valve demand signal. This signal is input to a mixing amplifier EH11 which develops velocity, and restricts such velocity to certain limits. Zener diodes EH12 and EH13 limit the velocity at the output of the amplifier EH11 to 50% of the total stroke per second. Rate amplifier EH14 integrates the limited velocity signal input on line EH15 into a valve position signal that appears on line EH16. The actual valve position signal is then input to the appropriate valve position indicator on the EH panel of the control office over line EH17. Also, the valve position signal is input on line EH18 to the mixing amplifier EH20. The mixing amplifier EH20 changes the valve position signal sign which signal is transmitted over line EH21 (See FIG. 110/2) to the B machine for use in the calculations of the C machine. Also, this signal is transmitted over line EH22 to the input of the mixing amplifier EH11 to provide a subtraction voltage in the amplifier EH11.

The steam flow to the turbine is calculated in accordance with the valve position signal that is output on EH21 from the amplifier EH20 of the analog circuitry. The actual valve position signal is also input to a function generator EH23 which linearizes the flow capacity of the valve in accordance with the valve demand signal. The linearized signal is then transmitted on output line EH24 to amplifier EH25 which changes the sign of the signal for input on line EH26 to the servo rate amplifier EH10 of the EH controller. The characteristics of the function generator EH23 are determined in accordance with the valve characteristics. For example, for the governor valves EHVPX1, (X2), and (X3) the governor valve demand signal is 70% when the equivalent valve position is 50% and 90% for an equivalent valve position of 100%. The valve EHVPX2 utilizes a 90% demand signal for a 0% valve position, a 94% demand signal for a 50% valve position, and a 100% demand signal for a 100% valve position. Thus, the governor valve simulation which includes the mixing amplifier EH11, the rate amplifier EH14 and the mixing amplifier EH20 as previously described provides a realistic dynamic simulation to obtain a very smooth response on the valve position indicators on the EH control panel.

The simulation of the governor valve flow characteristics is performed in the C machine. As previously mentioned, the governor valve positions are received as analog inputs at the output of the mixing amplifier EH20, and the valve flow coefficients $C_V$ are calculated therefrom. The two possible flow conditions include normal and choked flow. The pressure difference at the governor valve is defined as follows:

$$dP = P_{up} - P_{down}$$

where $dP$ equals the pressure difference, $P_{up}$ is the pressure upstream of the valve, and $P_{down}$ is the pressure downstream of the valve. When the pressure difference is less than one-half the upstream pressure; that is $$dP \leq (P_{up}/2)$$

the flow is called normal flow. When the pressure difference is greater than one-half the upstream pressure then the flow is termed choked flow. The square law flow equation is:

$$W = C_V K \sqrt{(\Delta P/v)}$$

where $\Delta P = (P_{up}/2)$ or $P_{up} - P_{down}$, whichever is smaller.

The turbine steam flow calculation is performed by solving a set of linear algebraic equations with linear admittances. However, the turbine governor valve flow characteristics are non-linear and accuracy is important. Thus it is necessary to determine a linear admittance that includes the square law flow equation and the effects of choke flow when necessary. In accomplishing this, the flow is calculated with the pressure difference $\Delta P$ depending on choke or normal flow conditions. Admittance G is calculated from the flow W and the upstream and downstream pressures as follows:

$$G = \frac{W}{P_{up} - P_{down}} = \frac{CvK\sqrt{\frac{\Delta P}{V}}}{P_{up} - P_{down}}$$

The upstream and downstream pressures are always used since the admittance G is assumed to be linear when the algebraic equations are solved.

The stop, intercept and reheat stop valves are simulated as integers on the B machine. When logical conditions in the EH controller or station indicates that a valve should be closed, the appropriate valve position is set to zero. When the logical condition is removed, the valve position integrates upward with a stroke time of 15 seconds. Valve position limit switches are simulated by checking the integer valve.

The high pressure fluid system which includes pumps and accumulators is simulated to yield a functional system without a complicated model. The high pressure fluid system is simulated by merely simulating the function of the pumps which maintains the fluid pressure to keep the valves opened. Should the pumps be disabled, the turbine will trip after a time delay of 100 seconds which corresponds to the time delay for closing the valves after a loss of fluid pressure. Also, when an intercept valve is being re-opened, the fluid pressure in the valve is not calculated, but the valve stroke time is based on the actual valve stroke time. The turbine trip device is simulated by a set over reset software flip-flop wherein the set conditions include high condenser pressure, loss of turbine bearing oil pressure, turbine speed greater than 110% of rated speed, manual turbine trip, reactor trip, loss of both electrohydraulic fluid pumps at the high pressure system for 100 seconds, and the trip of all feedwater pumps. In order to reset the trip, the trip conditions must be clear and the latch pushbutton on the EH console must be pressed for 2 seconds which simulates the mechanical time delay that is required to relatch the trip circuit.

Referring again to FIG. 110/2, the turbine speed signal received from the C machine is an analog signal rather then the digital pulses normally received from the magnetic pickups on the turbine shaft. With respect to the impulse chamber pressure signal, the simulated signal for this pressure is a 0 to 10 volt DC input instead of a 1 to 5 volt DC signal that would normally come from the pressure transducer of the actual system. In order to obtain stability, it is necessary to reduce the gain of the EH controller when the impulse pressure mode is in service.

Referring to FIG. 110/4, a block diagram of the controller and the steam flow model to provide the impulse pressure is illustrated. The Laplace equation for the system is as follows:

$$I(s) = \left[ \frac{G(s) K_{REF}}{1 + G(s)H(s)} \right] R(s)$$

Reducing the value of H(s) and $K_{REF}$ to identical fractional values in order to reduce the overall gain does not permit $K_{REF}$ to remain a unity for other phases of operation.

According to the present embodiment of the invention and referring to FIG. 110/5, a fraction of the load reference R(S) is added to the impulse pressure signal I(S) instead of reducing the load reference gain $K_{REF}$. Thus when the load reference is 100% and the impulse pressure is 100% the error signal E(S) is zero. The transfer function is shown as follows:

$$I(s) = \left[ \frac{K G(s)}{1 + K G(s)} \right] R(s)$$

Referring to FIG. 110/6, the diagram of FIG. 110/5 is implemented as follows: Signal CZ1 is the load reference signal and signal LZ1 is the impulse pressure signal. Resistors R5C, R11C, R2C have fixed resistances of 118.8, 90.9, and 602 kilohms respectively. The resistor R11C also has a 10 kilohm variable resistance. When signals CZ1 and LZ1 are 10 volts, the output signal AZ1 should be 10 volts. The current at the summing junction SJ should be zero. Thus, $I_1 + I_2 = I_3$ $(10/R2C) + (10/R5C) = (10/R11C)$ for the previously stated values of R2C and R5C, the resistor R11C is 99.5 kilohms. The gain K is therefore

R11C/R5C = 99.5/118.8 = 0.843

Thus, in setting the gain properly, the potentiometer R11C is set by establishing a 100% impulse pressure in the C machine according to the visual display at the instructor's console. After stopping the model, a 100% load reference is established with the IMP IN mode in service on the EH control panel. The potentiometer R11C is adjusted so that the signal AZ1 matches the signal CZ1.

GENERATOR HYDROGEN SYSTEM

Referring to FIG. 112/5, the generator hydrogen system, removes heat from the generator due to electrical losses. Hydrogen gas is maintained under pressure within the generator casing and circulates through a heat exchanger in a closed loop. Heat is transferred from the generator windings to the gas, which gas is then circulated to the heat exchanger; and the heat in the gas is then transferred to cooling water the flow of which is regulated by a gas temperature control valve GNCVO4. Referring to FIG. 930, the control valve GNCVO4 is controlled from the central control office, and the hydrogen pressure GNPH2, temperature GNTH2, and purity GNZPUR is indicated by meters on the control panels. In operation, the generator heat losses, which enhance the heat input to the system, varies as the electrical load varies. A high gas temperature indicates insufficient heat transfer through the heat exchanger; and a low hydrogen gas pressure indicates a loss of gas. Either of these conditions necessitates a reduction in the generator's electrical output to compensate for the lack of heat removal by the hydrogen. The pressure regulator GNCVO4 is designed to maintain a hydrogen gas pressure in the generator as approximately 75 psi under operating conditions.

Generator Hydrogen System Simulation (BOPAUX)

The hydrogen cooling system model T47 which employs the subroutine BOPAUX, responds to variations in generator electrical output, and the manipulation of the control valve GNCVO4. The inputs to the model include the electrical output GNUE of the generator and the admittance of the hydrogen temperature control valve GNCVO4. The outputs from the model which are indicated in the central office include the hydrogen temperature GNTH2, and the hydrogen pressure GNPH2. The purity of the hydrogen GNZPUR in the simulation is a constant.

In simulating the hydrogen system, the hydrogen gas is considered as a single lump without transport delays during the heat transfer process, and the heat exchanger is simulated by treating the heat that is absorbed by the cooling water as being removed directly from the hydrogen gas. The hydrogen gas temperature GNTH2 is simulated to be 5° F greater than the temperature of the cooling water GNTOSW. The heat input GNQ to the hydrogen is simulated to be proportional to the electrical output of the generators GNUE. The hydrogen gas system is assumed to dissipate two-thirds of the total heat losses of the generator. The remaining one-third is assumed to be removed by the stator cooling system.

In simulating the gas temperature, an energy balance is performed on the water in the heat exchanger. In such energy balance, the heat input GNQ is simulated as proportional to the generator megawatt output GNUE and the heat is removed by the flow GNWZOL. Because of the relationship in the simulation between the gas temperature GNTH2 and the service water outlet temperature GNTOSW, the gas temperature can be obtained whereby the heat input GNQ and the heat absorbed by the service water are balanced according to the following equation:

$$GNTH2 = GNT\phi SW + \frac{[GNWC\phi L(70.0 - GNT\phi SW) + GNQ] \Delta T}{2.02 \times 10^{-3}}$$

In the system being simulated, the generator losses at rated operation are approximately 14.243 megawatts, and the hydrogen gas is simulated to absorb two-thirds of the total generator heat losses. Thus, the maximum heat input GNQ for the system is as follows:

$$GNQ = \frac{2}{3} \frac{(14.243 \times 10^6)(3.413)}{(10^6)} = 32.4 \text{ Btu/hr}/10^6$$

With the heat loss input GNQ being proportional to the electrical output GNUE, then:

$$GNQ = 32.4 \,(GNUE/1085) = 2.98 \times 10^{-2} GNUE$$

The amount of cooling water flow GNWCOL is controlled by the hydrogen temperature control valve GNCVO4. Such flow is constant except when being adjusted during plant startup to permit an effective control range for the valves. A constant flow of 0.3 millions lb/hr of cooling water is necessary to dissipate the required heat from the hydrogen gas. The controlled flow is made proportional to the valve admittance GNCVO4 resulting in a maximum flow of 1.3 millions of pound per hour with a maximum control valve admittance of one. The service water inlet temperature is simulated at 70° F. A constant, such as 2.02 $\times$ 10$^{-3}$ hrs., is selected to provide a seven second time constant which represents an effective mass of gas and its specific heat.

In simulating the hydrogen system pressure GNPH2, the ideal gas loss, $PV = NRT$ is applied. The enclosed volume of gas in the generator is of course subject to temperature variation which results in pressure variation. The pressure regulating apparatus compensates for temperature variation by adding to or removing from the mass of gas. In simulating the effect of the regulator the derivative of the ideal gas loss $PV = MRT$ could be used as follows:

$$dp = (R/V) [Tdm + Mdt]$$

Any deviation in temperature $dt$ is offset by a change in the mass $dm$. A simulation program uses a derivative lag circuit to simulate the effect of temperature change on pressure rather than solving the ideal gas law equation.

Referring to FIG. 112/6, the effect of the generator temperature is eliminated by the pressure regulator. The effect of the pressure regulating system GNZFLI is assumed to have a thirty-second time delay. The output of the derivative lag circuit is multiplied by a gain of 0.75. Thus a 20° step change in temperature causes a 15 psi change in pressure. The output of the derivative lag circuit represents only transient responses. The total pressure is calculated by adding the set point value GNKTSP (75 psi) to the transient output ($\Delta P$).

It is understood that the various inventive features in the improved method and simulation system, may be implemented in either an analog, digital, or analog/digital with or without single or multiple computer apparatus. Also many of the features are applicable in the simulation of other pressurized water reactor plant arrangements, boiling water reactor plants, and gas and other nuclear plant arrangements. Also some features are applicable to fossil-fired power plants. It is further understood, that with respect to the individual models, that the changing of one or more models in the simulator does not effect the system, method, or operation of other models in the simulator.

Reference is made to U.S. patent application Ser. No. 333,901 entitled "Training Simulator For a Nuclear Power Plant" and filed by G. L. Gregg, R. E. Putman and J. W. Gomola which is assigned to the present assignee and filed concurrently herewith; and which is incorporated herein by reference and made a part hereof.

I claim:

1. An automated training simulator for the real-time dynamic operation of a power plant having a secondary system including a heat exchanger which increases the temperature of reheatable steam between stages of a steam turbine with reheat steam from a steam generating means, comprising:
 a console having a plurality of command devices to generate input data;
 calculating means including sequencing means having the following components;
 a. means to generate a data value relating to the mass of reheatable steam in the heat exchanger in accordance with data values relating to inlet flow and outlet flow and heat transfer, b. means to generate a data value relating to the specific volume of steam in the heat exchanger in accordance with generated data values relating to mass and volume, c. means to generate a data value relating to the temperature of the reheatable steam in the heat exchanger in accordance with data values relating to enthalpy and specific volume of the reheatable steam, d. means to generate a data value relating to enthalpies of the reheatable and the reheat steam in accordance with an instantaneous energy balance equation for each enthalpy, e. means including means to generate a data value relating to the temperature of the reheat steam at the outlet of the heat exchanger in accordance with a constant and a data value related to generated enthalpy of the reheat steam, f. means to generate a data value relating to heat transfer in the heat exchanger between the reheat and the reheatable steam in accordance with the generated data values relating to the temperature of the reheat and reheatable steam, g. means to generate a data value relating to inlet and outlet flow in accordance with the input data values including input data from the operation of the console control devices; and indicating means governed by predetermined generated data values of the reheatable steam.

2. A simulator according to claim 1 wherein the constant data value of the calculating means relates to specific heat of the reheat steam.

3. A simulator according to claim 1 wherein the generated data values relating to the mass of reheatable steam are generated by data values relating to integrated inflows and outflows.

4. A simulator according to claim 1 wherein the enthalpy of the reheatable steam for generating the temperature is the enthalpy generated in a prior sequence.

5. A simulator according to claim 1 wherein the instantaneous energy balance equation uses data values relating to generated inflows, outflows, and heat transfer.

6. A simulator according to claim 1 wherein the indicating means is governed by a generated data value relating to temperature of the reheatable steam.

7. A simulator according to claim 1 wherein the indicating means is governed by a generated data value relating to pressure of the reheatable steam.

8. A simulator according to claim 1 wherein heat exchanger of the secondary system includes a simulated safety valve operative to open at a predetermined pressure and the calculating means further comprises:

means to generate a data value relating to a maximum allowable mass of reheatable steam in accordance with data values relating to specific volume and enthalpy of the reheatable steam and the predetermined pressure;

means to compare generated mass with the generated maximum allowable mass; and indicating means indicative of the open safety valve at times when the generated mass exceeds maximum allowable generated mass.

9. An automated simulator for the real-time dynamic operation of a power plant having a secondary system that includes a steam turbine steam flows across the blades and exhausts in a condenser, and at low steam flows there is a loss of power due to windage, said simulator comprising a console having a plurality of command devices;

calculating means including sequencing means having the following components, a. means to generate a data value relating to normalized turbine speed in accordance with a data value relating to generated turbine speed, b. means to generate a data value relating to normalized turbine inlet steam flow in accordance with a data value relating to a predetermined percentage of rated flow, c. means to generate a data value relating to normalized turbine steam density in accordance with a data value relating to rated values of steam mass in the simulated condenser, d. means to generate a data value relating to loss torque due to windage in accordance with the generated data values relating to normalized speed, flow, and density, e. means to generate a data value relating to turbine speed in accordance with the data value relating to loss torque, f. means to generate a data value relating to inlet steam flow in accordance with generated input data including input data from predetermined console command devices, and indicating means responsive to predetermined generated physical values to monitor plant operation.

10. A simulator according to claim 9 wherein the generated turbine speed is in accordance with generated data values relating to turbine acceleration, net power, and turbine inertia.

11. An automated training simulator for the real-time dynamic operation of a power plant having a secondary system where a steam turbine is controlled by an electro-hydraulic controller that responds to variations in turbine operation to produce a demand signal for operating steam inlet valves with the inlet valves being operable between open and closed positions over a predetermined period of time, said simulator comprising:

a plurality of console command devices;

an electro-hydraulic controller;

circuit means operative to convert the demand signals of the electro-hydraulic controller to signals relating to required valve position;

circuit means operative to vary the demand signal to correspond to a predetermined valve speed operation;

calculating means including sequencing means having the following components, a. means to generate a data value relating to a steam flow coefficient in accordance with the valve position signal, b. means to generate a data value relating to admittance for the valve in accordance with a data value relating to total valve admittance, c. means to generate a data value relating to steam flow in accordance with a data value relating to the generated admittance; and indicating means governed by the generated data values to monitor plant operation.

12. A simulator according to claim 11 wherein the valve admittance is generated in accordance with data values relating to steam pressure on opposite sides of the valve.

13. A simulator according to claim 11 where the inlet valves have non-linear characteristics at distinct operated positions between open and closed positions, and said calculating means further comprises, means to generate a data value relating to a comparison between generated data values relating to steam pressure on opposite sides of the inlet valve and the generated data value relating to valve admittance at times when the data value relating to compared pressure difference is a first predetermined amount in accordance with the formula $$X = (X_T K \sqrt{(A/2)/B})$$

where $X$ is governor valve admittance for a distinct position,
$X_T$ is total flow coefficient of inlet valves
$K$ is a constant for units conversion at selected steam density,
$A$ is the steam supply pressure
$B$ is the difference in steam pressure between opposite sides of the inlet valve.

14. A simulator according to claim 13 wherein the generated data value relating to valve admittance is in accordance with the formula $$X = X_T K / \sqrt{B}$$

when the data value relating to compared pressure difference is a second predetermined amount.

15. A simulator according to claim 13 wherein the predetermined amount is a data value relating to the pressure on the upsteam side of the valve in excess of twice the pressure on the downstream side.

16. An automated training simulator for the dynamic real-time operation of a steam power plant having a secondary system with a fluid distribution system where fluid is circulated under pressure by at least one pump having non-linear head versus flow characteristics, said simulator comprising:

command devices to furnish signals corresponding to the operation of fluid control devices including a pump;
a plurality of indicating devices operative to respond to generated data values relating to physical values within the secondary system for monitoring the plant;
calculating means including sequencing means having the following components,
means including the programmed digital computer means to generate data values relating to shut-off and head pressures and internal admittance for a pump in accordance with data values relating to the fluid flow and pump speed,
means to generate data values relating to the admittances of fluid control devices in accordance with the operation of the console command devices,
means to generate data values relating to coefficients for a predetermined number of linear equations in accordance with predetermined data values,
means to generate data values relating to the pressure of the fluid at predetermined nodal points in the system in accordance with the data values depending on calculated coefficients, and
means to generate data values relating to flow for the pump in accordance with data values relating to the shut-off and head pressure, and the internal admittance of the pump.

17. A simulator according to claim 16 wherein the calculating means further comprises means to store data values relating to flow for each of a plurality of pump operations in accordance with a data value relating to predetermined pump speed, means to generate a data value relating to pump flow in accordance with the head pressure and internal admittance of a selected stored pump operation,
means to compare the generated flow data with the stored data value relating to flow for a selected operation, and means to iterate the said generation of data values when the generated flow deviates beyond the selected pump operation in accordance with the generated values for the selected pump operation from which such flow deviates.

18. A simulator according to claim 17 wherein the secondary system includes a plurality of pumps, and each of said plurality includes at least three head versus flow pump operations for corresponding pump data values relating to admittances.

19. A simulator according to claim 17 wherein the calculating means is structured on a programmed digital computer.

20. An automated training simulator for the real-time dynamic operation of the secondary system of a steam power plant having a condensate system for condensing exhaust steam in one side of a condenser by circulating water through another side, said simulator comprising:

a plurality of manually operable command devices relating to the operation of fluid control devices;
calculating means including sequencing means having the following components,
means to generate a data value relating to steam enthalpy in accordance with an energy balance for the steam in the condenser,
means to generate data values relating to the pressure and temperature of the steam in the condenser in accordance with data values relating to steam enthalpy,
means to generate a data value relating to the coefficient of heat transfer in accordance with a data value relating to circulating water inlet temperature,
means to generate a data value relating to heat transfer in the condenser in accordance with data values relating to steam temperature, circulating water temperature, and the heat transfer coefficient,
means to generate a data value relating to circulating water outlet temperature in accordance with the heat transfer value and data values relating to circulating water flow, circulating water inlet temperature and the generated outlet temperature,
means to generate output data in accordance with the generated physical values, and
indicating devices governed by the output data for monitoring the operation of the plant.

21. A simulator according to claim 20 wherein the calculating means further comprises, means to generate a data value relating to the enthalpy of the condensed steam in accordance with a data value relating to the steam enthalpy, and
means to generate a data value relating to water level in the condenser in accordance with data values relating to the mass of inlet steam and the mass of water delivered to a secondary feedwater system from the condenser.

22. A simulator according to claim 21 wherein the calculating means further comprises means to generate data values relating to air leakage in the secondary system, means to vary the data value relating to heat transfer coefficient in accordance with data values relating to air in the condenser, and means to generate a data value relating to the mass balance of air in the condenser by integrating the data values relating to inflows and outflows of air.

23. A simulator according to claim 22 wherein the generated energy balance is governed by the assumption that all steam coming into the simulated condenser is condensed.

24. A simulator according to claim 20 wherein the generated steam pressure is governed by values corresponding to saturated conditions.

25. A simulator according to claim 20 wherein the generated steam pressure and steam temperature data values are generated in accordance with a spline fit function.

26. A simulator according to claim 20 wherein the calculating means is structured in a programmed digital computer.

27. An automated training simulator for the real-time dynamic operation of the secondary system of a power plant wherein a heat exchanger increases the temperature of reheatable steam by means of reheat steam from a predetermined source, said simulator comprising:
a plurality of command devices;
calculating means including sequencing means having the following components,
a. means to generate a data value relating to reheatable steam temperature in accordance with data values relating to specific volume of reheatable steam,
b. means to generate a data value depending on the temperature of the reheat steam in accordance with data values depending on condensing enthalpy of the reheat steam,
c. means to generate a data value relating to heat transfer between the reheatable and reheat steam in accordance with generated data values relating to the temperature of the reheat and reheatable steam; and
d. indicating means governed by the data values relating to the temperature of the reheatable steam to monitor the operation of the secondary system.

28. An automated training simulator for the real-time dynamic operation of a power plant having a steam turbine connected to operate in accordance with the flow of steam across the turbine blades and to exhaust in a condenser, in which at low steam flows there may be a loss of power due to windage, comprising:
calculating means including sequencing means having the following components,
a. means to generate a data value relating to normalized turbine speed in accordance with data values relating to calculated turbine speeds,
b. means to generate a data value relating to normalized turbine inlet steam flow in accordance with data values relating to a predetermined percentage of rated flow,
c. means to generate a data value relating to normalized turbine steam density in accordance with data values relating to rated values of steam mass in the condenser,
d. means to generate a data value relating to loss torque because of windage loss in accordance with data values relating to the calculated normalized speed, flow, and density,
e. means to generate a data value relating to turbine speed in accordance with data values relating to loss torque,
f. means to generate data values relating to inlet steam flow in accordance with input data;
g. command devices operable to generate the input data; and
h. indicating devices governed by the generated data values to monitor the operation of the plant.

29. An automated training simulator for the real-time dynamic operation of a power plant having a steam turbine that is controlled by an electrohydraulic controller which responds to variations in turbine operation to produce a demand signal for operating steam inlet valves wherein said inlet valves operate between open and closed positions in a predetermined period of time;
said simulator comprising a plurality of command devices operative to provide distinctive input data in accordance with their operation;
an electrohydraulic turbine controller operable to transmit a distinctive signal relating to a valve demand position;
circuit means responsive to the valve demand signal to generate a signal corresponding to valve position;
calculating means including sequencing means having the following components,
a. means to generate a data value relating to a steam flow coefficient in accordance with data values relating to the valve position signal,
b. means to generate a data value relating to valve admittance in accordance with data values relating to total valve admittance,
c. means to generate data values relating to steam flow in accordance with data values relating to valve admittance;
indicating means governed by the generated data values to monitor the operation of the plant; and
means responsive to variation in data values relating to turbine operation and the demand devices to vary the valve position signal.

30. A simulator according to claim 29 wherein the circuit means responsive to the valve demand signal includes means to delay the generation of the valve position signal by an amount corresponding to the real-time operation of the valve.

31. A simulator according to claim 30 wherein the steam inlet valves have non-linear characteristics when the steam pressure on the upstream side of the governor valve exceeds the steam pressure on the downstream side of the governor valves by a predetermined amount, said calculating means further comprising:
means to generate a data value relating to steam inlet valve admittance when the pressure differece is in excess of the predetermined amount in accordance with the formula, $$X = [X_T K \sqrt{(A/2)}/B$$

where $X$ is a steam inlet valve admittance for a distinct valve position,
$X_T$ is total admittance of the steam inlet valve,
$K$ is a constant for units conversion at selected steam density,
$A$ is the steam supply pressure,
$B$ is the difference in steam pressure between opposite sides of the steam inlet valve, and
means to compare the pressure differences.

32. A simulator according to claim 31 wherein the calculating means further comprises, means to generate a data value relating to valve admittance at times when the pressure difference is less than the predetermined amount in accordance with the formula $$X = {}'X_T K/\sqrt{B}$$

33. An automated training simulator for the real-time dynamic operation of a power plant having a secondary system in which a fluid distribution network includes fluent control devices and a pump non-linear head v. flow characteristics but calculating the fluid under pressure in the secondary system, said simulator comprising:
  a plurality of console command devices to provide distinctive input data in accordance with their operation;
  calculating means including sequencing means having the following components,
  a. means to generate data values relating to shut-off pressures, head pressures, and internal admittance for the pump in accordance with data values relating to fluid flow and pump speed,
  b. means to generate data values relating to admittances of the fluids control devices in accordance with the input data that is in response to the operation of the command devices,
  c. means to generate data values relating to coefficients for a predetermined number of linear equations corresponding to predetermined nodal points in the distribution system in accordance with data values relating to predetermined stored data values,
  d. means to generate data values relating to fluid pressure for each said nodal point in accordance with data values relating to generated coefficients,
  e. means to generate data values relating to pump flow in accordance with data values relating to shut-off pressure, head pressure, and internal admittance; and
  indicating means governed by predetermined generated data values for monitoring the operation of the plant.

34. A simulator according to claim 33 wherein the non-linear range of operation of the pump can be represented mathematically by a plurality of contiguous straight line segments that segregate the head versus flow non-linear curve with the slope of each segment representing the pump admittance values, said calculating means comprising:
  means to store data values relating to the shut-off pressure, head pressure, and internal pump admittance for each representative line segment,
  means to store data values relating to flow for each operation of the pump at the junction of each mathematically represented line segment for a predetermined pump speed,
  means to generate a data value relating to pump flow in accordance with head pressure and admittance for a selected range of operation represented mathematically by a line segment,
  means to compare the generated data value relating to flow with the stored data of value relating to the flow for the selected range of operation, and
  means to select data values within the selected range of operation in accordance with the calculated flow without the range of operation.

35. A simulator according to claim 34 wherein the calculating means include means to decrease by a preamount the stored data value relating to flow at the intersection of the range of operation.

36. An automated training simulator for the real-time dynamic operation of a power plant having a generator with a gas cooling system, comprising a plurality of command devices corresponding to fluid control devices;
  calculating means including sequencing means having the following components,
  a. means to generate data values relating to incoming gas temperature in accordance with an instantaneous energy balance,
  b. means to generate a data value related to gas pressure in accordance with the generated data value related to incoming gas temperature,
  c. means governed by the generated data value relating to gas pressure to vary the pressure data value a predetermined amount during a predetermined period of time, and
  d. indicating means governed by the generated pressure and the incoming gas temperature to monitor the operation of the plant.

37. A simulator according to claim 36 wherein the time for varying the gas pressure is a function of the amount of deviation between the data value relating to the generated pressure and a predetermined pressure.

38. A simulator according to claim 37 wherein the calculating means comprises:
  means to generate a data value relating to the heat loss of the electrical generator as a percentage of generator power.

39. An automated training simulator for the real-time dynamic operation of the power plant having a secondary system in which a grand seam seal system includes a steam supply regulated by a first plurality of valves to regulate pressure at a first set of glands with such regulated supply pressure being further regulated downstream to govern steam header pressure at a second set of glands, comprising a plurality of command devices, corresponding to plant control devices;
  calculating means including sequencing means having the following components,
  a. means to generate a data value relating to admittance for each fluid control device in accordance with input data from the command devices,
  b. means to generate a data value relating to steam supply pressure in accordance with predetermined generated admittances,
  c. means to generate a data value relating to gland header pressure in accordance with a second plurality of individual generated admittances, and
  indicating devices to indicate the values relating to the steam supply pressure and the gland header pressure in accordance with the generated data values.

40. A simulator according to claim 39 wherein the calculating means generates the data values for the first plurality of admittance as a single data value and generates a data value for the second plurality of admittances as a single data value.

* * * * *